(12) United States Patent
Ng et al.

(10) Patent No.: US 9,001,226 B1
(45) Date of Patent: Apr. 7, 2015

(54) CAPTURING AND RELIGHTING IMAGES USING MULTIPLE DEVICES

(71) Applicant: Lytro, Inc., Mountain View, CA (US)

(72) Inventors: Yi-Ren Ng, Palo Alto, CA (US); Chia-Kai Liang, Mountain View, CA (US); Kurt Barton Akeley, Saratoga, CA (US); Bennett Wilburn, Mountain View, CA (US)

(73) Assignee: Lytro, Inc., Mountain View, CA (US)

( * ) Notice: Subject to any disclaimer, the term of this patent is extended or adjusted under 35 U.S.C. 154(b) by 52 days.

(21) Appl. No.: 13/693,798

(22) Filed: Dec. 4, 2012

(51) Int. Cl.
 *H04N 5/232* (2006.01)
 *H04N 5/228* (2006.01)
 *H04N 5/222* (2006.01)
 *G03B 15/03* (2006.01)
 *G03B 9/70* (2006.01)
 *G03B 15/02* (2006.01)

(52) U.S. Cl.
 CPC .................................. *H04N 5/23203* (2013.01)

(58) Field of Classification Search
 USPC .............. 348/211.1–211.14, 370, 371, 222.1; 396/155–206
 See application file for complete search history.

(56) References Cited

U.S. PATENT DOCUMENTS

| | | | |
|---|---|---|---|
| 725,567 | A | 4/1903 | Ives |
| 4,383,170 | A | 5/1983 | Takagi et al. |
| 4,661,986 | A | 4/1987 | Adelson |
| 4,694,185 | A | 9/1987 | Weiss |
| 4,920,419 | A | 4/1990 | Easterly |
| 5,076,687 | A | 12/1991 | Adelson |
| 5,282,045 | A | 1/1994 | Mimura et al. |
| 5,610,390 | A | 3/1997 | Miyano |
| 5,748,371 | A | 5/1998 | Cathey, Jr. et al. |
| 5,757,423 | A | 5/1998 | Tanaka et al. |

(Continued)

FOREIGN PATENT DOCUMENTS

| | | |
|---|---|---|
| DE | 19624421 | 6/1996 |
| WO | 03052465 | 6/2003 |

(Continued)

OTHER PUBLICATIONS

Nakamura, J., "Image Sensors and Signal Processing for Digital Still Cameras" (Optical Science and Engineering), 2005.

(Continued)

*Primary Examiner* — Chia-Wei A Chen
(74) *Attorney, Agent, or Firm* — Raubvogel Law Office

(57) ABSTRACT

A system and method are provided for coordinating image capture using multiple devices, including for example multiple image capture devices (cameras), multiple lighting devices (flash), and/or the like. In at least one embodiment, the system of the present invention is configured to collect image information from multiple image capture devices, such as cameras, and/or to collect multiple images having different lighting configurations. The collected image data can be processed to generate various effects, such as relighting, parallax, refocusing, and/or three-dimensional effects, and/or to introduce interactivity into the image presentation. In at least one embodiment, the system of the present invention is implemented using any combination of any number of image capture device(s) and/or flash (lighting) device(s), which may be equipped to communicate with one another via any suitable means, such as wirelessly. A communication protocol is established for enabling such communication, such as WiFi, Bluetooth, or the like.

58 Claims, 62 Drawing Sheets

(56) References Cited

U.S. PATENT DOCUMENTS

| | | | |
|---|---|---|---|
| 5,949,433 A | 9/1999 | Klotz | |
| 6,023,523 A | 2/2000 | Cohen et al. | |
| 6,028,606 A | 2/2000 | Kolb et al. | |
| 6,069,565 A * | 5/2000 | Stern et al. | 340/583 |
| 6,097,394 A | 8/2000 | Levoy et al. | |
| 6,169,285 B1 * | 1/2001 | Petrillo et al. | 250/369 |
| 6,201,899 B1 | 3/2001 | Bergen | |
| 6,320,979 B1 | 11/2001 | Melen | |
| 6,483,535 B1 | 11/2002 | Tamburrino et al. | |
| 6,577,342 B1 | 6/2003 | Webster | |
| 6,597,859 B1 | 7/2003 | Leinhardt et al. | |
| 6,842,297 B2 | 1/2005 | Dowski, Jr. et al. | |
| 6,900,841 B1 | 5/2005 | Mihara | |
| 6,927,922 B2 | 8/2005 | George et al. | |
| 7,015,954 B1 * | 3/2006 | Foote et al. | 348/218.1 |
| 7,034,866 B1 | 4/2006 | Colmenarez et al. | |
| 7,102,666 B2 * | 9/2006 | Kanade et al. | 348/159 |
| 7,336,430 B2 | 2/2008 | George | |
| 7,620,309 B2 | 11/2009 | Georgiev | |
| 7,623,726 B1 | 11/2009 | Georgiev | |
| 7,724,952 B2 * | 5/2010 | Shum et al. | 382/173 |
| 7,847,825 B2 * | 12/2010 | Aoki et al. | 348/211.4 |
| 7,945,653 B2 | 5/2011 | Zuckerberg et al. | |
| 7,949,252 B1 | 5/2011 | Georgiev | |
| 8,013,904 B2 * | 9/2011 | Tan et al. | 348/222.1 |
| 8,115,814 B2 * | 2/2012 | Iwase et al. | 348/169 |
| 8,155,478 B2 | 4/2012 | Vitsnudel et al. | |
| 8,264,546 B2 * | 9/2012 | Witt | 348/187 |
| 8,290,358 B1 | 10/2012 | Georgiev et al. | |
| 8,310,554 B2 * | 11/2012 | Aggarwal et al. | 348/211.11 |
| 8,675,073 B2 * | 3/2014 | Aagaard et al. | 348/157 |
| 8,736,710 B2 * | 5/2014 | Spielberg | 348/224.1 |
| 8,736,751 B2 * | 5/2014 | Yun, II | 348/370 |
| 8,750,509 B2 * | 6/2014 | Renkis | 380/270 |
| 8,797,321 B1 * | 8/2014 | Bertolami et al. | 345/426 |
| 2002/0159030 A1 | 10/2002 | Frey et al. | |
| 2003/0103670 A1 | 6/2003 | Schoelkopf et al. | |
| 2003/0117511 A1 | 6/2003 | Belz et al. | |
| 2003/0133018 A1 * | 7/2003 | Ziemkowski | 348/211.2 |
| 2003/0156077 A1 | 8/2003 | Balogh | |
| 2004/0114176 A1 | 6/2004 | Bodin et al. | |
| 2004/0189686 A1 * | 9/2004 | Tanguay et al. | 345/716 |
| 2004/0257360 A1 | 12/2004 | Sieckmann | |
| 2005/0080602 A1 | 4/2005 | Snyder et al. | |
| 2005/0212918 A1 * | 9/2005 | Serra et al. | 348/208.14 |
| 2005/0276441 A1 * | 12/2005 | Debevec | 382/100 |
| 2006/0023066 A1 * | 2/2006 | Li et al. | 348/159 |
| 2006/0130017 A1 | 6/2006 | Cohen et al. | |
| 2007/0052810 A1 * | 3/2007 | Monroe | 348/211.11 |
| 2007/0071316 A1 | 3/2007 | Kubo | |
| 2007/0081081 A1 * | 4/2007 | Cheng | 348/218.1 |
| 2007/0103558 A1 * | 5/2007 | Cai et al. | 348/211.11 |
| 2007/0188613 A1 | 8/2007 | Nobori et al. | |
| 2007/0201853 A1 * | 8/2007 | Petschnigg | 396/155 |
| 2007/0230944 A1 | 10/2007 | Georgiev | |
| 2007/0252074 A1 | 11/2007 | Ng et al. | |
| 2008/0007626 A1 | 1/2008 | Wernersson | |
| 2008/0018668 A1 | 1/2008 | Yamauchi | |
| 2008/0056569 A1 * | 3/2008 | Williams et al. | 382/173 |
| 2008/0131019 A1 | 6/2008 | Ng | |
| 2008/0152215 A1 | 6/2008 | Horie et al. | |
| 2008/0180792 A1 | 7/2008 | Georgiev | |
| 2008/0187305 A1 | 8/2008 | Raskar et al. | |
| 2008/0193026 A1 | 8/2008 | Horie et al. | |
| 2008/0226274 A1 | 9/2008 | Spielberg | |
| 2008/0266655 A1 | 10/2008 | Levoy et al. | |
| 2008/0309813 A1 * | 12/2008 | Watanabe | 348/340 |
| 2009/0027542 A1 | 1/2009 | Yamamoto et al. | |
| 2009/0041381 A1 | 2/2009 | Georgiev et al. | |
| 2009/0041448 A1 | 2/2009 | Georgiev et al. | |
| 2009/0102956 A1 | 4/2009 | Georgiev | |
| 2009/0128658 A1 | 5/2009 | Hayasaka et al. | |
| 2009/0128669 A1 | 5/2009 | Ng et al. | |
| 2009/0140131 A1 | 6/2009 | Utagawa | |
| 2009/0185801 A1 | 7/2009 | Georgiev et al. | |
| 2009/0268970 A1 | 10/2009 | Babacan et al. | |
| 2009/0273843 A1 | 11/2009 | Raskar et al. | |
| 2009/0295829 A1 | 12/2009 | Georgiev et al. | |
| 2009/0309973 A1 * | 12/2009 | Kogane | 348/159 |
| 2010/0026852 A1 | 2/2010 | Ng et al. | |
| 2010/0097444 A1 | 4/2010 | Lablans | |
| 2010/0128145 A1 | 5/2010 | Pitts et al. | |
| 2010/0129048 A1 | 5/2010 | Pitts et al. | |
| 2010/0141780 A1 * | 6/2010 | Tan et al. | 348/222.1 |
| 2010/0141802 A1 | 6/2010 | Knight et al. | |
| 2010/0253782 A1 * | 10/2010 | Elazary | 348/161 |
| 2010/0277629 A1 | 11/2010 | Tanaka | |
| 2011/0019056 A1 * | 1/2011 | Hirsch et al. | 348/333.01 |
| 2011/0129165 A1 | 6/2011 | Lim et al. | |
| 2011/0149074 A1 * | 6/2011 | Lee et al. | 348/143 |
| 2011/0242334 A1 * | 10/2011 | Wilburn et al. | 348/207.1 |
| 2011/0261205 A1 * | 10/2011 | Sun | 348/159 |
| 2011/0298960 A1 * | 12/2011 | Tan et al. | 348/333.1 |
| 2011/0304745 A1 * | 12/2011 | Wang et al. | 348/229.1 |
| 2011/0316968 A1 * | 12/2011 | Taguchi et al. | 348/36 |
| 2012/0050562 A1 | 3/2012 | Perwass et al. | |
| 2012/0062755 A1 * | 3/2012 | Takahashi et al. | 348/211.11 |
| 2012/0133746 A1 * | 5/2012 | Bigioi et al. | 348/50 |
| 2012/0176481 A1 * | 7/2012 | Lukk et al. | 348/47 |
| 2012/0218463 A1 * | 8/2012 | Benezra et al. | 348/360 |
| 2012/0224787 A1 * | 9/2012 | Imai | 382/274 |
| 2012/0287296 A1 * | 11/2012 | Fukui | 348/211.2 |
| 2012/0293075 A1 * | 11/2012 | Engelen et al. | 315/151 |
| 2012/0327222 A1 | 12/2012 | Ng et al. | |
| 2013/0021486 A1 * | 1/2013 | Richardson | 348/211.11 |
| 2013/0113981 A1 | 5/2013 | Knight et al. | |
| 2013/0120636 A1 * | 5/2013 | Baer | 348/335 |
| 2013/0128052 A1 * | 5/2013 | Catrein et al. | 348/159 |
| 2013/0128081 A1 * | 5/2013 | Georgiev et al. | 348/240.2 |
| 2013/0135448 A1 * | 5/2013 | Nagumo et al. | 348/49 |
| 2013/0176481 A1 * | 7/2013 | Holmes et al. | 348/370 |
| 2013/0222656 A1 * | 8/2013 | Kaneko | 348/262 |
| 2013/0242137 A1 * | 9/2013 | Kirkland | 348/231.99 |
| 2013/0286236 A1 * | 10/2013 | Mankowski | 348/222.1 |
| 2013/0321581 A1 * | 12/2013 | El-Ghoroury et al. | 348/46 |
| 2013/0329107 A1 * | 12/2013 | Burley et al. | 348/333.01 |
| 2013/0335596 A1 * | 12/2013 | Demandolx et al. | 348/231.99 |
| 2013/0342700 A1 * | 12/2013 | Kass | 348/159 |
| 2014/0037280 A1 * | 2/2014 | Shirakawa | 396/56 |
| 2014/0049663 A1 * | 2/2014 | Ng et al. | 348/222.1 |
| 2014/0059462 A1 * | 2/2014 | Wernersson | 715/771 |
| 2014/0132741 A1 * | 5/2014 | Aagaard et al. | 348/48 |
| 2014/0192208 A1 * | 7/2014 | Okincha | 348/188 |

FOREIGN PATENT DOCUMENTS

| | | |
|---|---|---|
| WO | 2006039486 | 4/2006 |
| WO | 2007092545 | 8/2007 |
| WO | 2007092581 | 8/2007 |

OTHER PUBLICATIONS

Debevec et al., "A Lighting Reproduction Approach to Live-Action Compositing", Proceedings SIGGRAPH 2002.

Malzbender, et al., "Polynomial Texture Maps", Proceedings SIGGRAPH 2001.

Wenger, et al, "Performance Relighting and Reflectance Transformation with Time-Multiplexed Illumination", Institute for Creative Technologies, SIGGRAPH 2005.

Ng, R., et al., "All-Frequency Shadows Using Non-linear Wavelet Lighting Approximation. ACM Transactions on Graphics" (Proceedings of SIGGRAPH 2003).

Chen, W., et al., "Light field mapping: Efficient representation and hardware rendering of surface light fields". ACM Transactions on Graphics 21, 3, 447-456, 2002.

Debevec, P., et al., "Recovering high dynamic range radiance maps from photographs", SIGGRAPH 1997, 369-378.

Debevec, P., et al., "Acquiring the reflectance field of a human face", SIGGRAPH 2000.

Dorsey, J., et al., "Design and simulation of opera lighting and projection effects", In Computer Graphics (Proceedings of SIGGRAPH 91), vol. 25, 41-50.

(56) References Cited

OTHER PUBLICATIONS

Nimeroff, J., et al., "Efficient rerendering of naturally illuminated environments", in Fifth Eurographics Workshop on Rendering, 359-373, 1994.
Ramamoorthi, R., et al., "An efficient representation for irradiance environment maps", in Proceedings of SIGGRAPH 2001, 497-500.
Sloan, P., et al., "Precomputed radiance transfer for real-time rendering in dynamic, low-frequency lighting environments", ACM Transactions on Graphics 21, 3, 527-536, 2002.
Teo, P., et al., "Efficient linear rerendering for interactive lighting design", Tech. Rep. STAN-CS-TN-97-60, 1997, Stanford University.
Ng, R., et al., "Triple Product Wavelet Integrals for All-Frequency Relighting", ACM Transactions on Graphics (Proceedings of SIGGRAPH 2004).
Dorsey, J., et al., "Interactive design of complex time dependent lighting", IEEE Computer Graphics and Applications 15, 2 (Mar. 1995), 26-36.
Kautz, J., et al., "Fast arbitrary BRDF shading for low-frequency lighting using spherical harmonics", in Eurographics Rendering Workshop 2002, 291-296.
Lehtinen, J., et al., "Matrix radiance transfer", in Symposium on Interactive 3D graphics, 59-64, 2003.
Ramamoorthi, R., et al., "Frequency space environment map rendering", ACM Transactions on Graphics (SIGGRAPH 2002 proceedings) 21, 3, 517-526.
Winnemöller, H., et al., "Light Waving: Estimating Light Positions From Photographs Alone", Eurographics 2005.
Masselus, Vincent et al., "Relighting with 4D Incident Light Fields", SIGGRAPH 2003.
Fattal, Raanan et al., "Multiscale Shape and Detail Enhancement from Multi-light Image Collections", SIGGRAPH 2007.
Petschnigg, George et al., "Digital Photography with Flash and No-Flash Image Pairs", SIGGRAPH 2004.
Eisemann, Elmar et al., "Flash Photography Enhancement via Intrinsic Relighting", SIGGRAPH 2004.
Raskar, Ramesh et al., "Non-photorealistic Camera: Depth Edge Detection and Stylized Rendering using Multi-Flash Imaging", SIGGRAPH 2004.
Canon Speedlite wireless flash system: see, for example, User manual for Model 550EX. Sep. 1998.
Belhumeur, Peter et al., "The Bas-Relief Ambiguity", International Journal of Computer Vision, 1997, pp. 1060-1066.
Belhumeur, Peter et al., "The Bas-Relief Ambiguity", International Journal of Computer Vision, 1999, pp. 33-44, revised version.
Adelson et al., "Single Lens Stereo with a Plenoptic Camera" IEEE Translation on Pattern Analysis and Machine Intelligence, Feb. 1992. vol. 14, No. 2, pp. 99-106.
Agarwala, A., et al., "Interactive Digital Photomontage," ACM Transactions on Graphics, Proceedings of SIGGRAPH 2004, vol. 32, No. 3, 2004.
Jin-Xang Chai et al., "Plenoptic Sampling", ACM SIGGRAPH 2000, Annual Conference Series, 2000, pp. 307-318.
Dowski et al., "Wavefront coding: a modern method of achieving high performance and/or low cost imaging systems" SPIE Proceedings, vol. 3779, Jul. 1999, pp. 137-145.
Georgiev, T., et al., "Spatio-Angular Resolution Tradeoff in Integral Photography," Proceedings of Eurographics Symposium on Rendering, 2006.
Gortler et al., "The lumigraph" SIGGRAPH 96, pp. 43-54.
Haeberli, "A Multifocus Method for Controlling Depth of Field" GRAPHICA Obscura, 1994, pp. 1-3.

Isaksen, A., et al., "Dynamically Reparameterized Light Fields," SIGGRAPH 2000, pp. 297-306.
Ives, H., "Optical properties of a Lippman lenticulated sheet," J. Opt. Soc. Am. 21, 171 (1931).
Jackson et al., "Selection of a Convolution Function for Fourier Inversion Using Gridding" IEEE Transactions on Medical Imaging, Sep. 1991, vol. 10, No. 3, pp. 473-478.
Levoy, M., et al., "Light Field Microscopy," ACM Transactions on Graphics, vol. 25, No. 3, Proceedings SIGGRAPH 2006.
Levoy et al.,"Light Field Rendering" SIGGRAPH 96 Proceeding, 1996. pp. 31-42.
Levoy, "Light Fields and Computational Imaging" IEEE Computer Society, Aug. 2006, pp. 46-55.
Lippmann, "Reversible Prints", Communication at the French Society of Physics, Journal of Physics, Mar. 20, 1908, pp. 821-825.
Lumsdaine et al., "Full Resolution Lightfield Rendering" Adobe Technical Report Jan. 2008, pp. 1-12.
Naemura et al., "3-D Computer Graphics based on Integral Photography" Optics Express, Feb. 12, 2001. vol. 8, No. 2, pp. 255-262.
Ng, R., et al. "Light Field Photography with a Hand-held Plenoptic Camera," Stanford Technical Report, CSTR 2005-2, 2005.
Ng, R., "Digital Light Field Photography," Dissertation, Department of Computer Science, Stanford University, Jun. 2006.
Ng., R., "Fourier Slice Photography," ACM Transactions on Graphics, Proceedings of SIGGRAPH 2005, vol. 24, No. 3, 2005, pp. 735-744.
Okano et al., "Three-dimensional video system based on integral photograohy" Optical Engineering, Jun. 1999, vol. 38, No. 6, pp. 1072-1077.
Sokolov, "Autostereoscopy and Integral Photography by Professor Lippmann's Method", 1911, pp. 23-29.
Tanida et al., "Thin observation module by bound optics (TOMBO): concept and experimental verification" Applied Optics 40, 11 (Apr. 10, 2001), pp. 1806-1813.
Vaish, V., et al., "Synthetic Aperture Focusing Using a Shear-Warp Factorization of the Viewing Transform," Workshop on Advanced 3D Imaging for Safety and Security (in conjunction with CVPR 2005), 2005.
Vaish et al., "Using plane + parallax for calibrating dense camera arrays", in Proceedings CVPR 2004, pp. 2-9.
Ogden, J., "Pyramid-Based Computer Graphics", 1985.
Fitzpatrick, Brad, "Camlistore", Feb. 1, 2011.
Adelson, E. H., and Bergen, J. R. 1991. The plenoptic function and the elements of early vision. In Computational Models of Visual Processing, edited by Michael S. Landy and J. Anthony Movshon. Cambridge, Mass.: mit Press.
Georgiev, T., et al., Plenoptic Camera 2.0 (2008).
Georgiev, T., et al., "Unified Frequency Domain Analysis of Lightfield Cameras" (2008).
Wilburn et al., "High Performance Imaging using Large Camera Arrays", ACM Transactions on Graphics (TOG), vol. 24, Issue 3 (Jul. 2005), Proceedings of ACM SIGGRAPH 2005, pp. 765-776.
Wilburn, Bennett, et al., "High Speed Video Using a Dense Camera Array", 2004.
Magnor, M., et al., "Model-Aided Coding of Multi-Viewpoint Image Data," Proc. IEEE International Conference on Image Processing, ICIP-2000, Vancouver, Canada, Sep. 2000. https://graphics.tu-bs.de/static/people/magnor/publications/icip00.pdf.
Wilburn, Bennett, "High Performance Imaging Using Arrays of Inexpensive Cameras", 2004.

* cited by examiner

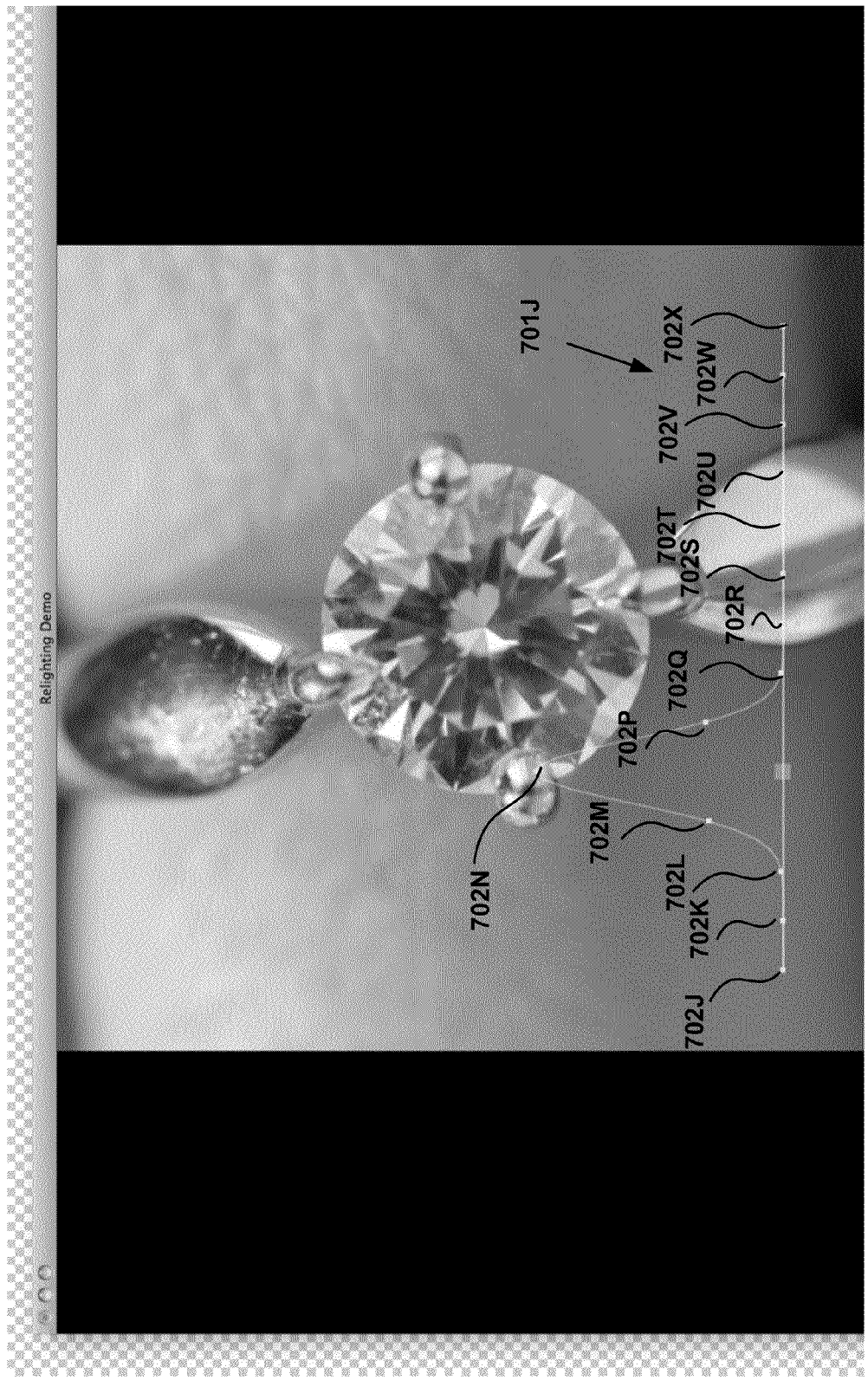

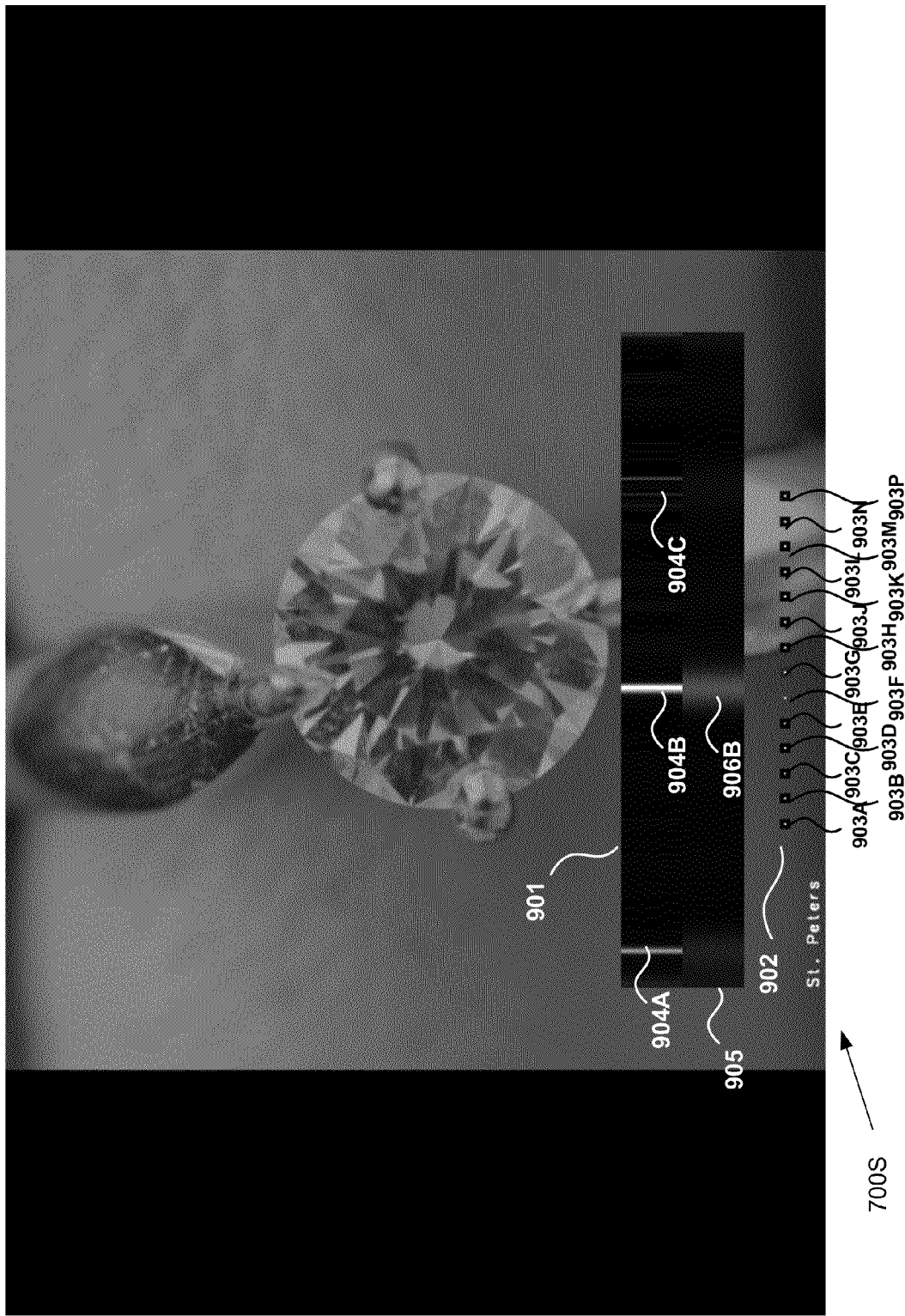

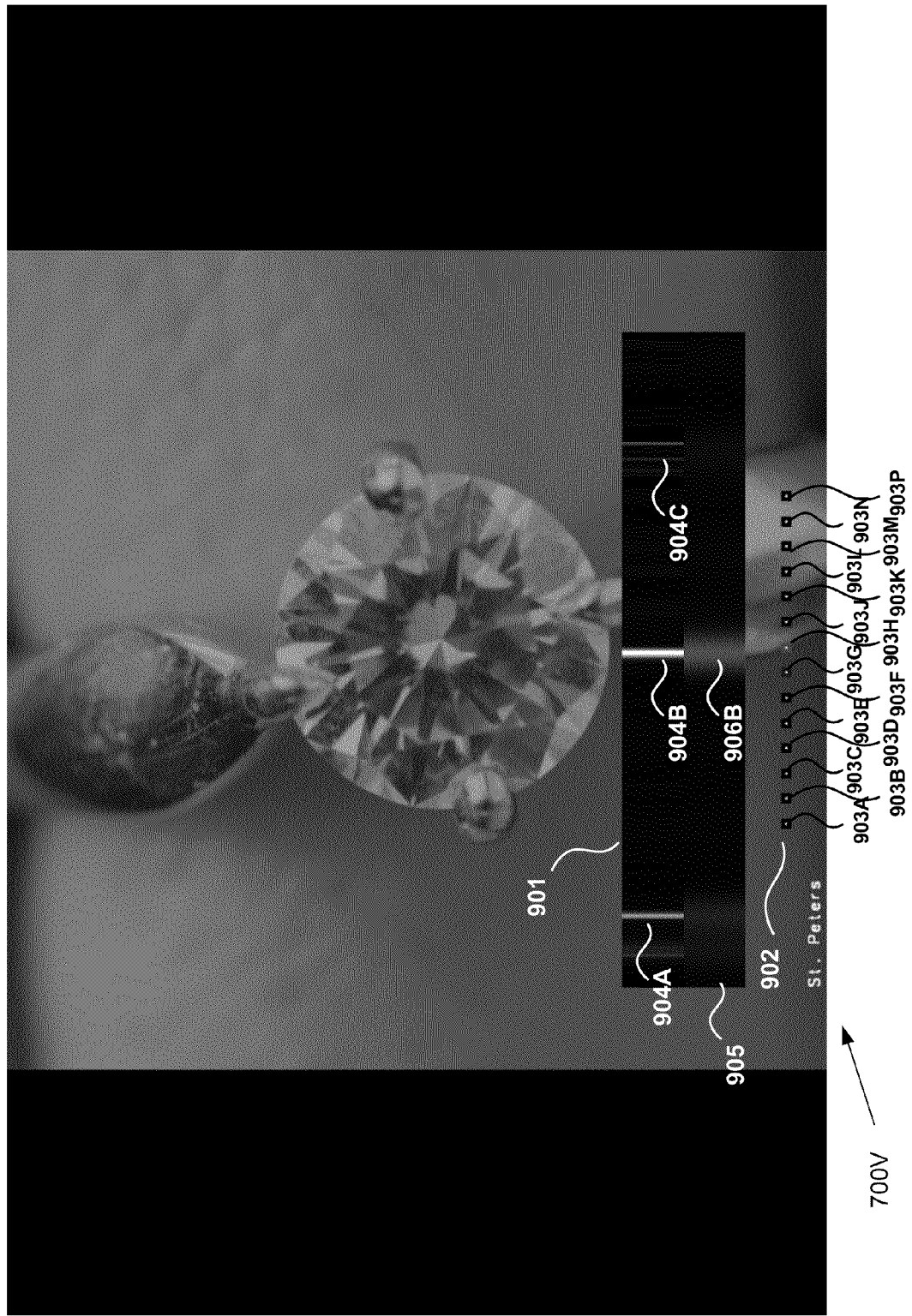

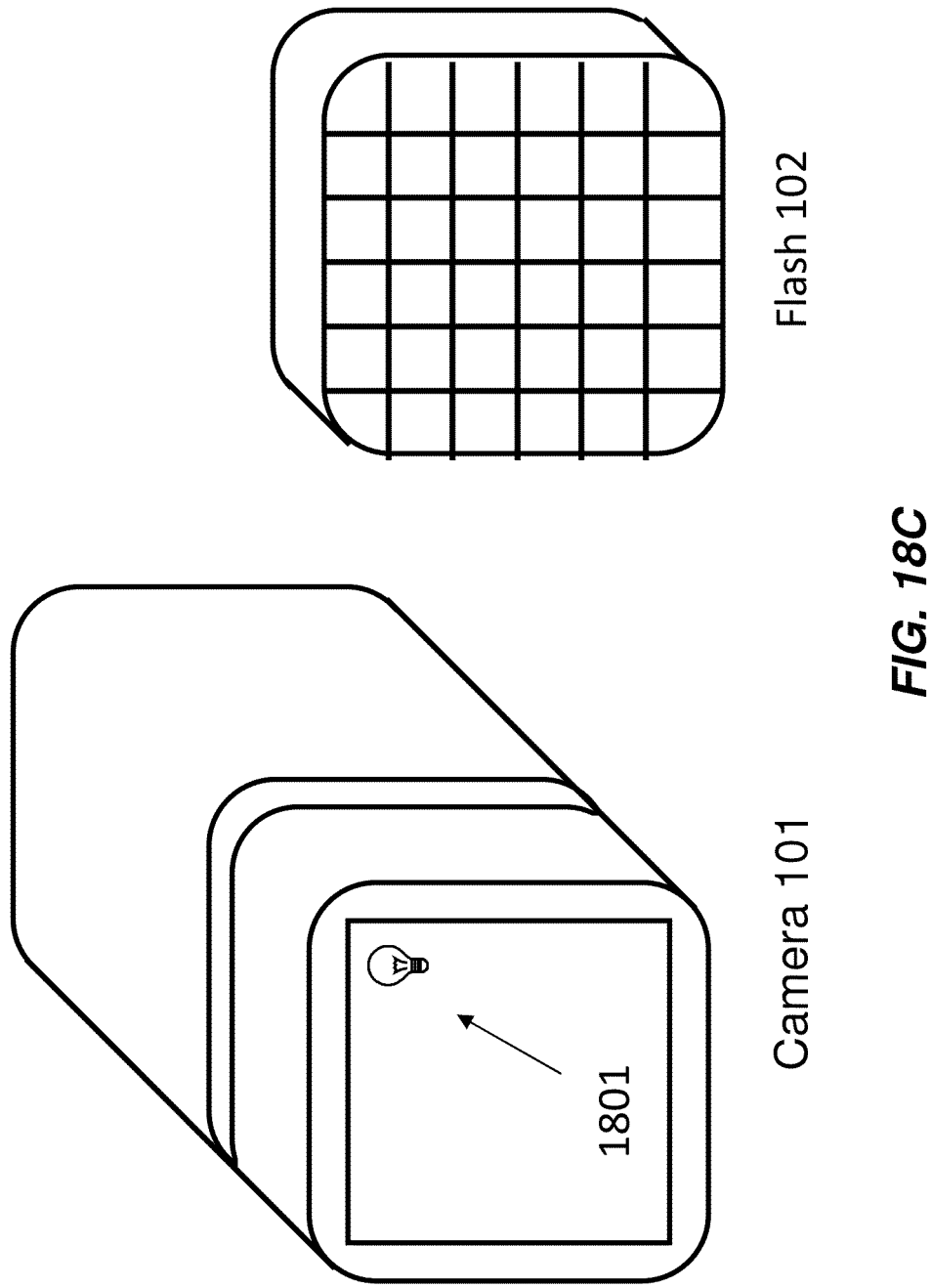

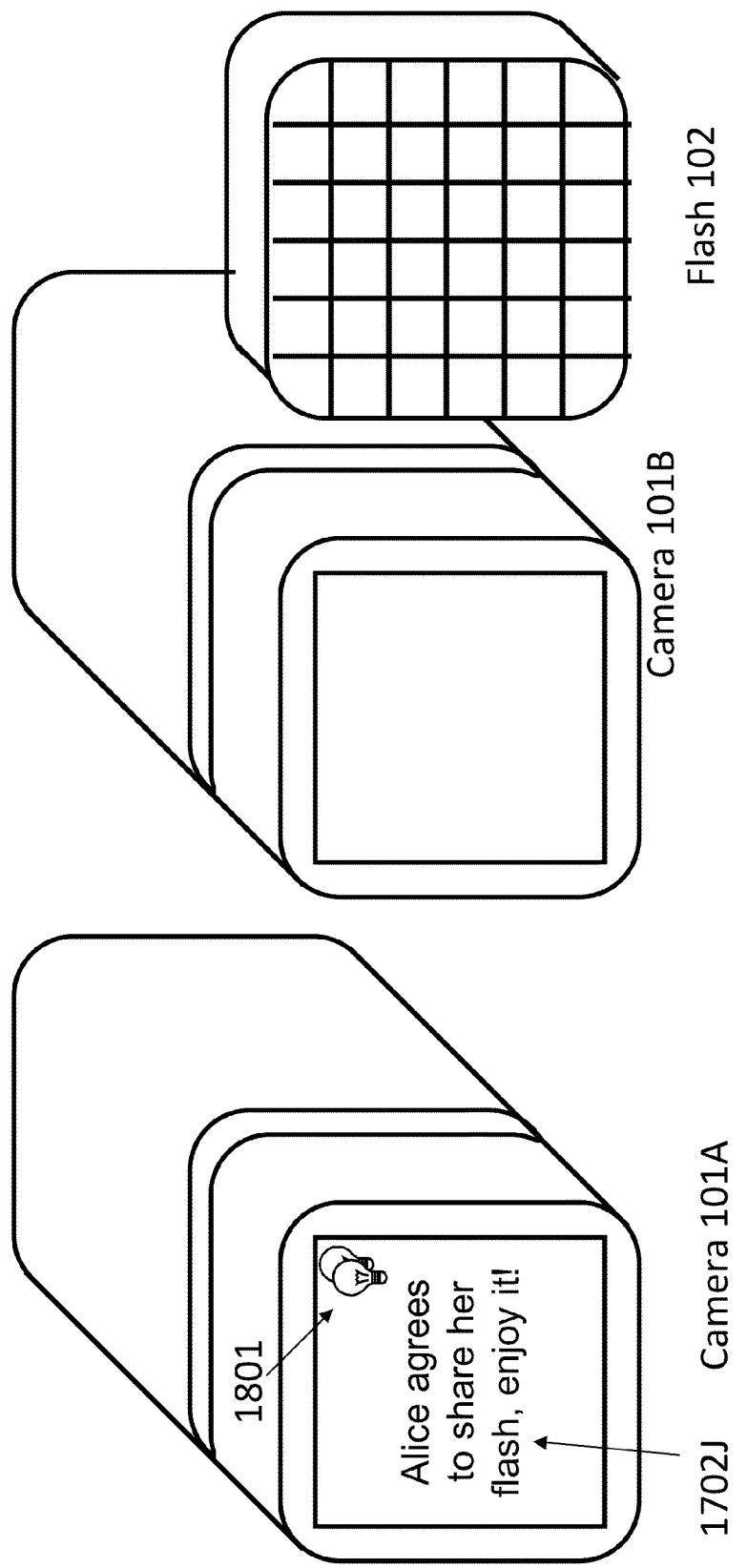

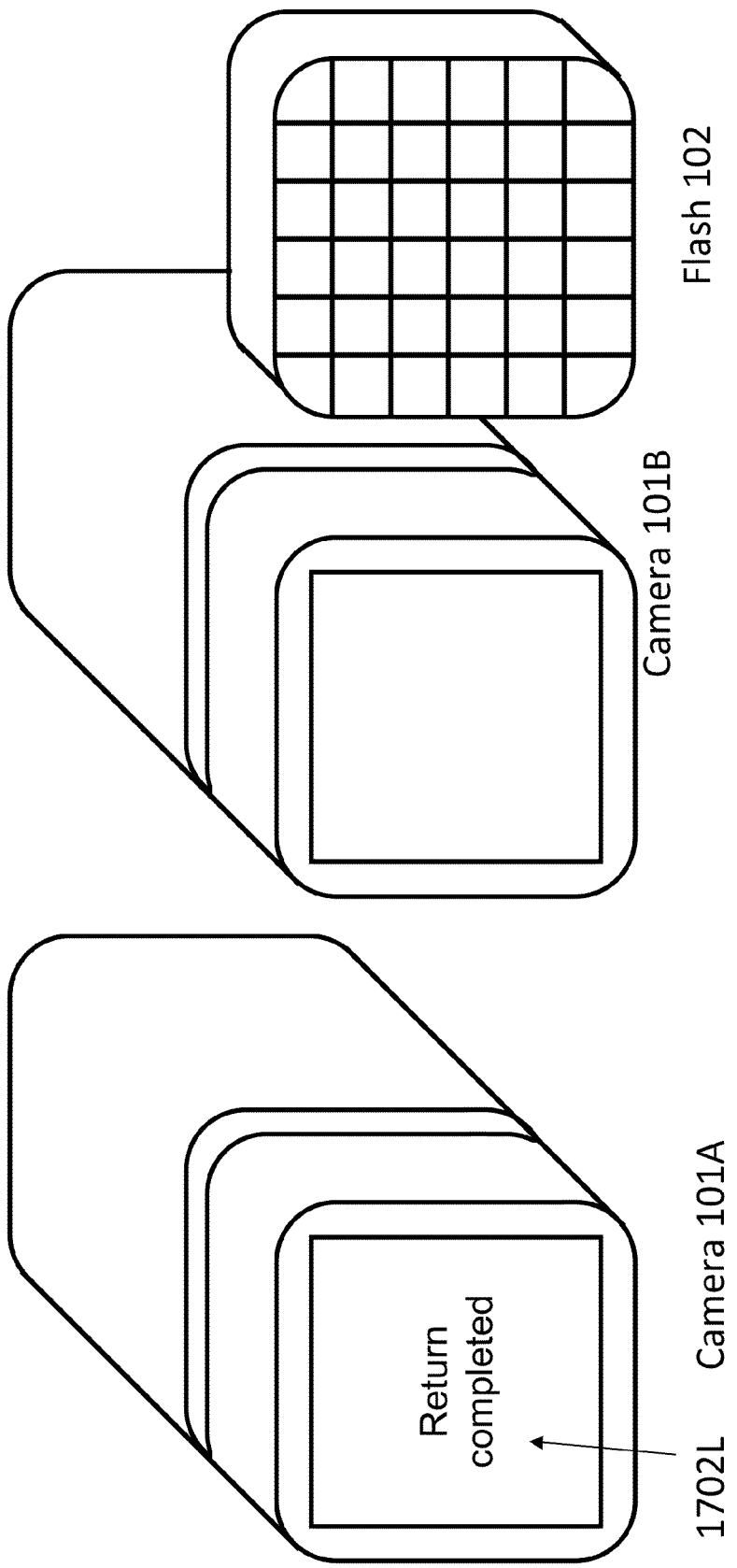

CAPTURING AND RELIGHTING IMAGES USING MULTIPLE DEVICES

CROSS-REFERENCE TO RELATED APPLICATIONS

The present application is related to the following patent applications, the disclosures of which are incorporated herein by reference:

U.S. Utility application Ser. No. 11/948,901 for "Interactive Refocusing of Electronic Images," filed Nov. 30, 2007;

U.S. Utility application Ser. No. 12/703,367 for "Light-field Camera Image, File and Configuration Data, and Method of Using, Storing and Communicating Same," filed Feb. 10, 2010;

U.S. Utility application Ser. No. 13/027,946 for "3D Light-field Cameras, Images and Files, and Methods of Using, Operating, Processing and Viewing Same" filed Feb. 15, 2011;

U.S. Utility application Ser. No. 13/155,882 for "Storage and Transmission of Pictures Including Multiple Frames," filed Jun. 8, 2011;

U.S. Utility application Ser. No. 13/523,776 for "Selective Transmission of Image Data Based on Device Attributes," filed Jun. 14, 2012; and U.S. Utility application Ser. No. 13/688,026 for "Extended Depth Of Field And Variable Center Of Perspective In Light-Field Processing," filed Nov. 28, 2012.

FIELD OF THE INVENTION

The present invention relates to systems and methods for capturing image data using multiple devices, and for coordinating such devices for the capture of image data.

BACKGROUND

For many types of images, it is useful to capture image data using multiple devices. Such devices include, for example, image capture devices (cameras and the like) and/or lighting devices (flashes and the like). Such image data may be captured sequentially or concurrently. Capture of multiple images using multiple devices allows for many useful processing techniques, including, for example, generation of composite imagery wherein the multiple images are processed and combined, as well as generation of interactive imagery that allows a user to provide input and thereby affect the way the image is presented.

One application that is of particular use is relighting, wherein the lighting characteristics of an image can be controlled, changed, and/or made interactive. In general, relighting effects rely on the capture of multiple images, wherein each image has different lighting characteristics. The resulting set of images can be processed, assembled, related to one another, and/or otherwise manipulated in various ways.

Existing relighting techniques include interactive approaches wherein images with different lighting characteristics are combined differently depending on user input. For example, in response to a user moving a slider or other control, different images can be combined with different relative weights, so as to change the lighting characteristics of the resultant combined image. Various types of filters can be applied to broaden or narrow the lighting characteristics for each component image, and thereby attain sharper or flatter lighting in the resultant image. Additional techniques are described, for example, in Ng et al., "All-Frequency Shadows Using Non-linear Wavelet Lighting Approximation", ACM Transactions on Graphics, July 2003; and Ng et al., "Triple Product Wavelet Integrals for All-Frequency Relighting", ACM Transactions on Graphics, July 2004.

It is also known to combine multiple images to generate a light-field picture, which can then be presented in an interactive manner that allows for selective refocusing, relighting, and/or other effects. The above-referenced U.S. Utility Patent Applications provide several examples of mechanisms by which multiple images can be acquired, combined, stored, and used.

In general, light-field photography captures information about the direction of light as it arrives at a sensor within a data acquisition device such as a light-field camera. Such light-field data can be used to create representations of scenes that can be manipulated by a user. Subsequent to image capture, light-field processing can be used to generate images using the light-field data. Various types of light-field processing can be performed, including for example refocusing, aberration correction, 3D viewing, parallax shifting, changing the viewpoint, and the like. Many of these and other techniques are described in the above-referenced U.S. Utility Patent Applications. In addition, images from multiple capture devices can be combined to generate a "bullet-time" effect, wherein an apparent camera angle for a scene can be changed independently of the action taking place in the images themselves. This gives the impression that the camera is moving around a still image (or a moving image, such as one presented in slow motion). Bullet-time can be applied to still or moving images.

All of these effects and approaches require the collection of multiple images having different characteristics, such as different lighting positions and/or camera positions. Collection of images having different lighting characteristics must be done sequentially, as it is not generally possible to capture multiple images having different lighting characteristic at the same time; the subject can only be lit in one particular way at a given time. Existing techniques for collection of multiple images for image relighting and/or bullet-time involve specialized systems for implementing multi-camera and/or multi-flash imaging; these typically require expensive, cumbersome equipment, and significant effort to setup the lighting environment and subjects. These constraints make such advanced imaging techniques inaccessible to many ordinary consumers.

In addition, existing techniques fail to provide an easy way to configure devices (such as cameras, flashes, and the like) to communicate with one another in a manner that facilitates the capture of images.

In addition, existing techniques fail to provide an effective mechanism for assembling multiple images captured using multiple devices with one another for presentation to the user. Existing techniques also fail to provide an effective mechanism for providing interactive presentation of such assembled images.

SUMMARY

According to various embodiments of the invention, a system and method are provided for coordinating image capture using multiple devices, including for example multiple image capture devices (cameras), multiple lighting devices (flashes), and/or the like.

In at least one embodiment, the system of the present invention is configured to collect image information from multiple image capture devices, such as light-field cameras and/or other cameras, and/or to collect multiple images having different lighting configurations. The collected image data can be processed to generate various effects, such as relighting, parallax, refocusing, and/or three-dimensional effects, and/or to introduce interactivity into the image presentation.

Thus, according to various embodiments, systems and methods are provided for coordinating and/or controlling image data acquisition for various configurations of image capture devices, wherein each image capture device may be, for example, a light-field camera that acquires light-field image data for a given scene. In at least one embodiment, such multiple image capture devices have coordinated control and image data capture.

In at least one embodiment, the system of the present invention is implemented using any combination of any number of image capture device(s) and/or flash (lighting) device(s), which may be equipped to communicate with one another via any suitable means, such as wirelessly. A communication protocol is established for enabling such communication, such as WiFi, Bluetooth, or any other suitable protocol.

In at least one embodiment, a computing device or other controller issues commands to the various devices of the system, to cause the flash device(s) to activate and to cause the image capture device(s) to capture images. The various illumination and capture events are coordinated with one another so as to enable the capture of multiple images that can subsequently be processed and integrated with one another.

The controller can also issue commands regarding the positioning of image capture device(s) and/or flash device(s). Such commands can cause image capture device(s) and/or flash device(s) to automatically move into a suitable position based on the lighting requirements and/or image capture requirements determined by the controller. Alternatively, the commands can be presented as output to a user, who is instructed to place the equipment in a particular position (or a sequence of positions). In at least one embodiment, the system can be configured to automatically capture an image once a user has complied with a positioning instruction. In another embodiment, the system can be configured to automatically capture images based on a current position of one of more devices, regardless of whether the user was instructed to place the device at a particular location. Thus, for example, the user can wave a flash around as he or she wishes, and the system can repeatedly activate the flash and the image capture device(s) while the user waves the flash around, so as to capture a series of images having different flash locations.

According to various embodiments, the present invention also provides mechanisms for collecting captured images and for relating captured images to one another. For example, such collection can take place using cloud-based storage wherein a server-based apparatus manages storage and provides access to client machines for images for presentation to users thereon.

According to various embodiments, the present invention is directed to image processing and/or post-processing of image data acquired by one or more image capture devices as described herein. At least one embodiment of the present invention provides mechanisms for presenting living pictures using the stored image information, and for allowing for user interaction with such pictures. Such interaction can include, for example, scrolling, moving, relighting, activating, refocusing, and the like.

Accordingly, in various embodiments, the system of the present invention provides a mechanism by which image data can be captured using multiple devices, and by which such captured data can be processed and combined to generate robust, living pictures. The use of such a system in connection with light-field image data is merely an example of one possible use.

The present invention also provides additional advantages, as will be made apparent in the description provided herein.

One skilled in the art will recognize that the techniques for capturing, collecting, and processing image data, including light-field data, described herein can be applied to other scenarios and conditions, and are not limited to the specific examples discussed herein. For example, the techniques are not limited to light-field pictures, but can also be applied to images taken by conventional cameras and other imaging devices, whether or not such images are represented as light-field data.

BRIEF DESCRIPTION OF THE DRAWINGS

The accompanying drawings illustrate several embodiments of the invention and, together with the description, serve to explain the principles of the invention according to the embodiments. One skilled in the art will recognize that the particular embodiments illustrated in the drawings are merely exemplary, and are not intended to limit the scope of the present invention.

FIGS. 8A to 8F depict another example of a series of relighted images, generated and presented according to one embodiment.

FIGS. 10A to 10E depict an example of a series of relighted images for a virtual environment, with sufficient filtering applied to avoid undue variations in image brightness.

FIGS. 18A through 18C illustrate a method of activating a paired flash, according to one embodiment.

FIGS. 21A through 21E illustrate a method of borrowing a flash to pair it with a camera, according to one embodiment.

FIGS. 22A through 22C illustrate a method of returning a borrowed flash, according to one embodiment.

DETAILED DESCRIPTION OF THE EMBODIMENTS

Terminology

Figure 1:
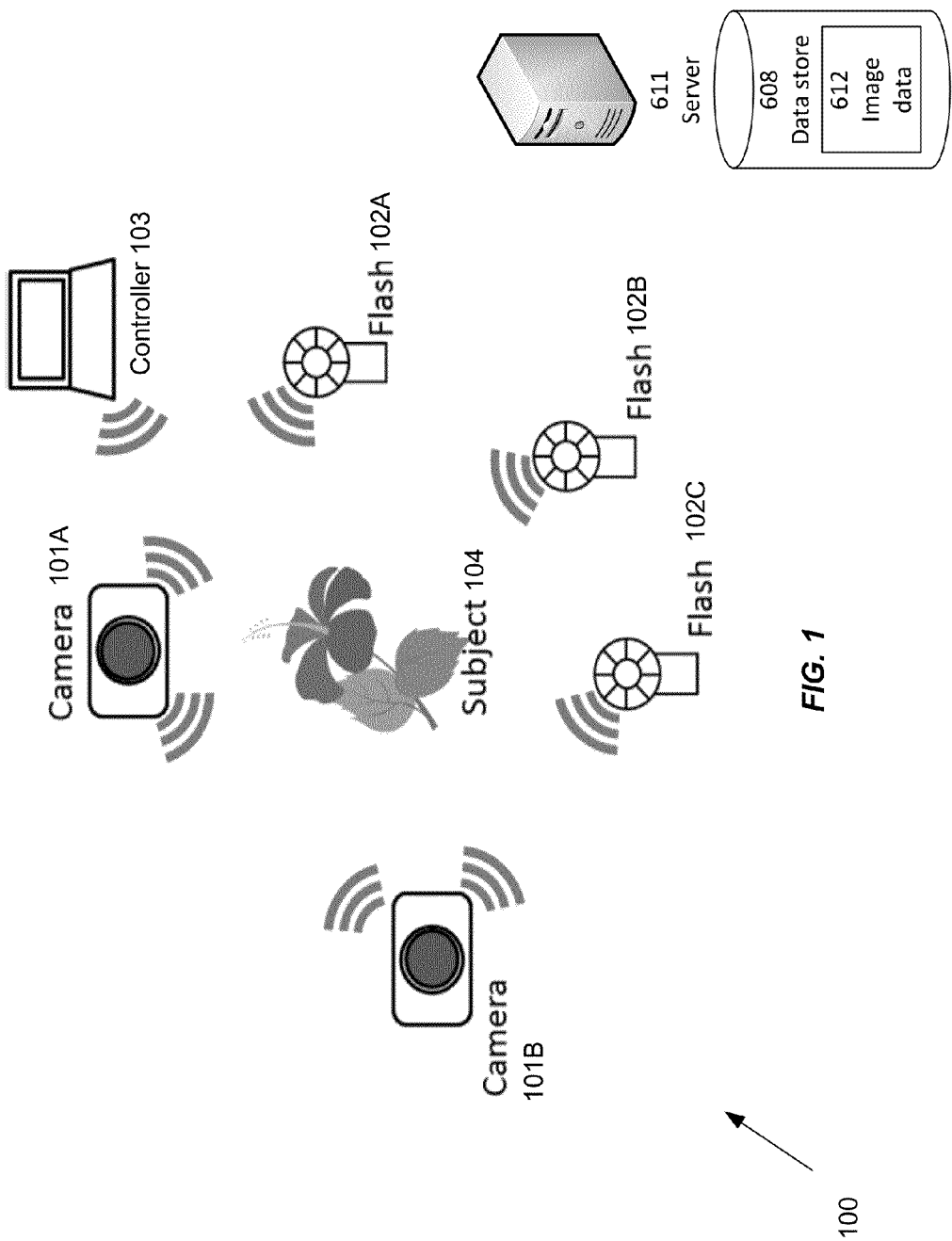
FIG. 1 depicts a conceptual architecture for implementing the present invention according to one embodiment.

The following terms are defined for purposes of the description provided herein:

Frame: a data entity (stored, for example, in a file) containing a description of the state corresponding to a single captured sensor exposure in a camera. This state includes the sensor image, and can also include other relevant camera parameters, specified as metadata. The sensor image may be either a raw image or a compressed representation of the raw image.

Picture: a data entity (stored, for example, in a file) containing one or more frames, metadata, and/or data derived from the frames and/or metadata. Metadata can include tags, edit lists, and/or any other descriptive information or state associated with a picture or frame.

Relighting Picture: a picture, wherein each of the one or more frames represents the same scene, but with different lighting Light-field: a collection of rays. A ray's direction specifies a path taken by light, and its color specifies the radiance of light following that path.

Light-field image: a two-dimensional image that spatially encodes a four-dimensional light-field. The sensor image from a light-field camera is a light-field image.

Light-field picture: a picture with one or more light-field frames. (A picture with a mix of two-dimensional and light-field frames is a light-field picture.)

Light-field camera: any device capable of capturing or acquiring light-field images for a scene.

In addition, for ease of nomenclature, the term "camera" is used herein to refer to an image capture device or other data acquisition device. Such a data acquisition device can be any device or system for acquiring, recording, measuring, estimating, determining and/or computing data representative of a scene, including but not limited to two-dimensional image data, three-dimensional image data, and/or light-field data. Such a data acquisition device may include optics, sensors, and image processing electronics for acquiring data representative of a scene, using techniques that are well known in the art. One skilled in the art will recognize that many types of data acquisition devices can be used in connection with the present invention, and that the invention is not limited to cameras. Thus, the use of the term "camera" herein is intended to be illustrative and exemplary, but should not be considered to limit the scope of the invention. Specifically, any use of such term herein should be considered to refer to any suitable device for acquiring image data.

In addition, for ease of nomenclature, the term "flash" is used herein to refer to any device for illuminating a subject or scene to be captured. One skilled in the art will recognize that many types of illumination devices, either fixed or mobile, can be used in connection with the present invention, and that the invention is not limited to operations with flashes. Thus, the use of the term "flash" herein is intended to be illustrative and exemplary, but should not be considered to limit the scope of the invention. Specifically, any use of such term herein should be considered to refer to any suitable illumination device.

System Architecture

Referring now to FIG. 1, there is shown a conceptual architecture for implementing the present invention according to one embodiment. In this example apparatus 100, two cameras 101A, 101B and three flash units 102A, 102B, 102C are included, as well as a controller 103 that can be implemented, for example, as a laptop computer or other computing device. One skilled in the art will recognize that this particular arrangement is exemplary, and that any number of cameras 101 and flash units 102 can be provided. In addition, a laptop computer is merely one example of a controller 103 that can be used for controlling the operation of cameras 101 and flash units 102; in other embodiments, any other controlling device can be used. Alternatively, no discrete controller can be provided, for example if one of the cameras 101 is able to issue commands controlling the operation of other components. Alternatively, controller 103 can be located remotely with respect to the other components of the system.

In at least one embodiment, the system can be implemented using stand-alone flash units 102 having the capabilities described herein. In another embodiment, the system can be implemented using a control unit with a hot shoe that can drive a conventional flash unit. The hot shoe can then implement the control logic, position determination, and communications capabilities described herein.

In at least one embodiment, any or all of the components depicted in FIG. 1 can be implemented as one or more mobile telephones, mobile computing devices, or similar devices. For example, a conventional smartphone can be programmed to perform the functions of the present invention, since it already contains an LED flash unit, camera, wireless communication components, position detection components, and inertial acceleration detection components.

The various system components depicted in FIG. 1 can be arranged around subject 104 in any arbitrary positions. In at least one embodiment, cameras 101, flash units 102, and controller 103 are adapted to communicate wirelessly with one another, using any suitable wireless communication protocol, such as for example WiFi, Bluetooth, or the like. In at least one embodiment, cameras 101 and flash units 102 are capable of being programmed in advance, and/or to respond to commands from controller 103 and/or from other sources. In at least one embodiment, cameras 101 and flash units 102 further include location sensing apparatus capable of determining, to some sufficient degree of accuracy, their positions in two- or three-dimensional space. In at least one embodiment, cameras 101 and flash units 102 further include locomotive ability to allow them to move to a specified position in response to commands received from controller 103. In at least one embodiment, cameras 101 and flash units 102 contain internal clocks that can be synchronized with one another, so as to allow for precise timing of image capture and subject illumination based on instructions received from controller 103.

Figure 24A:
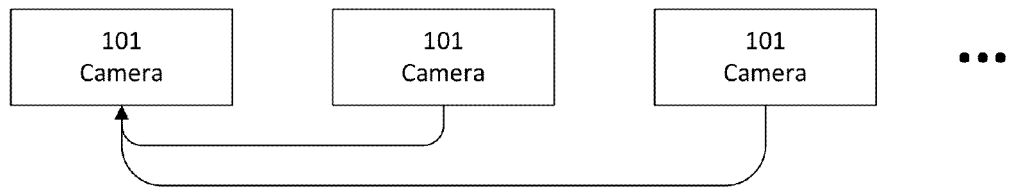
FIGS. 24A through 24C are block diagrams illustrating exemplary configurations for communication among a plurality of cameras according to various embodiments.
Figure 24B:
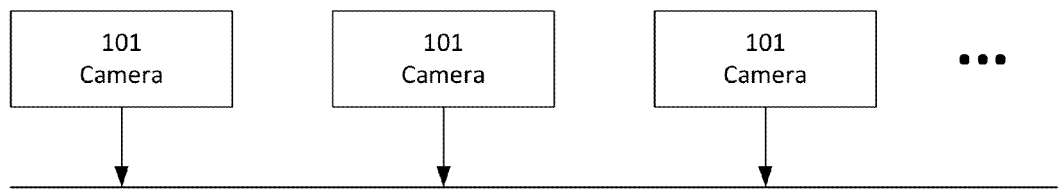
Figure 24C:
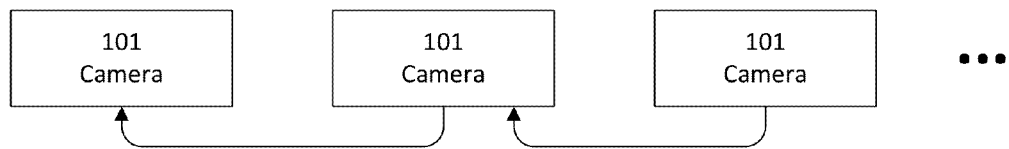

Referring now to FIGS. 24A through 24C, there are shown block diagrams illustrating exemplary configurations for communication among a plurality of cameras 101 according to various embodiments. In each of these configurations, a plurality of cameras 101, which may be light-field cameras or any other suitable image capture devices, are arranged so that cameras 101 can communicate with one another. In at least one embodiment, one camera 101 can be a primary camera 101, and can communicate, coordinate, and/or control one or more characteristics acquisition of image data of a scene by one or more other cameras 101. Any suitable communication technique or architecture may be employed. For example, FIG. 24A depicts a point-to-point architecture; FIG. 24B depicts a bus architecture; and FIG. 24C depicts a daisy-chain type architecture.

Figure 25A:
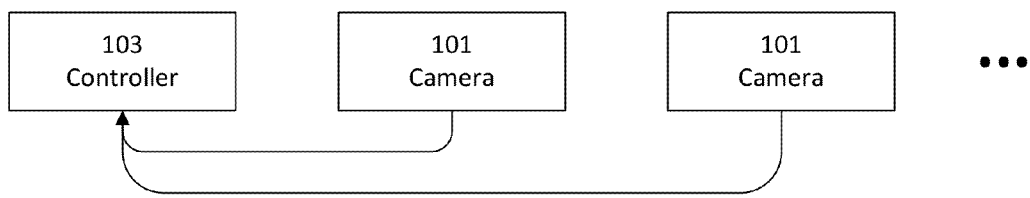
FIGS. 25A through 25C are block diagrams illustrating exemplary configurations for communication among a controller and a plurality of cameras according to various embodiments.
Figure 25B:
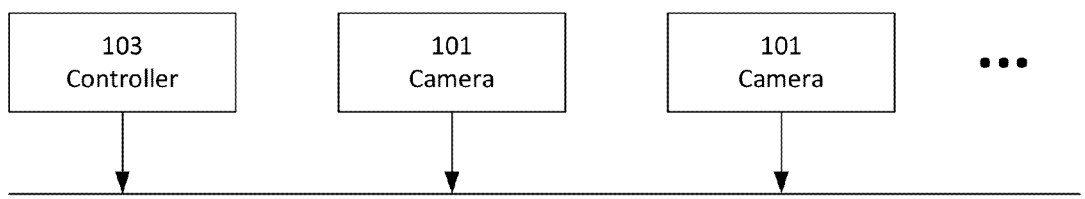
Figure 25C:
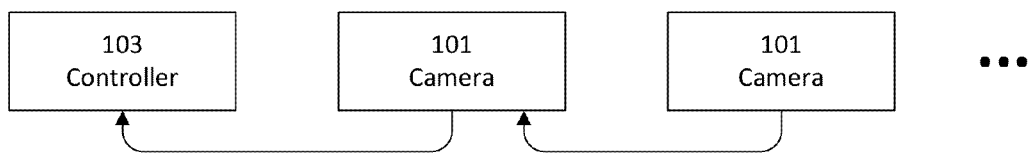

Referring now to FIGS. 25A through 25C, there are shown block diagrams illustrating exemplary configurations for communication among controller 103 and a plurality of cameras 101 according to various embodiments. In each of these configurations, a plurality of cameras 101, which may be light-field cameras or any other suitable image capture devices, are arranged so that cameras 101 can communicate with one another and with controller 103. In at least one embodiment, controller 103 communicates, coordinates, and/or controls one or more characteristics acquisition of image data of a scene by one or more cameras 101. Any suitable communication technique or architecture may be employed. For example, FIG. 25A depicts a point-to-point architecture; FIG. 25B depicts a bus architecture; and FIG. 25C depicts a daisy-chain type architecture.

Figure 26A:
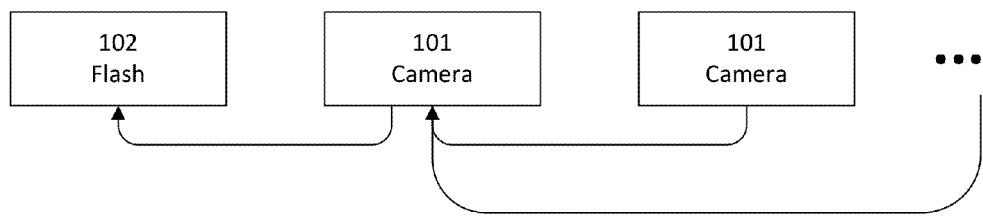
FIGS. 26A through 26F are block diagrams illustrating exemplary configurations for communication among, variously, a controller, one or more flash units, and a plurality of cameras according to various embodiments.
Figure 26B:
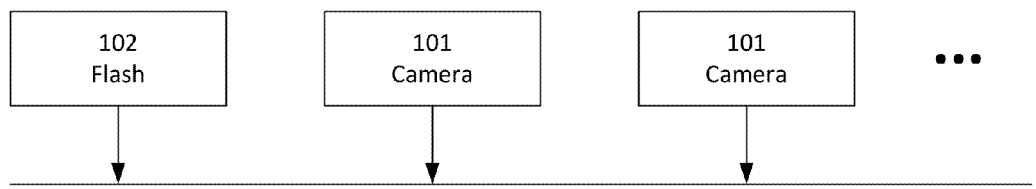
Figure 26C:
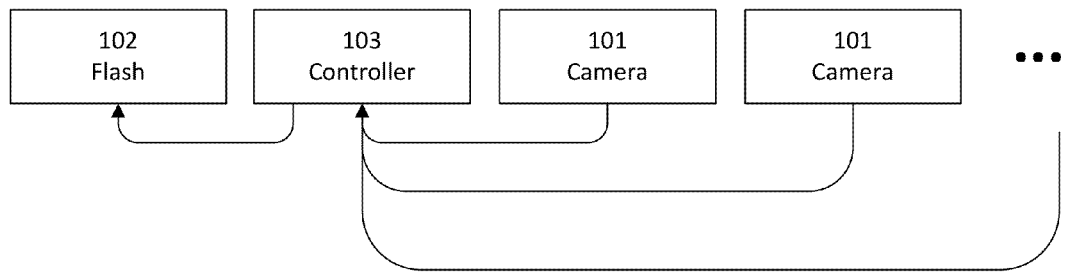
Figure 26D:
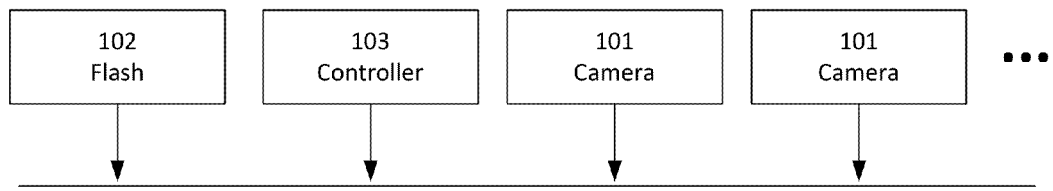
Figure 26E:
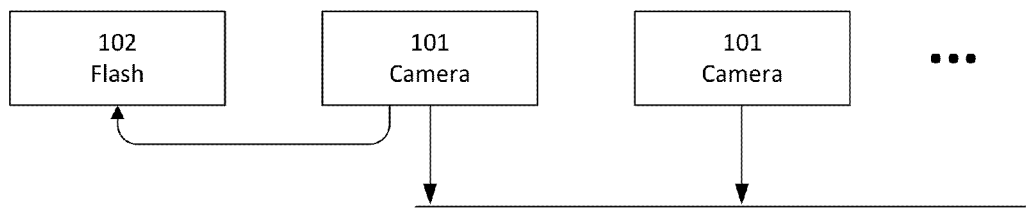

Referring now to FIGS. 26A through 26F, there are shown block diagrams illustrating exemplary configurations for communication among, variously, a controller 103, one or more flash units 102, and a plurality of cameras 101 according to various embodiments. In the configurations shown in FIGS. 26A, 26B, and 26E, a plurality of cameras 101, which may be light-field cameras or any other suitable image capture devices, are arranged so that cameras 101 can communicate with one another and with flash unit 102, which may be any suitable device for illuminating a scene for image capture. In at least one embodiment, one camera 101 can be a primary camera 101, and can communicate, coordinate, and/or control one or more characteristics acquisition of image data of a scene by one or more other cameras 101, and can also communicate with flash unit 102 to control the operation of flash unit 102. Any suitable communication technique or architecture may be employed. For example, FIG. 26A depicts a point-to-point architecture; FIG. 26B depicts a bus architecture; and FIG. 26E depicts a combination architecture.

In the configurations shown in FIGS. 26C, 26D, and 26E, a plurality of cameras 101, which may be light-field cameras or any other suitable image capture devices, are arranged so that cameras 101 can communicate with one another and with flash unit 102 and controller 103. In at least one embodiment, controller 103 communicates, coordinates, and/or controls one or more characteristics for acquisition of image data of a scene by one or more cameras 101, and can also communicate with flash unit 102 to control the operation of flash unit 102.

Figure 26F:
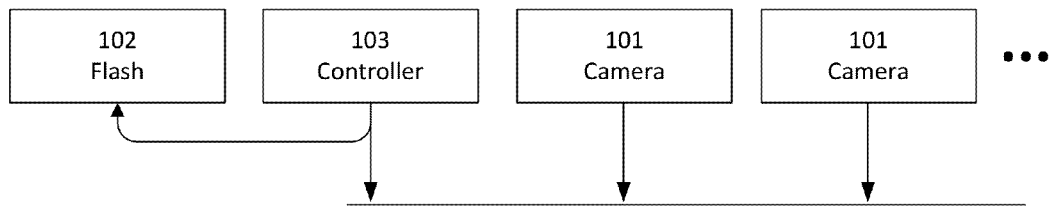

Any suitable communication technique or architecture may be employed. For example, FIG. 26C depicts a point-to-point architecture; FIG. 26D depicts a bus architecture; and FIG. 26F depicts a combination architecture.

Camera Architecture

Figure 23A:
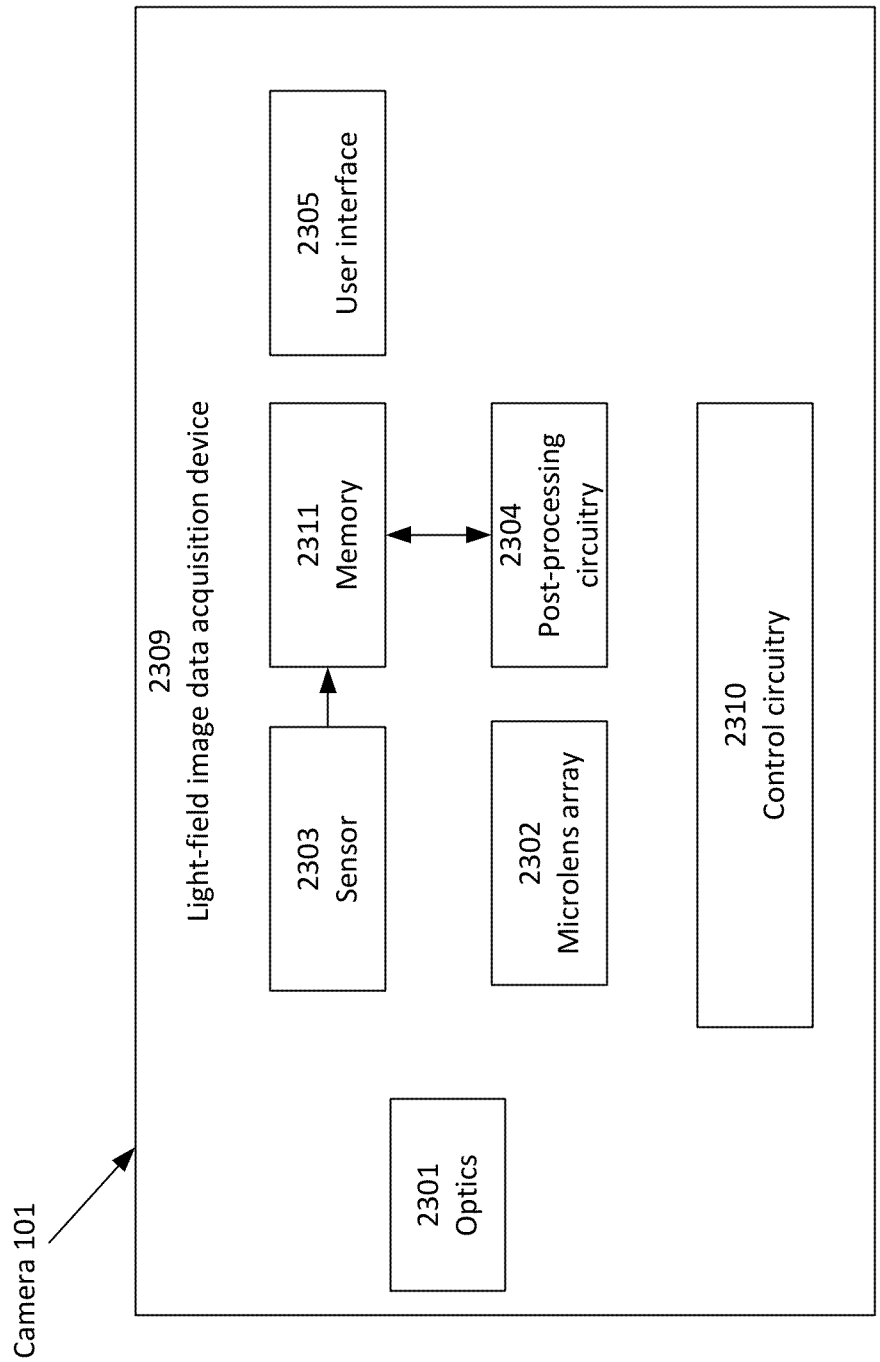
FIGS. 23A and 23B are block diagrams illustrating configurations for a light-field camera for implementing the present invention according to various embodiments.
Figure 23B:
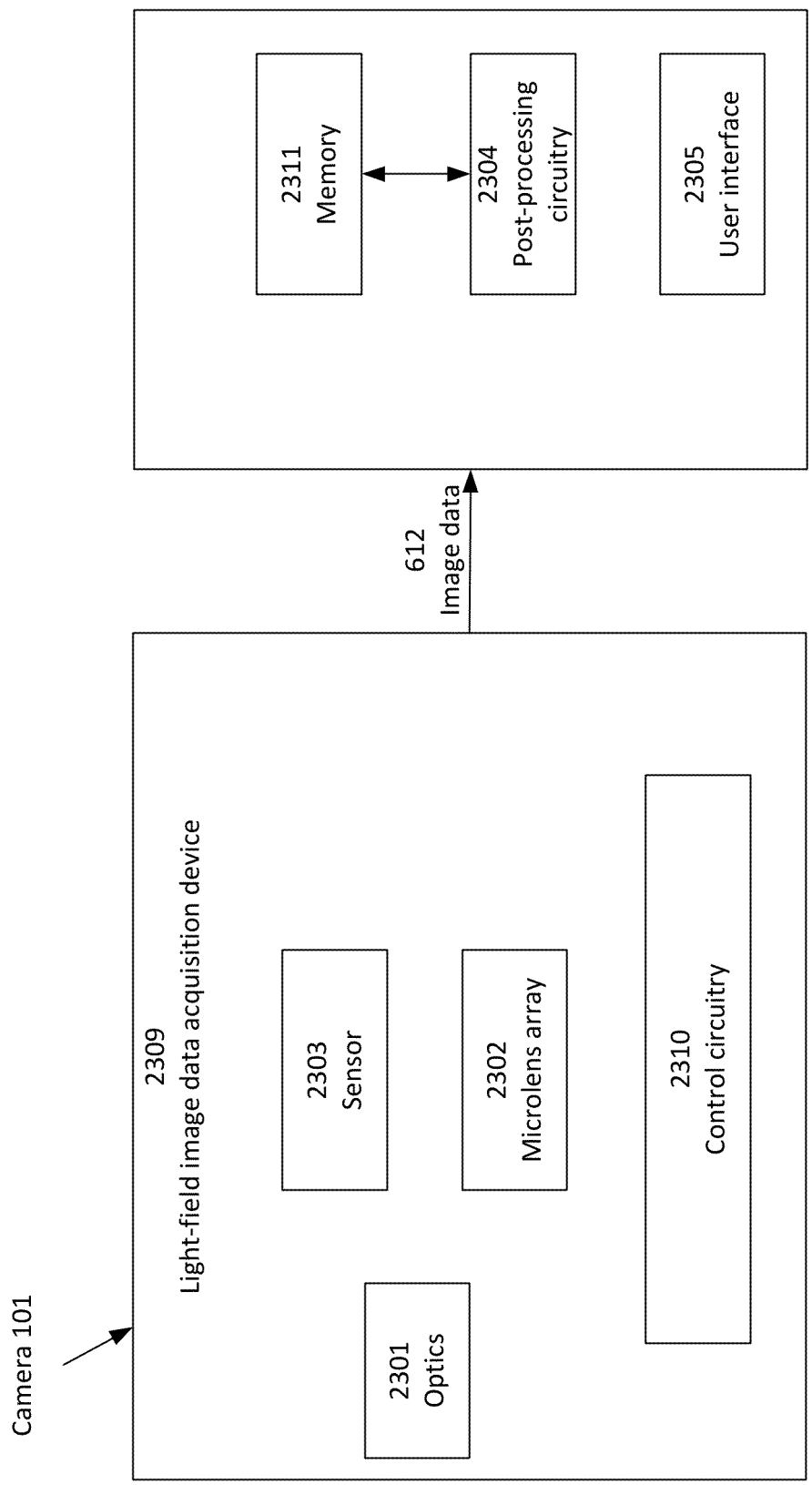

Each camera 101 in the system can be a light-field camera, conventional camera, or other image capture device. Referring now to FIGS. 23A and 23B, there are shown block diagrams illustrating configurations for a light-field camera 101 that can be used for implementing the present invention according to various embodiments. One skilled in the art will recognize that the particular configurations shown in FIGS. 23A and 23B are merely exemplary, and that other architectures are possible for camera 101. One skilled in the art will further recognize that several of the components shown in the configurations of FIGS. 23A and 23B are optional, and may be omitted or reconfigured.

In at least one embodiment, camera 101 may be a light-field camera that includes light-field image data acquisition device 2309 having optics 2301, image sensor 2303 (including a plurality of individual sensors for capturing pixels), and microlens array 2302. In at least one embodiment, microlens array 2302 may be disposed and/or incorporated in the optical path of camera 101 so as to facilitate acquisition, capture, sampling of, recording, and/or obtaining light-field image data via sensor 2303. In at least one embodiment, light-field camera 101 may also include a user interface 2305 for allowing a user to provide input for controlling the operation of camera 101 for capturing, acquiring, storing, and/or processing image data.

In at least one embodiment, light-field camera 101 may also include control circuitry 2310 for facilitating acquisition, sampling, recording, and/or obtaining light-field image data. For example, control circuitry 2310 may manage and/or control (automatically or in response to user input) the acquisition timing, rate of acquisition, sampling, capturing, recording, and/or obtaining of light-field image data.

In at least one embodiment, camera 101 may include memory 2311 for storing image data 612, such as output by image sensor 2303. Such memory 2311 can include external and/or internal memory. In at least one embodiment, memory 2311 can be provided at a separate device and/or location from camera 101.

For example, camera 101 may store raw light-field image data, as output by sensor 2303, and/or a representation thereof, such as a compressed image data file. In addition, as described in related U.S. Utility application Ser. No. 12/703,367 for "Light-field Camera Image, File and Configuration Data, and Method of Using, Storing and Communicating Same," filed Feb. 10, 2010, memory 2311 can also store data representing the characteristics, parameters, and/or configurations (collectively "configuration data") of device 2309.

Camera 101 can store the light-field image data and/or configuration data in accordance with the features describing the above-cited related application. All permutations and combinations of data storage formats for light-field image data and/or representations thereof are intended to fall within the scope of the present inventions.

In addition thereto, or in lieu thereof, camera 101 may upload light-field image data 612 for a scene (along with configuration data, in at least one embodiment) to server 611 for processing thereon, and/or to the Internet, network, or any other suitable destination for further processing and/or storage. In this way, others may access, view, and/or display images of the scene generated based on the light-field image data 612. In at least one embodiment, others may manipulate and/or edit light-field image data 612 to generate related images (for example, relighted images, and/or images having different focus, focus depth, color characteristics, and/or the like). Such related images (or data representing such related images) can be transmitted or downloaded to a local device and/or stored in such a manner as to make them available via the Internet or via some other suitable network.

In at least one embodiment, captured image data is provided to post-processing circuitry 2304. Such circuitry 2304 may be disposed in or integrated into light-field image data acquisition device 2309, as shown in FIG. 23A, or it may be in a separate component external to light-field image data acquisition device 2309, as shown in FIG. 23B. Such separate component may be controller 103, server 611, or any other suitable component, and may be local or remote with respect to light-field image data acquisition device 2309. Any suitable wired or wireless protocol can be used for transmitting image data 612 to circuitry 2304; for example, controller 103 and/or one of cameras 101 can transmit image data 612 and/or other data via the Internet, a cellular data network, a WiFi network, a BlueTooth communication protocol, and/or any other suitable means.

In at least one embodiment, light-field camera 101 may also output or provide data describing characteristics, parameters, and/or configurations of light-field image data acquisition device 2309. Such data can be descriptive or representative of an optical and/or geometric model of light-field image data acquisition device 2309, including optics 2301, sensor 2303, and/or relative distances between components of device 2309. As described in related U.S. Utility application Ser. No. 12/703,367 for "Light-field Camera Image, File and Configuration Data, and Method of Using, Storing and Communicating Same," filed Feb. 10, 2010, the configuration data describing device 2309 may be used to determine, analyze, and/or interpret the ray geometry corresponding to one, some, or all of image sensor pixel values associated with sensor 2303. For example, the configuration data may be used to generate, derive, calculate, estimate, and/or determine an optical and/or geometric model of camera 101, and/or to generating, manipulate, and/or edit light-field image data associated with or corresponding to the optical and/or geometric model of camera 101. In addition, such operations can be used in generating, manipulating, and/or editing image data 612 as described the above-cited related applications.

In at least one embodiment, light-field data, including information representing the color characteristics and/or illumination characteristics of a scene acquired by one or more of camera(s) 101, may be employed to manipulate and/or edit light-field image data 612 acquired by a different one of camera(s) 101. Color and/or illumination characteristics of one or more aspects of the scene may thus be employed in conjunction with light-field image data acquired by a different one of camera(s) 101 to, after initial acquisition or recording of light-field image data 612, generate an image that is relighted and/or that has color characteristics which are different from those characteristics of the initially acquired image.

Messages

In at least one embodiment, camera 101 is configured to operate in communication with any number of flash units 102. Flash unit(s) 102 may be configured to provide illumination during acquisition of image data by camera 101, with appropriate communication between components to ensure proper timing of illumination and image capture.

In at least one embodiment, controller 103 sends messages, or control signals, to cameras 101 and flash units 102 via a wireless communication protocol. Control circuitry to coordinate and/or control cameras 101 and/or flash units 102 can use any suitable communication technique, architecture, and/or type, including both wired and/or wireless mechanisms. Messages are used for coordinating the various devices of the system to perform several operations in capturing data, including but not limited to:

Update a global reference clock for all devices.
  Assign a camera 101 to capture an image of subject 104 at a specific time and with specific parameters.
  Assign a flash unit 102 to activate at a specific time and/or position, with a specific duration and intensity.

In at least one embodiment, controller 103 issues such messages to cameras 101 and flash units 102, but cameras 101 and flash units 102 can perform the specified tasks based on their own capabilities and characteristics; thus, the particulars of how the tasks are performed may be implementation-dependent. The system of the present invention is thus able to operate in connection with any cameras 101 and/or flash units 102 that can perform the specified operations in response to received messages.

In an alternative embodiment, one camera 101 may send messages to other camera(s) 101 and/or flash unit(s) 102 to control their operation. In an alternative embodiment, one flash unit 102 may send messages to other flash unit (s) 102 and/or camera(s) 101 to control their operation.

There are many possible scenarios in which messages can be issued by controller 103 to control operation of other system components. Examples include:

Relighting capture with static flash units 102: The user sets up a single camera 101 and multiple flash units 102, and instructs camera 101 to initiate a relighting mode. Camera 101 automatically activates or detects the wireless network and finds available flash units 102. When the user presses a shutter button on camera 101, camera 101 sends commands to flash units 102 to cause them to fire sequentially; as each flash unit 102 fires, camera 101 captures an image. Such a scenario can operate with controller 103 sending messages to other components, or by camera 101 sending messages to flash units 102.
  Relighting capture with mobile flash unit 102: This scenario can operate with a single camera 101 and single flash unit 102. The user instructs camera 101 to initiate a relighting mode. A sequence of images is captured, with flash unit 102 being positioned at different locations for each image. In at least one embodiment, the camera 101, or controller 103, or some other device (such as a smartphone) can instruct the user as to where to place flash unit 102 for the next image; the user can move flash unit 102 manually or with mechanical assistance. In another embodiment, flash unit 102 can move automatically in response to commands from controller 103 or camera 101. In another embodiment, the user can manually move flash unit 102 as he or she wishes, and camera 101 can be configured to automatically capture images at predefined time or distance intervals, or when the camera/flash configuration satisfies certain conditions.
  Capture of images from multiple cameras 101: Multiple cameras 101 can be set up in fixed locations. The user instructs cameras 101 to enter a burst-shot mode; this can be done by interacting with controller 103 or with one or more of the configured cameras 101. In response to the user's input, cameras 101 start image capture automatically in a specified order, so as to capture the scene from different angles. In at least one embodiment, the user need not activate each camera 101 individually; rather, the image capture takes place automatically under the direction of one camera 101 or controller 103, communicating with other cameras 101 wirelessly. Image capture from all cameras 101 can be sequential or simultaneous.

Capture of images from multiple cameras 101 with multiple flash units 102: In this scenario, multiple cameras 101 and multiple flash units 102 are available. According to the techniques of the present invention, any number of images can be captured from various static and/or moving viewpoints, either sequentially or simultaneously. If desired, multiple images can be captured from any particular viewpoint, with different flash units 102 firing for each image. This allows collection of a robust set of data that can be used for relighting and/or other effects.

One skilled in the art will recognize that other scenarios are possible. For example, messages can be used for controlling strength and/or amount of illumination output by one or more flash unit(s) 102, as well as timing of image capture, for example relative to activation of flash unit(s) 102.

In at least one embodiment, captured images from multiple cameras 101 are transmitted to server 611 for collection and storage at data store 608 associated with server 611. Transmission can take place according to any suitable means. For example, images can be transmitted wirelessly from camera 101, or via a wired connection. Transmission can be made over the Internet, cellular network, WiFi, and/or any other suitable medium. In at least one embodiment, images can be transmitted to controller 103, which then relays the images to server 611. Image data 612 can be stored at data store 608 using any suitable format; for example, images can be stored as JPEGs or any other format. Image data 612 can include metadata to specify lighting conditions, time of capture, subject information, and the like for each captured image.

In at least one embodiment, image data 612 can also include metadata or tags to relate individual images to one another, for example to establish a relationship among several images of the same subject, so as to facilitate aggregation of multiple images in presenting relighted images. For example, metadata can be provided to indicate the relative positions of cameras 101 and/or flashes 102 with respect to subject 104 when a particular image was taken. As another example, metadata can include pointers to other images that may have been taken of the same subject 104, for example during the same session. Such metadata allows for generation and display of relighted images, including interactive presentations, wherein multiple images (or portions thereof) are combined with one another to represent new views of subject 104 with different lighting conditions. As described in more detail herein, image or post-processing circuitry can manipulate and/or edit image data 612 acquired by camera(s) 101 to generate related images (including, for example, relighted images).

In at least one embodiment, camera(s) 101 and/or flashes 102 contain GPS units and/or accelerometers that allow their position(s) and/or orientation(s) to be determined. In at least one embodiment, a calibration step can be performed wherein camera(s) 101 and/or flashes 102 can be bumped against one another to zero their coordinates with respect to one another. After the calibration, the locations can be estimated via the accelerometer and GPS units.

In at least one embodiment, server 611 and/or data store 608 can be omitted, and image data 612 can be stored at some other suitable location, such as at controller 103, or at one or more of the cameras 101 or flashes 102, or another system component.

In at least one embodiment, processing and generation of relighted images can take place at server 611 or at any other suitable location. In at least one embodiment, such processing takes place in a distributed collection of servers and/or other computing devices, according to known techniques for distributed computing.

One skilled in the art will recognize that any of the above architectures and arrangements can be used for implementing the present invention. In at least one embodiment, the system and method of the present invention are directed toward circuitry and techniques for coordinating and/or controlling image data acquisition in a system that including any number of cameras 101 and/or flash units 102. In at least one other embodiment, the system and method of the present invention are directed toward image and/or post-processing of light-field image data or information acquired by one or more cameras 101. Such configurations may include, for example, a plurality of light-field cameras 101 wherein each light-field camera 101 acquires or captures light-field data for the same scene. The light-field cameras may, for example, acquire light-field image data for a scene from a different perspective or viewpoint, or having different lighting characteristics.

In at least one embodiment, the circuitry and techniques of the present invention can be implemented in one of light-field cameras 101 which coordinates and/or controls acquisition of light-field data by one or more other light-field cameras 101, and can also control operation of one or more flash units 102. In at least one other embodiment, the circuitry and techniques of the present invention can be implemented in a stand-alone controller 103 for controlling one or more light-field cameras 101, and one or more flash units 102.

As described in more detail below, in at least one embodiment, the system and method of the present invention can coordinate and/or control one or more of the following characteristics of the acquisition of image data by one or more cameras 101 and using one or more flash units 102:

flash or illumination source;
timing of image capture;
field of view;
focus; and/or
focus depth.

For example, in at least one embodiment, control circuitry at one of cameras 101 or at controller 103 can transmit signals to coordinate and/or control any or all of:

the timing of engaging or enabling flash 102;
the strength and/or amount of illumination output by flash 102;
the timing of image capture by camera 101, for example relative to engaging or enabling flash 102;
field of view;
focus; and/or
focus depth.

In this way, image capture among multiple cameras 101, and/or using multiple flash units 102, can be performed in a coordinated manner. Thereafter, image or post-processing circuitry 2307 can manipulate and/or edit image data 612 acquired by camera(s) 101 to generate related images (for example, images having different field of view, focus, focus depth, and/or lighting characteristics).

Circuitry for controlling camera(s) 101 and flash unit(s) 102 may user any suitable communication technique, architecture, and/or type, whether wired or wireless.

One skilled in the art will recognize that many other scenarios can be implemented using the techniques of the present invention, based on various combinations of fixed and/or mobile components.

Method

Figure 2:
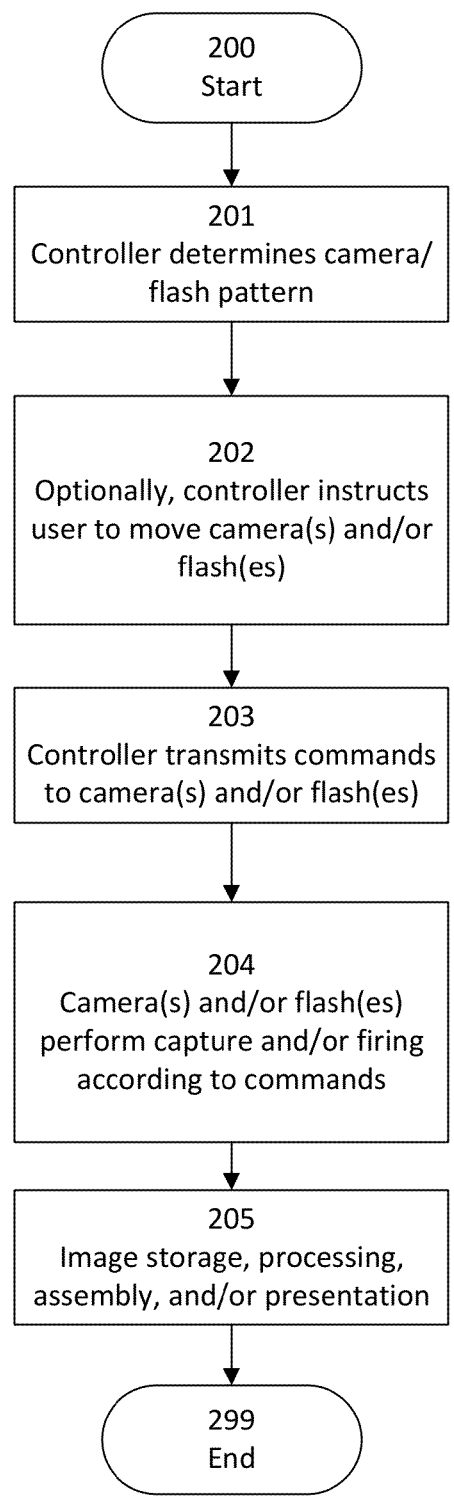
FIG. 2 depicts a method for implementing the present invention according to one embodiment.

Referring now also to FIG. 2, there is shown an example of a method of capturing images using multiple devices according to one embodiment. The method of FIG. 2 can be implemented in connection with an arrangement such as shown in FIG. 1, or in connection with any other suitable arrangement. For example, although FIG. 2 refers to controller 103 performing several of the steps, such steps can instead be performed by any other component, such as for example camera 101 or flash unit 102.

Controller 103 determines 201 a camera/flash pattern for image capture. The pattern can be determined automatically, or in response to user input, or by some combination of the two (for example, determined automatically in response to parameters provided by the user). Step 201 can take into account any suitable factors and considerations, such as for example the storage budget, time constraints, feasibility of user interaction, mobility of components including camera(s) 101 and flash(es) 102, position detection capability of components, and the like.

Controller 103 can optionally instruct 202 the user to move camera(s) 101 and/or flash(es) 102 in accordance with the determined pattern. Such a step may be useful, for example, if there are not enough camera(s) 101 and/or flash(es) 102 to perform all of the desired image capture operations from fixed locations. In at least one embodiment, the user can be given instructions via a screen on controller 103, and/or on camera(s) 101 and/or flash(es) 102 themselves, indicating a direction and amount of movement desired. The user can also be given feedback to confirm correct positioning, direction of movement, and the like; additional, different feedback can be provided if the user moves a component in the wrong direction. Instructions and/or feedback can be provided via visual, auditory, and/or haptic means; for example, in at least one embodiment, an audible beep may confirm correct positioning of a component. In another embodiment, camera(s) 101 and/or flash(es) 102 may have locomotive capability, obviating the need to instruct the user to move them manually.

Controller 103 transmits 203 commands to camera(s) 101 and/or flash(es) 102 to cause them to perform operations in accordance with the determined pattern. Such commands can include commands to camera(s) 101 to capture images, and/or commands to flash(es) 102 to fire. In at least one embodiment, these commands include one or more imaging messages that cause a sequence of events to take place. For example, referring to the example architecture of FIG. 1, examples of such messages include:

Message to camera(s) 101A, 101B to capture images at times T1, T2, etc.; this causes camera(s) 101A, 101B to use their internal clocks to capture images at the designated times.

Message to camera(s) 101A, 101E to capture images now; this causes camera(s) 101A, 101E to immediately capture images.

Message to flash(es) 102A, 102B, 102C to fire at times T1, T2, etc.; this causes flash(es) 102A, 102B, 102C to use their internal clocks to capture images at the designated times.

Message to flash(es) 102A, 102B, 102C to fire now; this causes flash(es) 102A, 102B, 102C to immediately fire.

Message to camera(s) 101A, 101B to capture images when they reach a particular position in two-dimensional or three-dimensional space; this causes camera(s) 101A, 101B to use internal location detection mechanism to capture images when they have been moved to the designated position/location. In at least one embodiment, a message can be sent to flash(es) 102A, 102B, 102C to fire in synchrony with the image capture.

Message to camera(s) 101A, 101B to move to particular position(s); this causes camera(s) 101A, 101B to move to the designated position(s)/location(s).

Message to flash(es) 102A, 102B, 102C to fire when they reach a particular position in two-dimensional or three-dimensional space; this causes flash(es) 102A, 102B, 102C to use internal location detection mechanism to fire when they have been moved to the designated position/location. In at least one embodiment, a message can be sent to camera(s) 101A, 101B to trigger image capture in synchrony with the firing of flash(es) 102A, 102B, 102C.

Message to flash(es) 102A, 102B, 102C to move to particular position(s); this causes flash(es) 102A, 102B, 102C to move to the designated position(s)/location(s).

As described above, such messages can be transmitted wirelessly or via any other suitable communications medium. Any suitable communications protocol can be used. In at least one embodiment, the communications protocol enables the components to perform any or all of the following:

synchronize clocks with one another;

monitor the status of other components (for example to provide information regarding battery life, available storage space, current position, and the like); and/or deliver commands from one component to another, in order to perform various imaging tasks (including, for example, image capture, burst capture, fire flash, and the like).

Camera(s) 101 and/or flash(es) 102 perform 204 the specified capture and/or firing operations according to commands received from controller 103. The captured images are stored, processed, assembled, and/or presented 205 in accordance with known methods. Examples of methods for storing, processing, assembling, and/or presenting images acquired from multiple sources, including light-field images, are described in the above-cited related patent applications.

One skilled in the art will recognize that the particular arrangement of hardware elements shown in the Figures is merely exemplary, and that the invention can be implemented using different hardware elements configured in any of a number of different ways.

Intelligent Flash Activation

In at least one embodiment, flash unit(s) 102 can be instructed to fire according to certain defined metrics, according to a mechanism referred to herein as "intelligent flash". Intelligent flash activation can be performed to implement the flash pattern determined in step 201, above.

In at least one embodiment, controller 103 (or flash unit 102) automatically determines appropriate positions at which illuminated images should be captured. For example, a depth map may be computed using techniques that are known in the art. A depth map is a set of image-side points, each of which corresponds to a visible point in the scene. The position of an image-side point in a depth map may be specified in Cartesian coordinates, with x and y indicating position as projected onto sensor 2303, and depth d indicating perpendicular distance from the surface of microlens array 2302 (positive toward the scene, negative away from the scene). The units of x and y may be pixels—the pixel pitch of sensor 2303. The units of d may be lambdas, where a distance of one lambda corresponds to the distance along which a cone of light from any scene point changes its diameter by a value equal to the pitch of microlens array 2302. (The pitch of microlens array 2302 is the average distance between the centers of adjacent microlenses.)

Depth maps are known in the art. See, for example: J. Sun, H.-Y. Shum and N.-N. Zheng, "Stereo Matching using Belief Propagation," *IEEE Transactions on Pattern Analysis and Machine Intelligence*, vol. 25, no. 7, pp. 787-800, 2003; and C.-K. Liang, T.-H. Lin, B.-Y. Wong, C. Liu, and H. Chen, "Programmable Aperture Photography: Multiplexed Light Field Acquisition," *ACM TRANS. GRAPH.* 27, 3, Article 55, 2008. Additional details regarding depth map generation are provided in related U.S. Utility application Ser. No. 13/688,026 for "Extended Depth Of Field And Variable Center Of Perspective In Light-Field Processing," filed Nov. 28, 2012, the disclosure of which is incorporated herein by reference.

In at least one embodiment, a depth map of a scene can be analyzed to determine flash positions based on angular shift in flash 102. Defining positions with angular criteria ensures that scenes with close objects are sampled with a denser set of flash positions. Appropriate output can be provided to the user to instruct the user to move flash unit 102 along a specified path so as to hit each of the determined positions. In response to this output, the user manually sweeps flash unit 102 (or multiple flash units 102) along the pre-specified path. As flash unit 102 traverses this path, it fires at the appropriate times to capture images illuminated from the determined positions. The command to trigger flash unit 102 can be initiated at flash unit 102 itself (based on detection of its position), or by controller 103 (based on its determination of the position of flash unit 102). If initiated at controller 103, or some other component, the command to cause flash 102 to fire can be sent wirelessly to flash 102 according to any suitable protocol, as described above.

Detection of the position of flash 102 can be performed using any suitable mechanism or combination of mechanisms, including for example inertial guidance capability, global positioning system, and/or the like. In addition, flash 102 may include the capability to determine its camera-relative position using any suitable mechanism or combination of mechanisms; these can include, for example, user feedback (the user clicks to indicate coincidence with camera 101), radio triangulation, visual confirmation utilizing an auxiliary camera mounted on flash 102, and/or the like.

In yet another embodiment, there is no pre-computed path for the flash; rather, the sampling positions are determined in real-time. For example, the user can cause camera 101 to capture the first image, and then can move flash 102 along an arbitrary path without necessarily receiving any instructions or directions from camera 101, flash 102, or controller 103. As flash 102 is moved, camera 101 and/or controller 103 continue to view and analyze the scene in real-time to determine a difference between the first captured image and the currently viewed scene. Once the scene characteristics have changed beyond a predefined threshold, flash 102 is automatically triggered and camera 101 automatically captures another image. This process can be iterated any number of times until the user ends the sequence or until a determination is made that a sufficient number of images have been captured.

Figure 3:
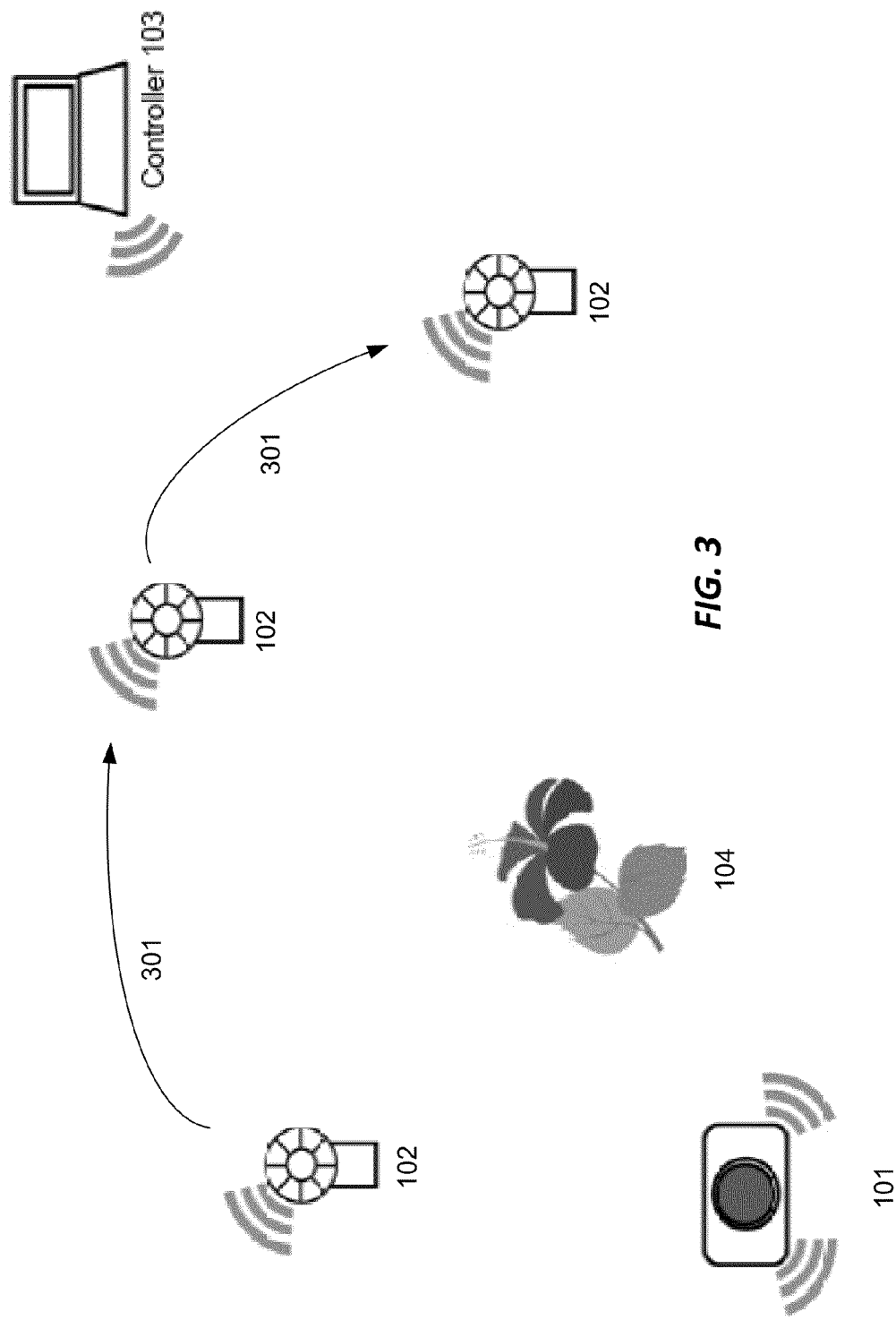
FIG. 3 depicts an example of intelligent flash activation according to one embodiment.

Referring now to FIG. 3, there is shown an example of such a technique. First, camera 101 is positioned relative to subject 104. Then, the user moves flash 102 along path 301 in response to output describing path 301. As flash 102 moves along path 301, it automatically fires at specified locations, illuminating subject 104. Controller 103 sends wireless messages to camera 101 to cause camera 101 to capture images in synchrony with the firing of flash 102. In this manner, multiple images with different lighting conditions can be captured. When the sweep is complete (in other words, once the user has traversed path 301), all of the frames required for the relighting picture have been captured by camera 101.

In at least one embodiment, the user can select a path from a set of pre-specified paths. The various available paths may provide different levels of quality, resolution, variation, flexibility, and/or the like, and may have different levels of complexity. Some simple paths can be offered, such as for example a one-dimensional path wherein the user moves flash 102 along a straight line.

In at least one embodiment, a training mode may be provided. To ensure that flash 102 can properly subdivide the motion path into sub-positions, it may be helpful for the user to sweep out the path twice, once to train flash 102 as to what the path is, and then again to capture the desired images. Training paths can be stored and made available as pre-specified paths. In such an embodiment, the user may initially sweep out an arbitrary path for flash 102, and then, once flash 102 has been trained, the user can attempt to recreate the initial path with a similar subsequent path. The training sweep allows the system to determine how many flash 102 firings should take place along the path, and how far apart they should be spaced from one another. In at least one embodiment, the user may train the system with multiple different paths, and can label or name them; subsequently, the user can indicate that a particular path is going to be used by identifying it by label or name. This gives the system an advance indication of which path is to be used, and when and where the flash 102 firings should take place along the path.

Alternatively, in at least one embodiment, the user's movement of flash 102 along path 301 is guided in some manner. Guidance may be visual (for example, lighted arrows may appear on a screen associated with flash 102), audible (for example, binaural cues or pitch cues can be emitted based on current position as compared with desired position), haptic (for example, flash unit 102 may vibrate differently depending on whether the user is moving flash 102 toward or away from the desired position), or by any suitable combination of these or other mechanisms. As described above, when each pre-defined position is reached, controller 103, flash unit 102, and camera(s) 101 communicate with one another to cause an image to be captured with the desired lighting. If appropriate, the system can pre-train the user as to the specified path, for example with a practice run, so that the user is more likely to properly sweep flash 102 along the specified path. Again, multiple different paths can be labeled or named; the user can select one, and then system can provide appropriate output to direct the user as to how to move flash 102 along the specified path.

In addition, in at least one embodiment, the user can provide input to flash 102 via haptic commands, such as tilting, shaking, or moving the unit. Such input can instruct flash 102 as to when and where to fire.

In at least one embodiment, a position tolerance can be established. Thus, for example, flash 102 can automatically fire (and an image can be captured) when the user brings flash 102 to a position sufficiently near the specified position (or within some specified tolerance or zone of a particular size) to satisfy the established tolerance value.

In another embodiment, the user is not given guidance as to positioning of flash 102. Rather, once camera 101 has been positioned, the user moves flash 102 to any position(s) he or she chooses, and along any path he or she chooses. The user can manually trigger image capture at any desired position, for example by clicking a shutter button or other control on flash 102 (or on camera 101, or on controller 103); this causes camera 101 to capture an image, and causes flash 102 to fire. When the user determines that a sufficient number of images have been captured, he or she can provide input to cause the images to be stored, uploaded, aggregated, and/or otherwise processed. Termination of the image capture procedure can also be automatic after a predetermined (or pre-specified) number of frames have been captured, or after some time-out period has elapsed since the most recent image capture event.

In yet another embodiment, any suitable combination of the above-described techniques can be used. For example, one such combination is to specify a motion path for flash 102, and then, once images have been captured for that motion path, allow for manual positions of flash 102.

One advantage of the described techniques for intelligent flash activation is that they allow for rapid capture of the desired images, thus minimizing the degree of unwanted movement of subject 104 (and/or camera 101) between capture events.

Another advantage is that the described techniques allow camera 101 to know the position of the illumination source for each captured image, even when manual movement of flash 102 takes place. Position tracking mechanisms in flash 102 allow for such positional information to be known. Any of the above-described variations can be configured to ensure that lighting positions are spaced appropriately (for example, specifically as desired or at least regularly).

Similar techniques can be used for movement of camera 101, in addition to or instead of movement of flash 102. For example, in at least one embodiment, the user can be instructed to move camera 101 along a path; in response to detecting that camera 101 is at a suitable location for image capture, image capture takes place. If appropriate, a message can also be sent to one or more flash(es) 102 to cause flash(es) 102 to fire in synchrony with the image capture.

In at least one embodiment, flash 102 determines its position during the sweep; information for flash 102 position can be available from an inertial guidance system of flash 102 (such as an accelerometer or other device). It may be useful to obtain or further refine flash 102 position after the sweep has completed, such as during subsequent picture processing, particularly if it is impractical to obtain precise information in real-time. Position information can also be determined, for example, using analysis of the images themselves, to more precisely pinpoint the locations of camera 101 and flash 102 with respect to one another. Such analysis can yield extremely accurate results, particularly when supplemented by the approximate positions already known from the inertial system. Analysis of the image can also provide information about the orientation of flash 102, and can provide additional information about the scene (such as color characteristics and/or reflection characteristics of the subject and/or background) that can be used to implement more sophisticated relighting effects. In any of such embodiments, a determination can be made of flash 102 position as compared with its original position, and/or as compared with camera 101.

In at least one embodiment, flashes 102 are fired sequentially, one at a time; thus, each captured image is lit by, at most, a single flash 102. In another embodiment, two or more flashes 102 are fired simultaneously; for example, a plurality of images can be captured, each being associated with two simultaneous flashes 102 wherein flashes 102 are moved from one image to the next. In situations where two or more flashes 102 are fired simultaneously, the system of the present invention can perform image analysis to determine what the image would have looked like with each of the flashes 102 separately. In at least one embodiment, such separate-flash images can be generated, to be used for image assembly as described below.

Flash User Interface

According to various embodiments, a user can interact with camera(s) 101 and/or flash unit(s) 102 to perform various functions in accordance with various embodiments of the present invention. Examples of such functions include:

Pairing a flash unit 102 with a camera 101;
Activating a flash unit 102;
Deactivating a flash unit 102;
Pairing multiple flash units 102;
Borrowing paired flash units 102; and
Returning borrowed flash units 102.

Each of these will be described in turn. For illustrative purposes, it is assumed that camera 101 contains input and output devices, such as a touch screen, display screen, five-way controller, switch(es), and/or any combination thereof, for performing the described operations. One skilled in the art will recognize, however, that any or all of these operations can be performed on any suitable computing device, such as a smartphone, laptop computer, tablet computer, desktop computer, or the like, and/or any other device such as (but not limited to) a remote control, one of the flash units 102 itself, a control box, and/or the like. Accordingly, the specific steps described herein, wherein the user interacts with camera 101, are merely exemplary.

Pairing a Flash Unit 102 with a Camera 101

Figure 11:
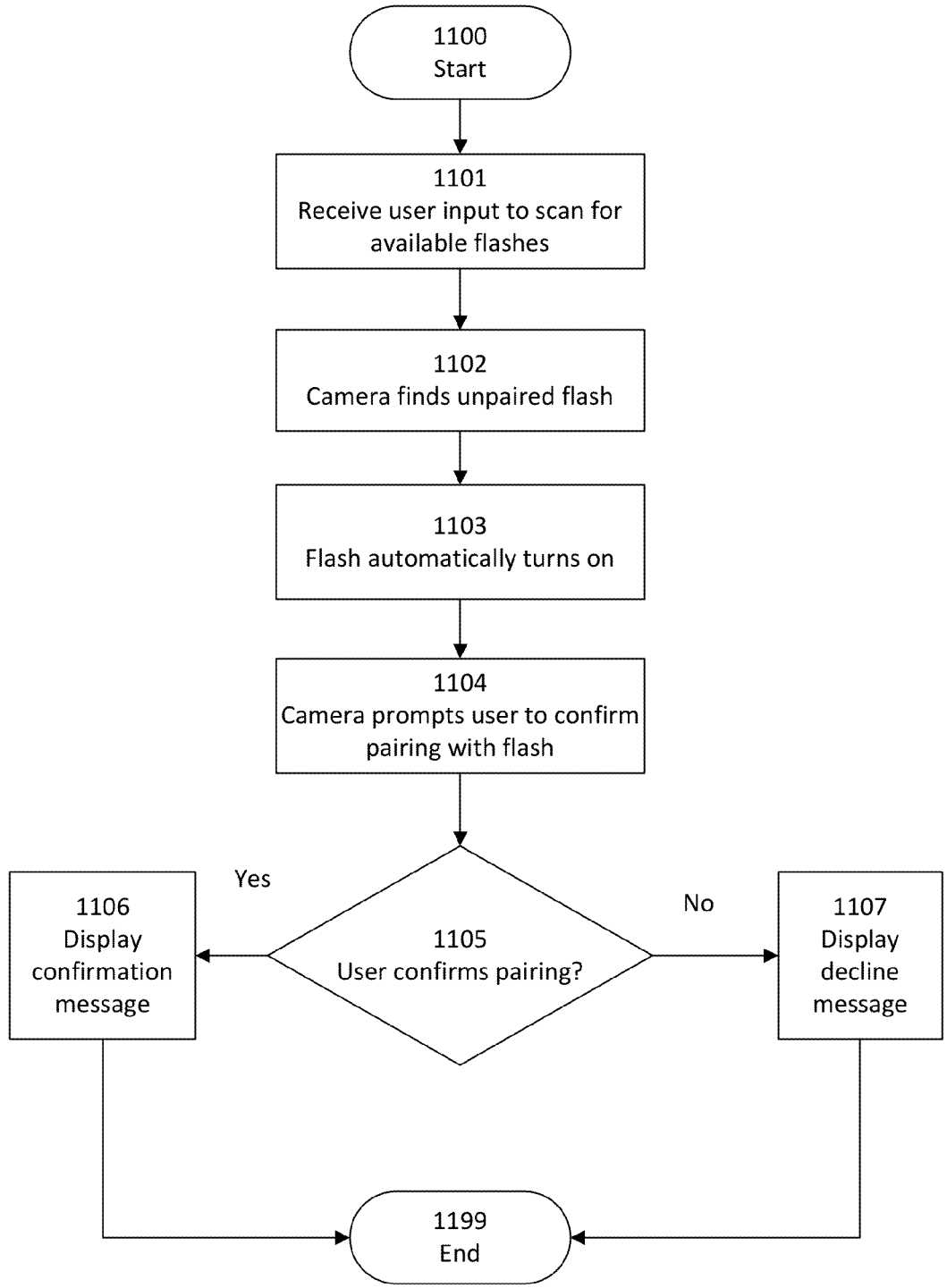
FIG. 11 is a flow diagram depicting a method of pairing a flash to a camera, according to one embodiment.

Referring now to FIG. 11, there is shown a flow diagram depicting a method of pairing a flash 102 to a camera 101, according to one embodiment. Referring now also to FIGS. 17A through 17E, there is shown an example of a method of pairing a flash 102 to a camera 101, according to one embodiment. Such steps may be performed, for example, if a user buys a new flash unit 102 and wants to pair it with his/her own camera 101. One skilled in the art will recognize that the particular steps shown in FIG. 11, and the particular arrangement of devices, inputs, and screen shots shown in FIGS. 17A through 17E, are merely exemplary.

Input is received 1101 from the user to scan for available flashes 102. For example, the user may select a Find New Flash command from menu 1701A shown on the display screen of camera 101. In response, camera 101 scans for available flash units 102 and finds 1102 unpaired flash 102. Unpaired flash 102 automatically turns on 1103; alternatively, camera 101 may instruct the user to turn on unpaired flash 102. In at least one embodiment, unpaired flash 102 may glow, or some other visual indication may be activated, to show that it has been powered on. Once unpaired flash 102 has been found, camera 101 prompts 1104 the user to confirm the pairing with flash 102, for example by displaying prompt message 1702B. In at least one embodiment, flash 102 now glows in a different way, or provides some other visual indication that pairing is in progress.

If, in step 1105, the user confirms the pairing, confirmation message 1702C is displayed 1106, and the pairing process is completed. If, in step 1105, the user declines the pairing, decline message 1702D is displayed 1106, and the pairing process is aborted. The method ends 1199.

Activating a Flash Unit 102

Figure 12:
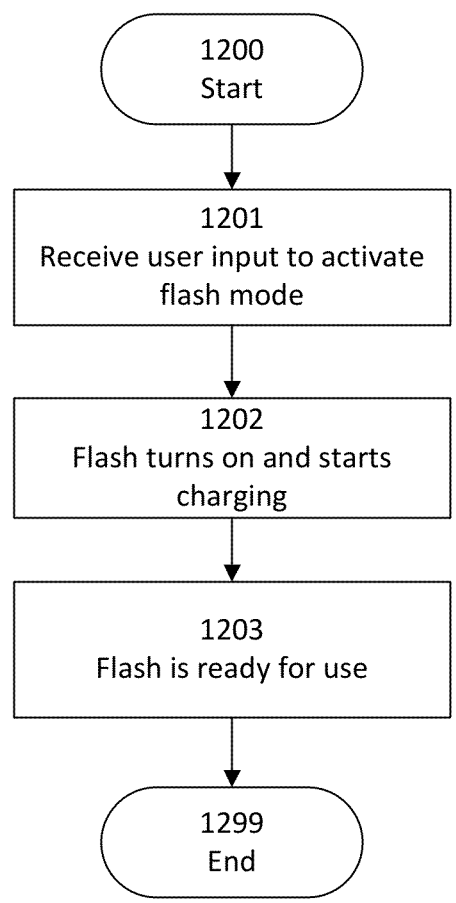
FIG. 12 is a flow diagram depicting a method of activating a paired flash, according to one embodiment.
Figure 18A:
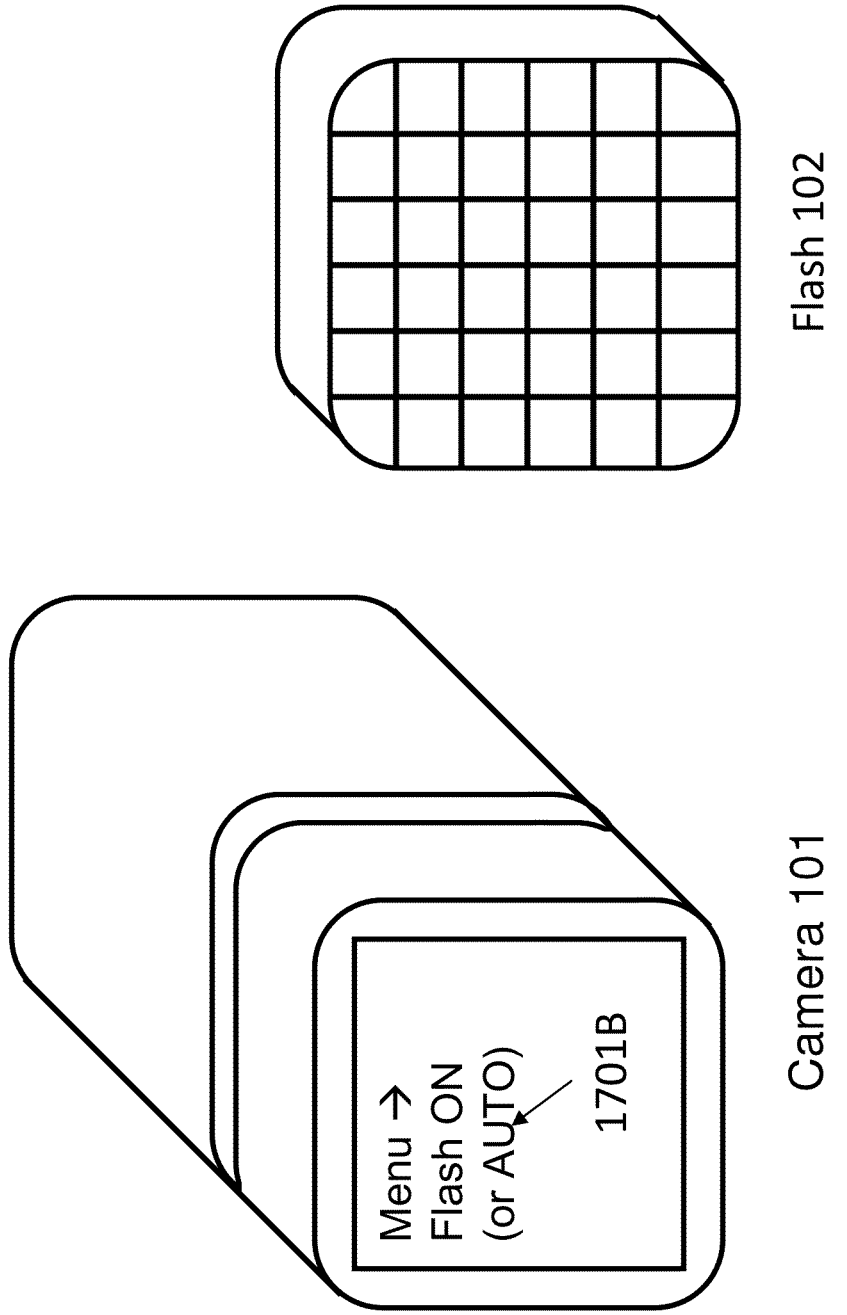
Figure 18B:
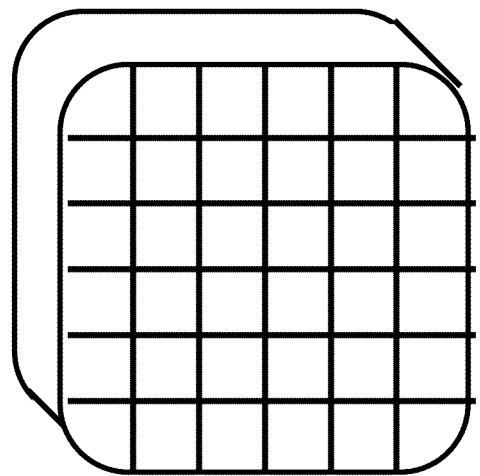
Figure 18B:
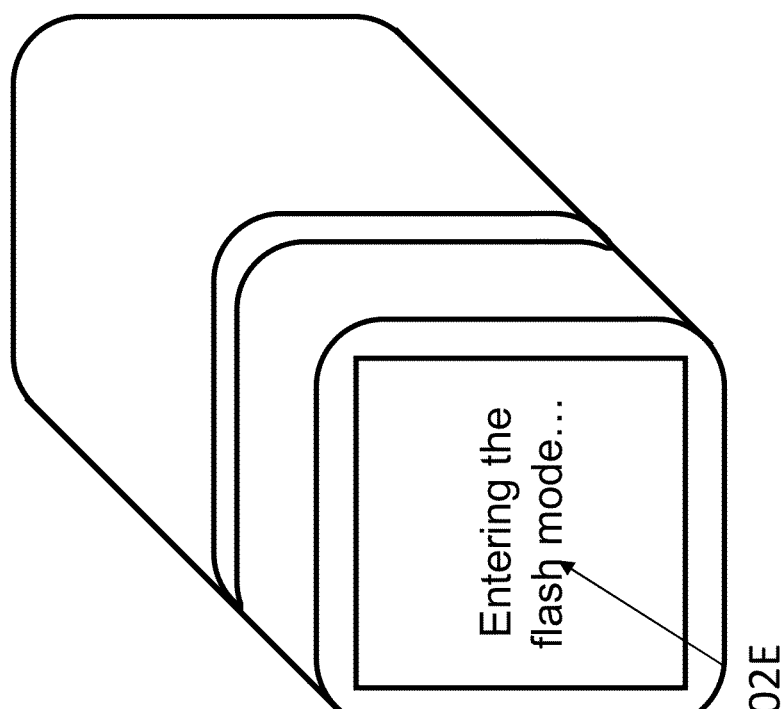

Referring now to FIG. 12, there is shown a flow diagram depicting a method of activating a paired flash 102, according to one embodiment. Referring now also to FIGS. 18A through 18C, there is shown an example of a method of activating a paired flash 102, according to one embodiment. Such steps may be performed, for example, once pairing has been performed as described above. One skilled in the art will recognize that the particular steps shown in FIG. 12, and the particular arrangement of devices, inputs, and screen shots shown in FIGS. 18A through 18C, are merely exemplary.

Input is received 1201 from the user to activate flash mode (auto or on). For example, the user may select a Flash ON or Flash AUTO command from menu 1701B shown on the display screen of camera 101. In response, camera 101 sends a message to cause flash 102 to turn on 1202 and begin charging. In at least one embodiment, camera 101 displays a message 1702E informing the user that flash 102 is being turned on. In at least one embodiment, flash 102 may glow, or some other visual indication may be activated, to show that it is turning on. In at least one embodiment, flash 102 may start charging, and icon 1801 may be shown on the screen of camera 101 to indicate this state. Once flash 102 is ready for use, icon 1801 may change in appearance, and/or flash 102 may glow in a different way (or some other visual indication may be activated), to show that flash 102 is ready for use 1203. The method ends 1299.

Deactivating a Flash Unit 102

Figure 13:
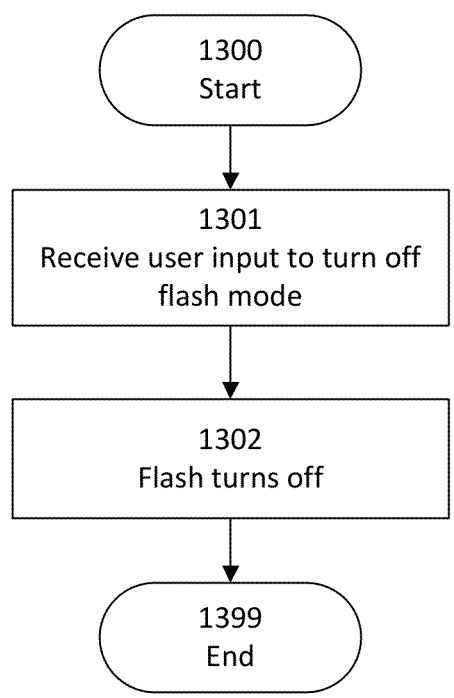
FIG. 13 is a flow diagram depicting a method of deactivating a paired flash, according to one embodiment.
Figure 19A:
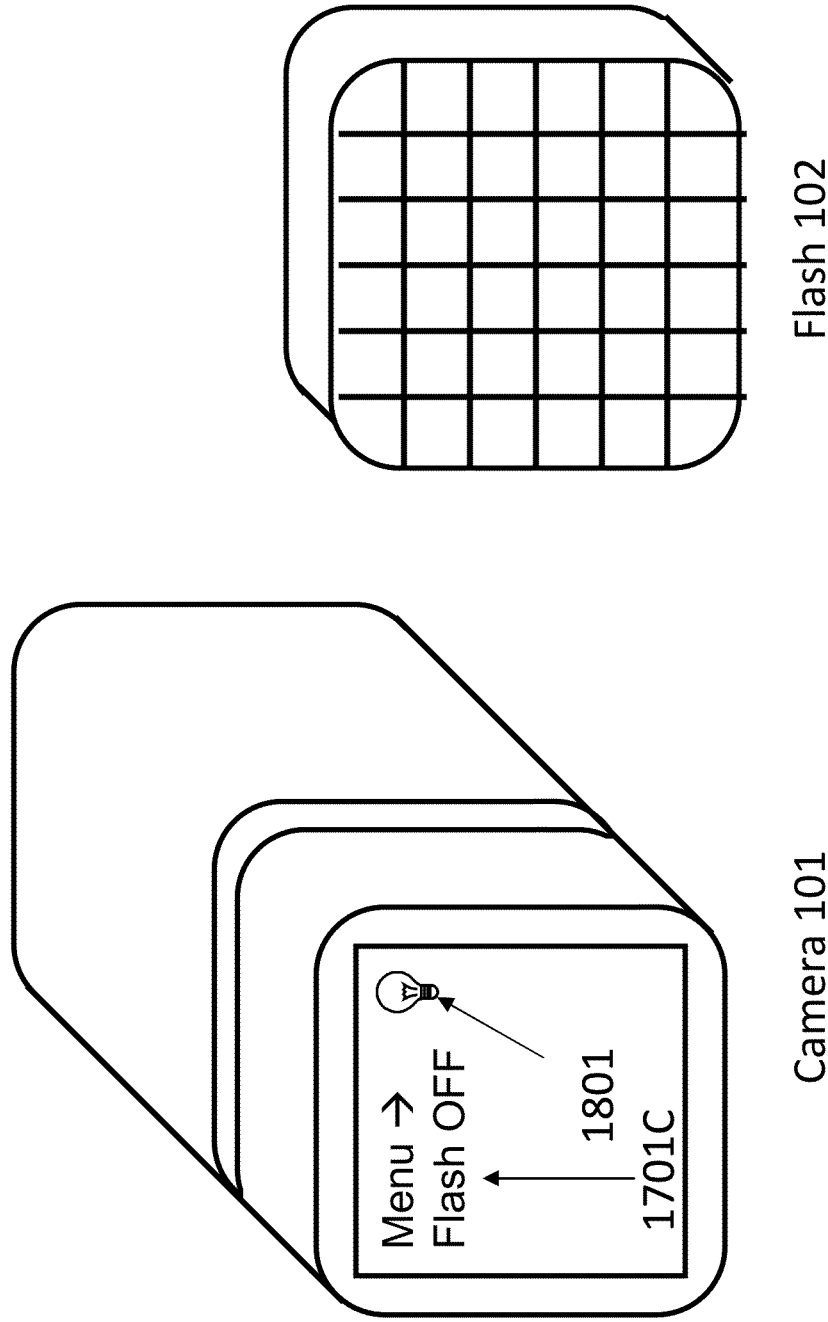
FIGS. 19A and 19B illustrate a method of turning off a paired flash, according to one embodiment.
Figure 19B:
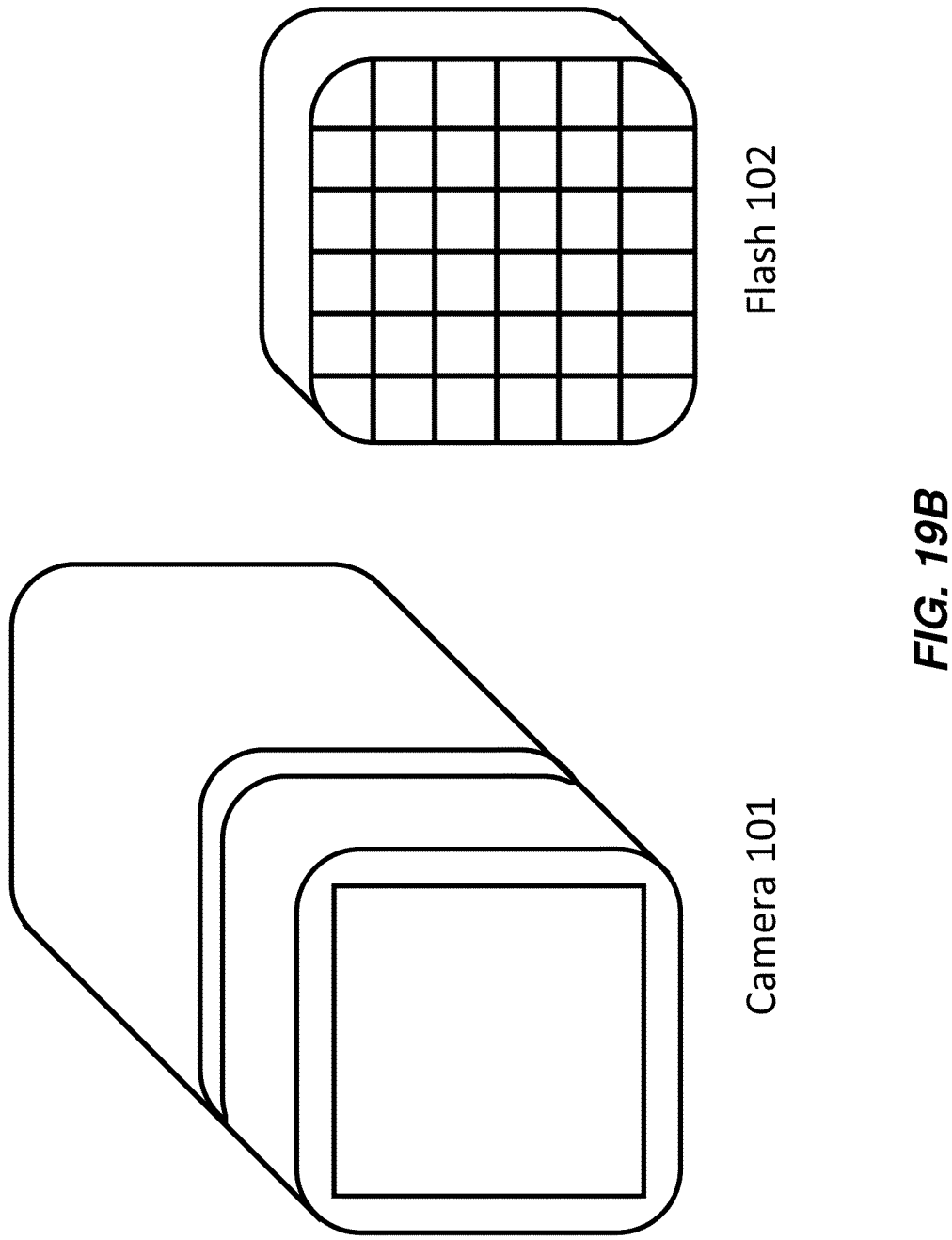
Figure 20A:
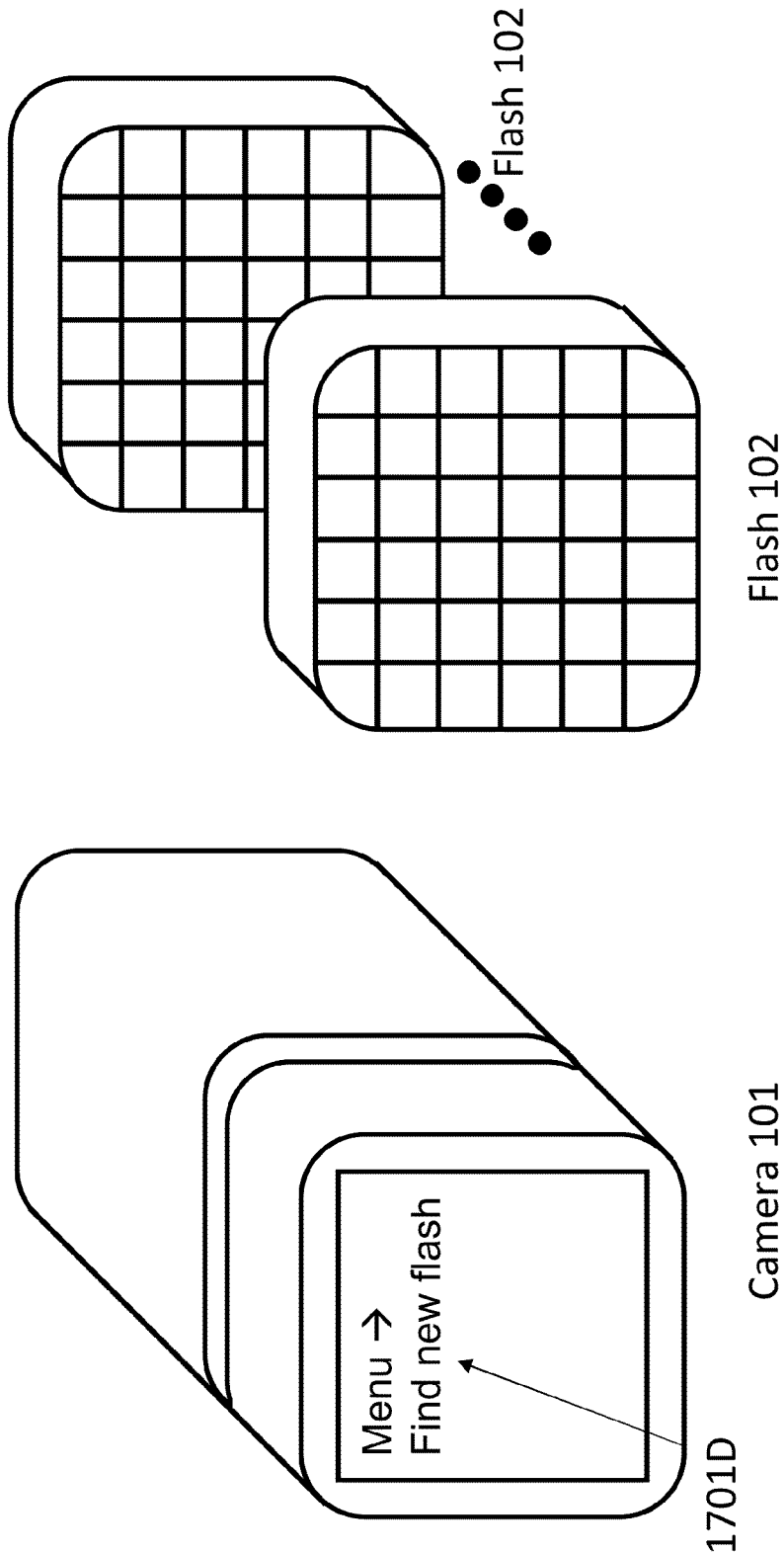
FIGS. 20A through 20D illustrate a method of pairing multiple flashes to a camera, according to one embodiment.
Figure 20B:
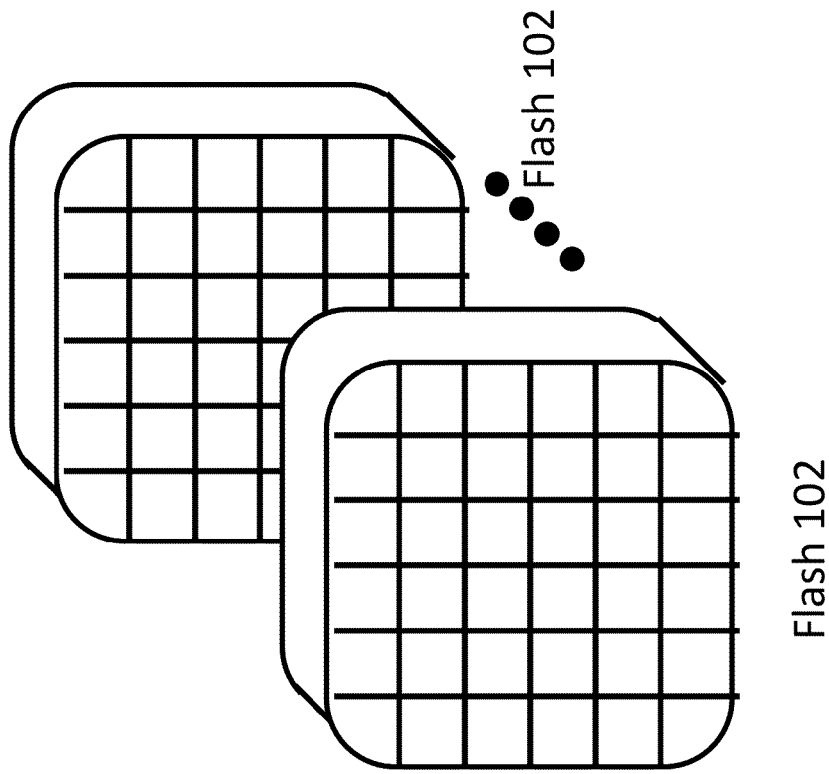
Figure 20C:
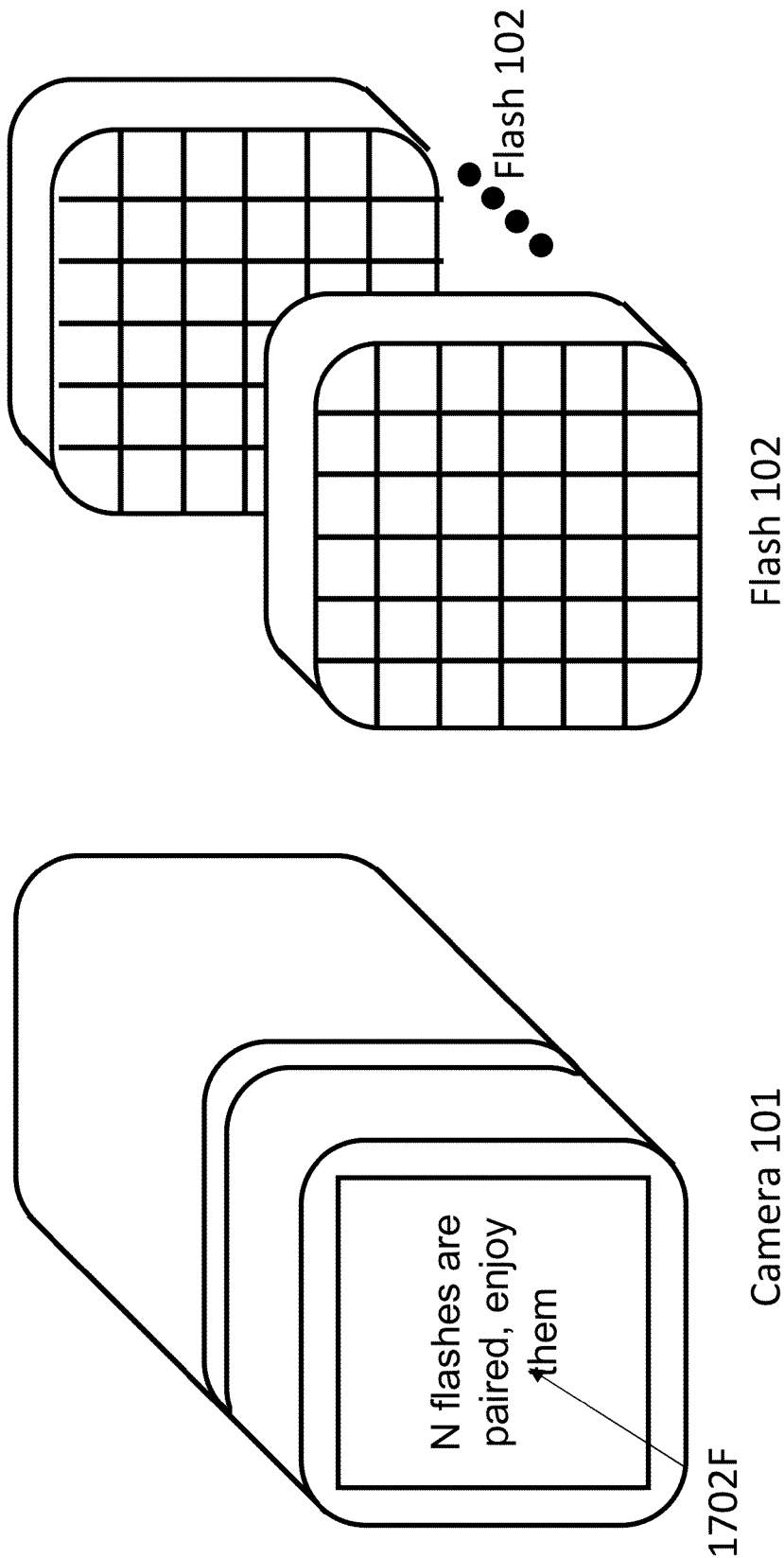
Figure 20D:
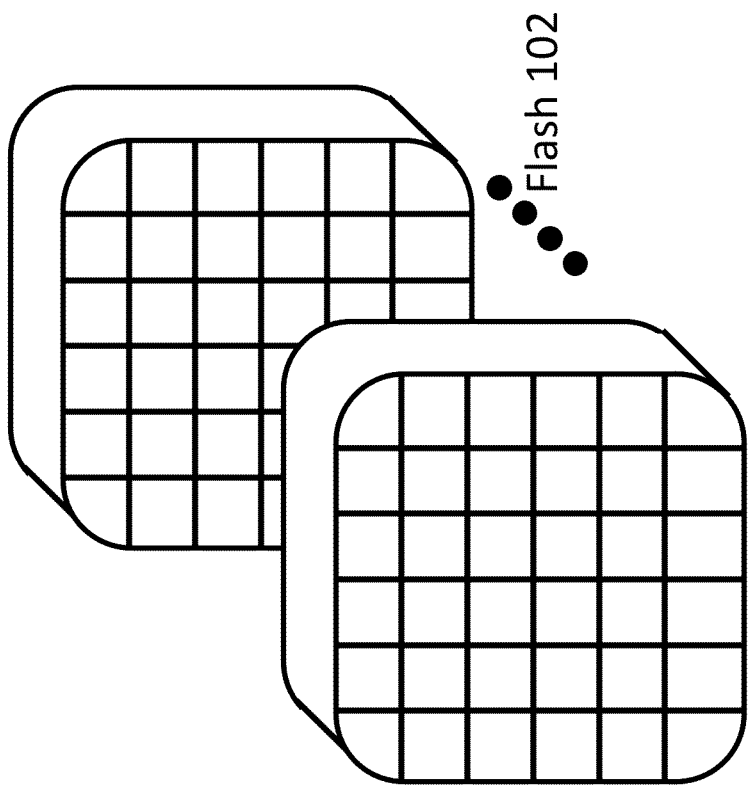

Referring now to FIG. 13, there is shown a flow diagram depicting a method of deactivating a flash 102, according to one embodiment. Referring now also to FIGS. 19A through 19B, there is shown an example of a method of deactivating a flash 102, according to one embodiment. One skilled in the art will recognize that the particular steps shown in FIG. 13, and the particular arrangement of devices, inputs, and screen shots shown in FIGS. 19A through 19B, are merely exemplary.

Input is received 1301 from the user to turn off a flash mode. For example, the user may select a Flash OFF command from menu 1701C shown on the display screen of camera 101. In response, camera 101 sends a message to cause flash 102 to turn off 1302. In at least one embodiment, icon 1801 disappears from the display screen of camera 101. In at least one embodiment, flash 102 may stop glowing, or some other visual indication may be activated, to show that it is now off. The method ends 1399.

Pairing Multiple Flash Units 102 with a Camera 101

Figure 14:
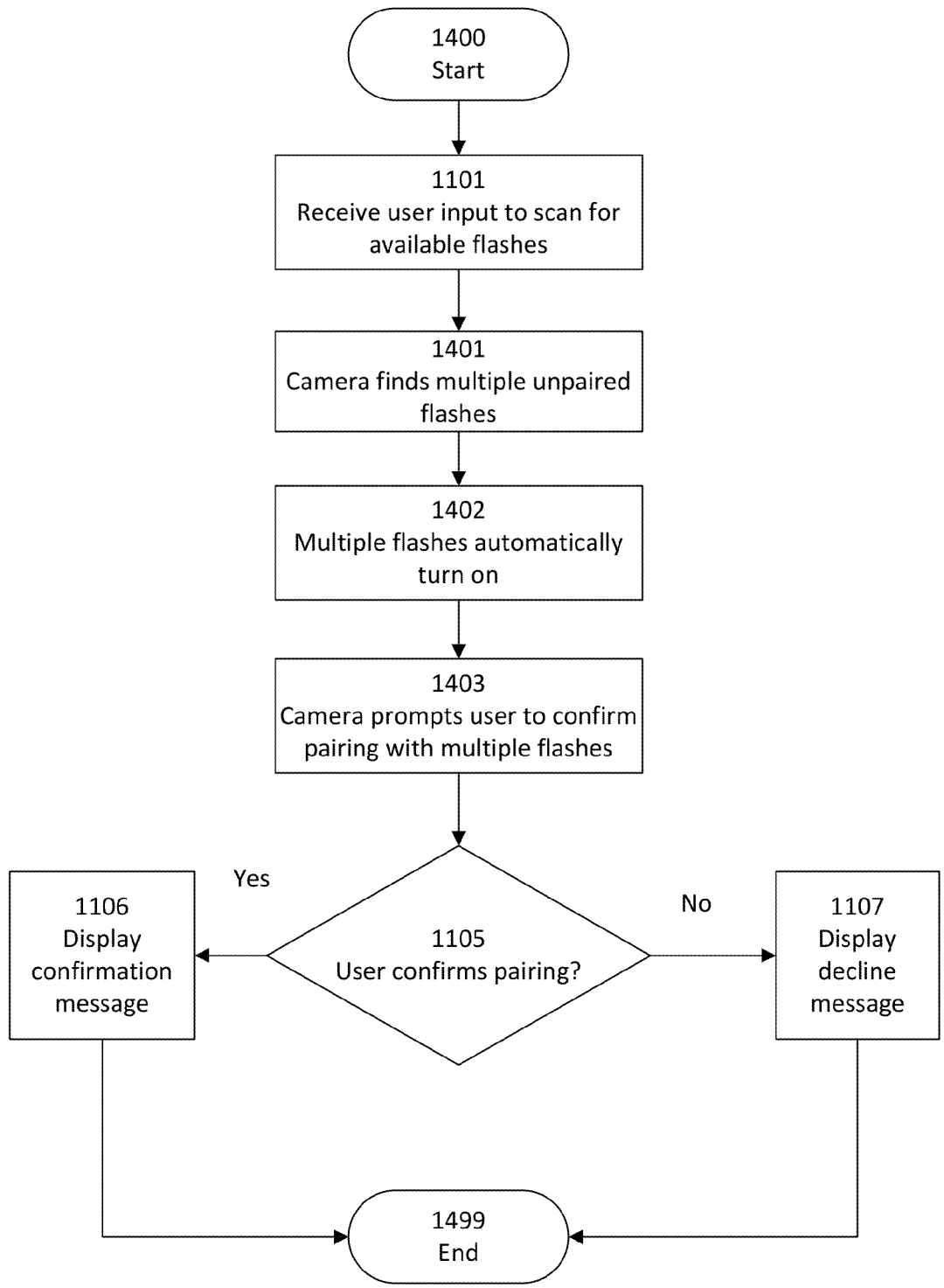
FIG. 14 is a flow diagram depicting a method of pairing multiple flashes to a camera, according to one embodiment.

In at least one embodiment, multiple flash units 102 can be paired with a camera 101, so as to capture multiple images with different lighting characteristics in rapid succession without having to move flash units 102. Referring now to FIG. 14, there is shown a flow diagram depicting a method of pairing multiple flashes 102 to a camera 101, according to one embodiment. Referring now also to FIGS. 20A through 20D, there is shown an example of a method of pairing multiple flashes 102 to a camera 101, according to one embodiment. Such steps may be performed, for example, if a user buys several flash units 102 and wants to pair them with his/her own camera 101. One skilled in the art will recognize that the particular steps shown in FIG. 14, and the particular arrangement of devices, inputs, and screen shots shown in FIGS. 20A through 20D, are merely exemplary.

Input is received 1101 from the user to scan for available flashes 102. For example, the user may select a Find New Flash command from menu 1701D shown on the display screen of camera 101. In response, camera 101 scans for available flash units 102 and finds 1401 multiple unpaired flashes 102. Unpaired flashes 102 automatically turn on 1402; alternatively, camera 101 may instruct the user to turn on unpaired flashes 102. In at least one embodiment, unpaired flashes 102 may glow, or some other visual indication may be activated, to show that they have been powered on. Once unpaired flashes 102 have been found, camera 101 prompts 1403 the user to confirm the pairing with flashes 102, for example by displaying prompt message 1702E. In at least one embodiment, flashes 102 now glow in a different way, or provide some other visual indication that pairing is in progress.

If, in step 1105, the user confirms the pairing, confirmation message 1702F is displayed 1106, and the pairing process is completed. If, in step 1105, the user declines the pairing, a decline message (not shown) may be displayed 1107, and the pairing process is aborted. The method ends 1199.

Borrowing a Flash Unit 102

In at least one embodiment, the system of the present invention allows a user to "borrow" a flash unit 102 from a friend or other individual. This effectively performs a temporary pairing operation that permits the borrowed flash unit 102 to operate in connection with the user's camera 101.

Figure 15:
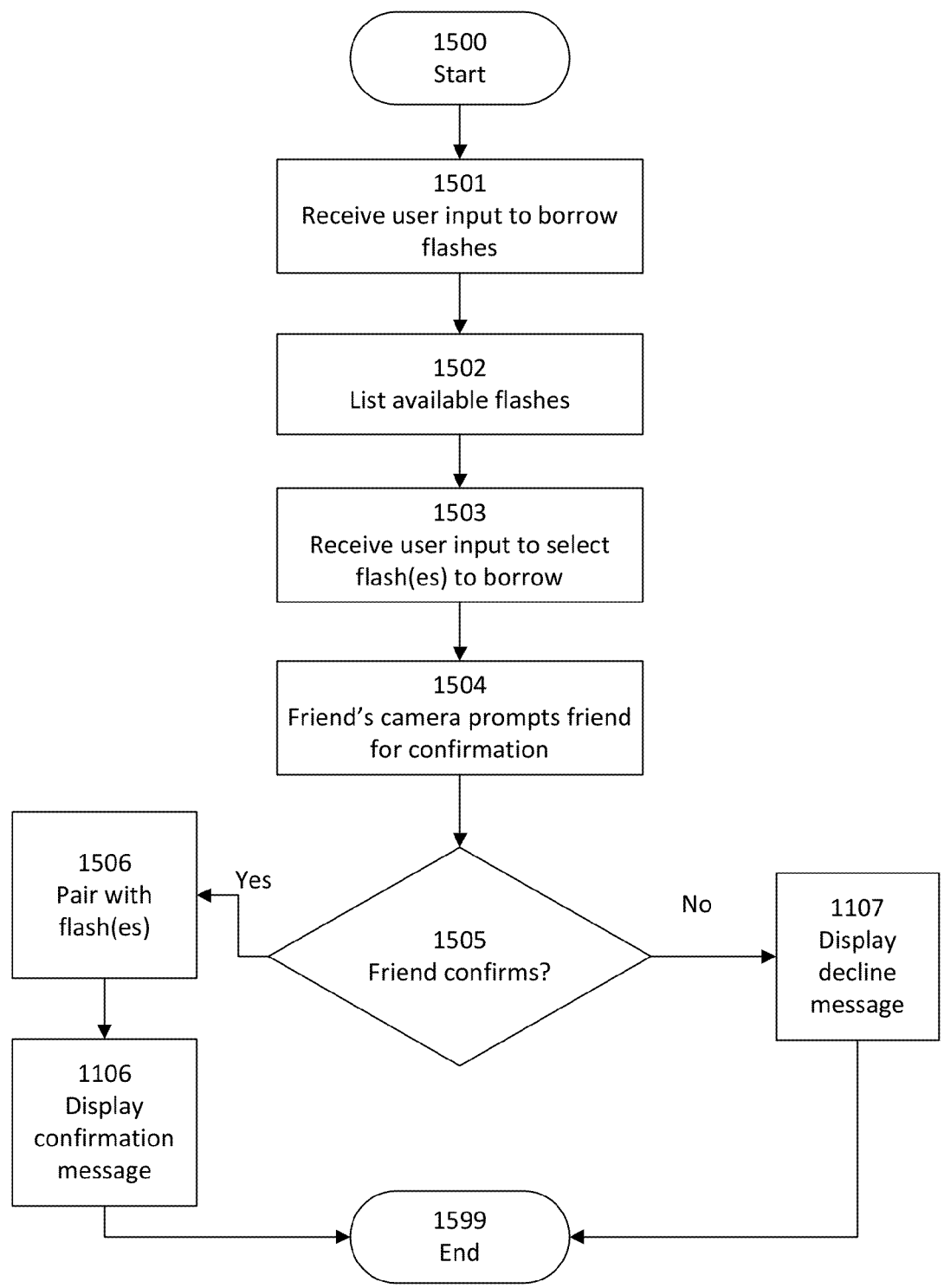
FIG. 15 is a flow diagram depicting a method of borrowing a flash to pair it with a camera, according to one embodiment.

Referring now to FIG. 15, there is shown a flow diagram depicting a method of borrowing a flash 102 to temporarily pair it with a user's camera 101, according to one embodiment. Referring now also to FIGS. 21A through 21E, there is shown an example of a method of borrowing a flash 102 to temporarily pair it with a user's camera 101, according to one embodiment. One skilled in the art will recognize that the particular steps shown in FIG. 15, and the particular arrangement of devices, inputs, and screen shots shown in FIGS. 21A through 21E, are merely exemplary.

Figure 21A:
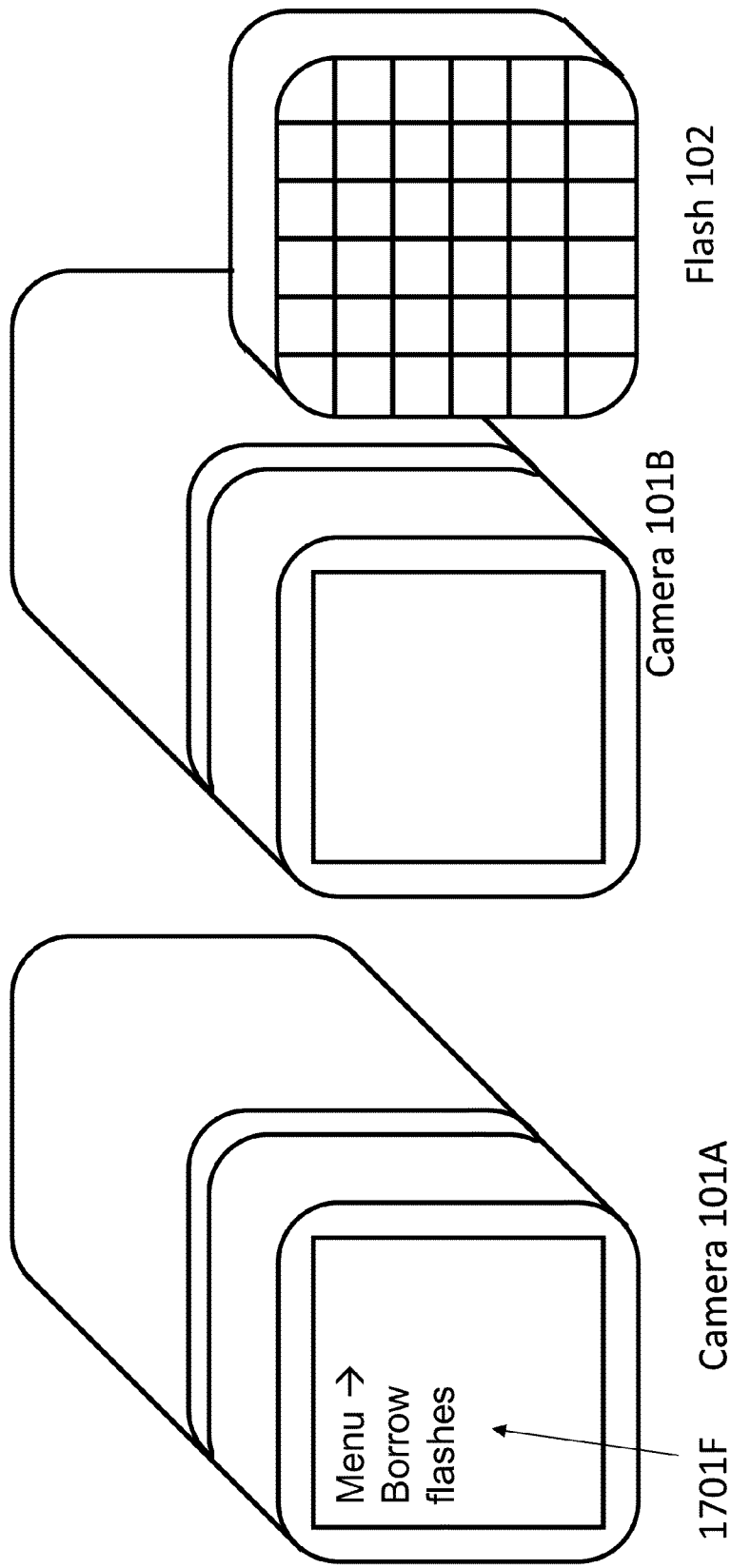
Figure 21B:
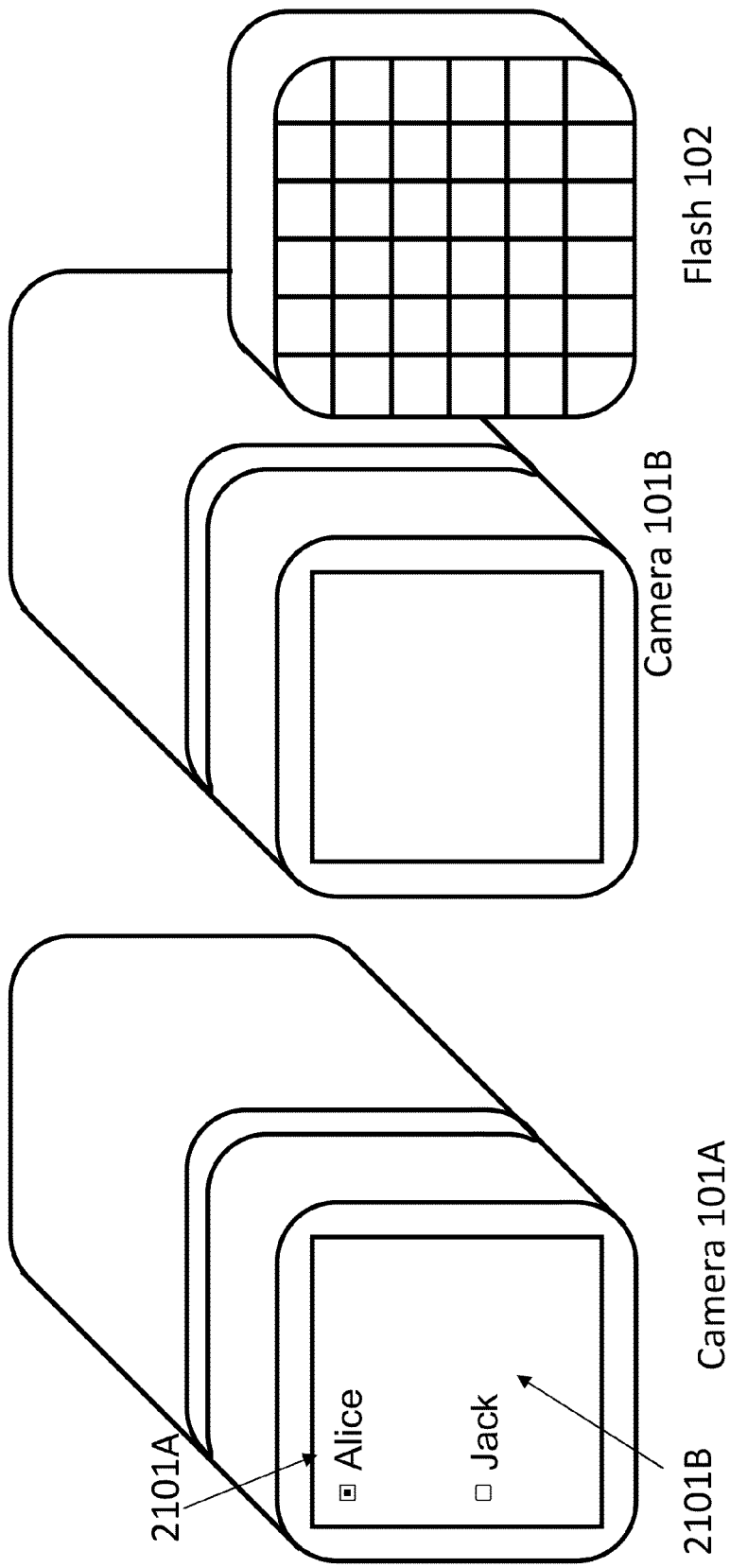
Figure 21C:
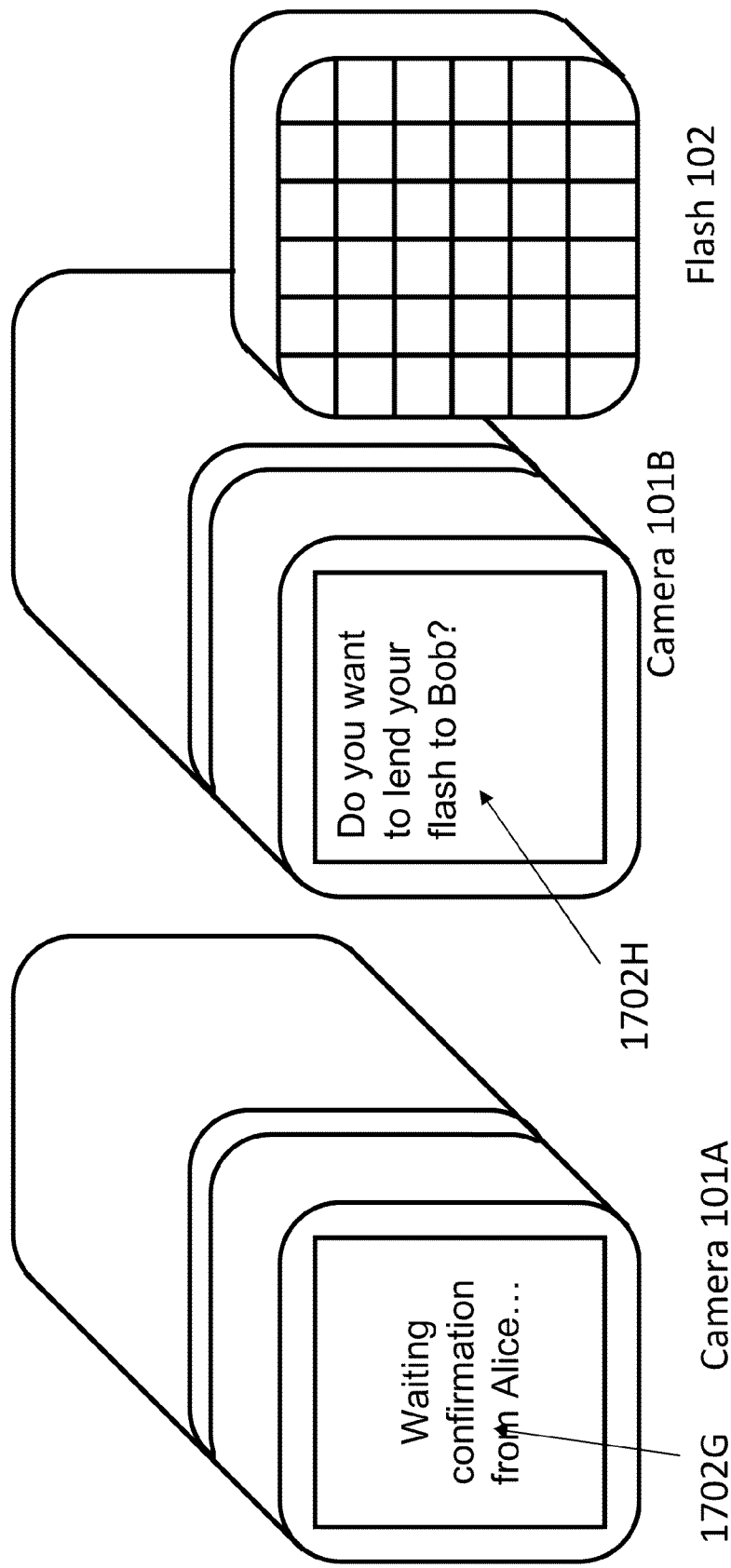

Input is received 1501 from the user to borrow flash(es) 102 from other users, such as one or more friends. For example, the user may select a Borrow Flashes command from menu 1701F shown on the display screen of camera 101A. In response, camera 101A scans for available flash units 102 and finds one or more flashes 102 associated with other cameras 101, such as camera 101B belonging to a friend of the user. Camera 101A lists 1502 flashes 102 that are available to be borrowed, for example in a list that includes entries 2101A, 2101B. Input is received 1503 from the user to select flash(es) 102 from the list, for example by checking off entry 2101A. Camera 101A sends a message to camera 101E associated with the selected flash 102, to cause camera 101E to prompt 1504 the friend to indicate whether he or she approves the borrowing of flash 102. In at least one embodiment, camera 101A may display message 1702G to indicate that it is waiting for confirmation from the friend. An example of prompt 1702H is shown in FIG. 21C.

If, in step 1505, the friend confirms that he or she approves of the borrowing, for example by responding to prompt 1702H in the affirmative, a message is sent to camera 101A confirming the borrowing. Camera 101A pairs with flash 102, and confirmation message 1702J is displayed 1106 on the display screen of camera 101A. In at least one embodiment, icon 1801 also indicates that flash 102 has been paired with camera 101A. In at least one embodiment, flash 102 glows or provides some other visual indication that it is now paired with (i.e., being borrowed by) camera 101A.

Figure 21E:
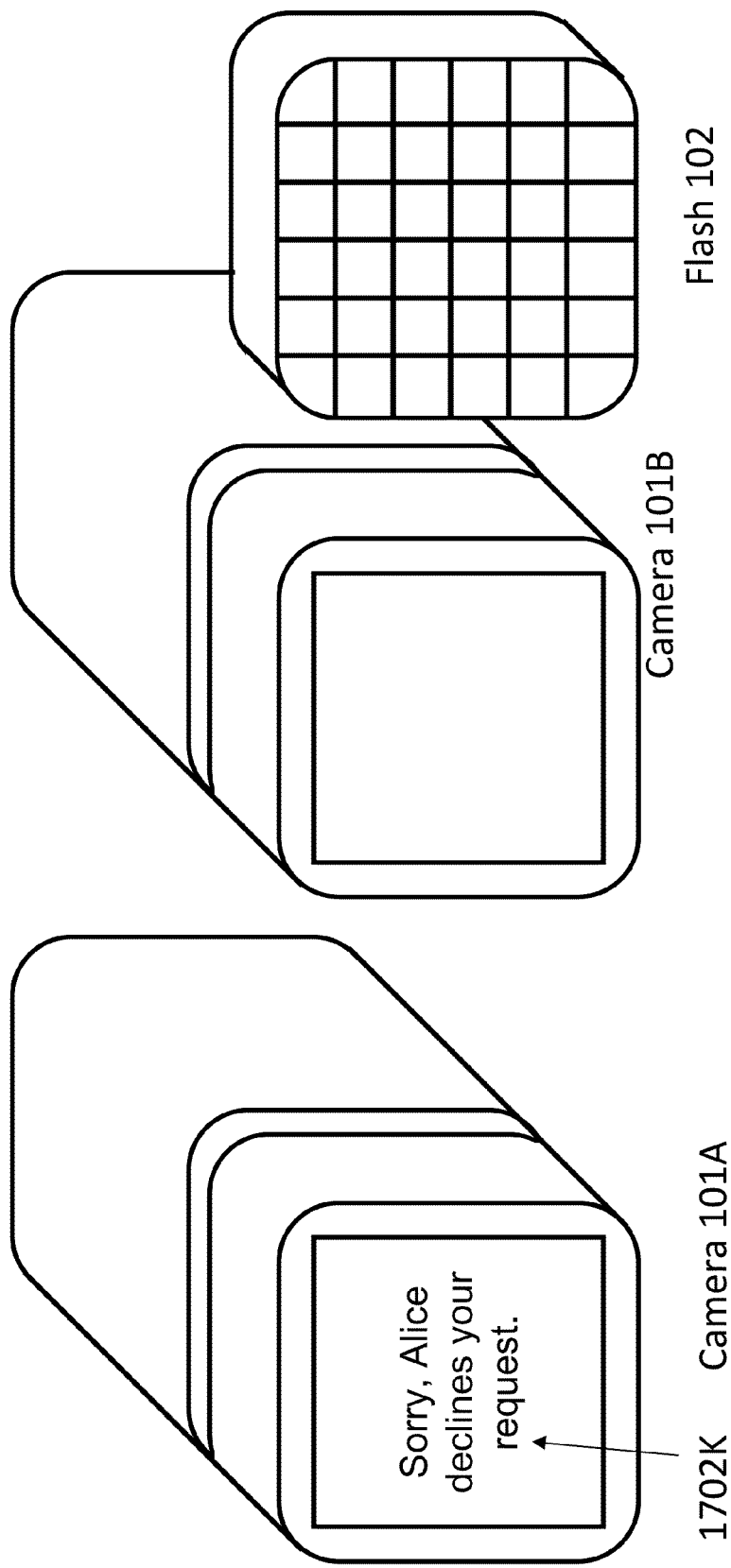

If, in step 1505, the friend declines the borrowing, for example by responding to prompt 1702H in the negative, a message is sent to camera 101A declining the borrowing. As shown in FIG. 21E, decline message 1702K is displayed 1107 on the display screen of camera 101A.

The method ends 1599.

Returning a Borrowed Flash Unit 102

Once image capture is complete, the borrowed flash unit 102 can be returned to the friend, so that it is available for his or her use.

Figure 16:
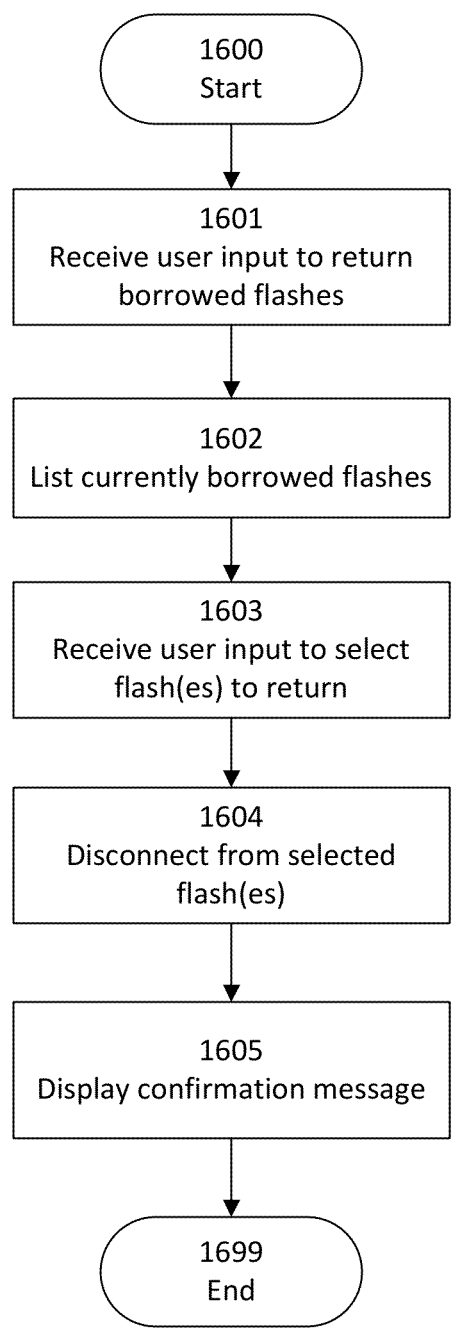
FIG. 16 is a flow diagram depicting a method of returning a borrowed flash, according to one embodiment.
Figure 17A:
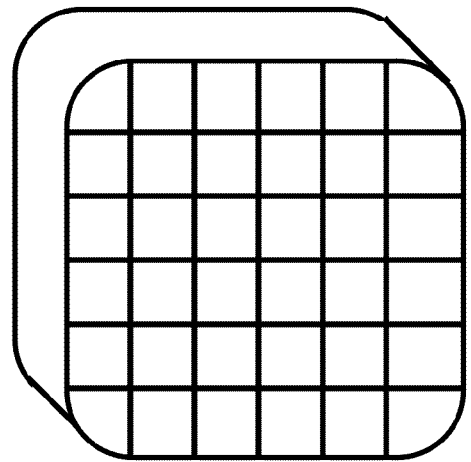
FIGS. 17A through 17E illustrate a method of pairing a flash to a camera, according to one embodiment.
Figure 17A:
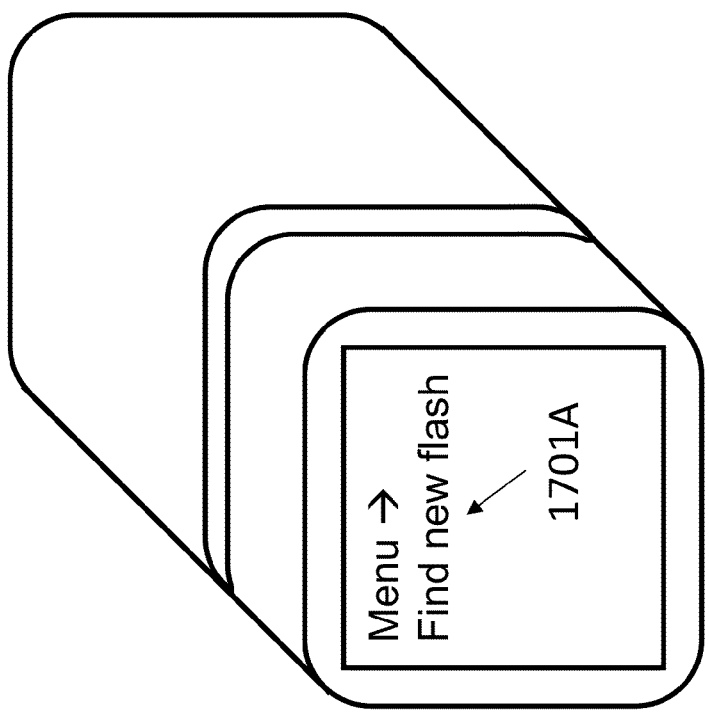
Figure 17B:
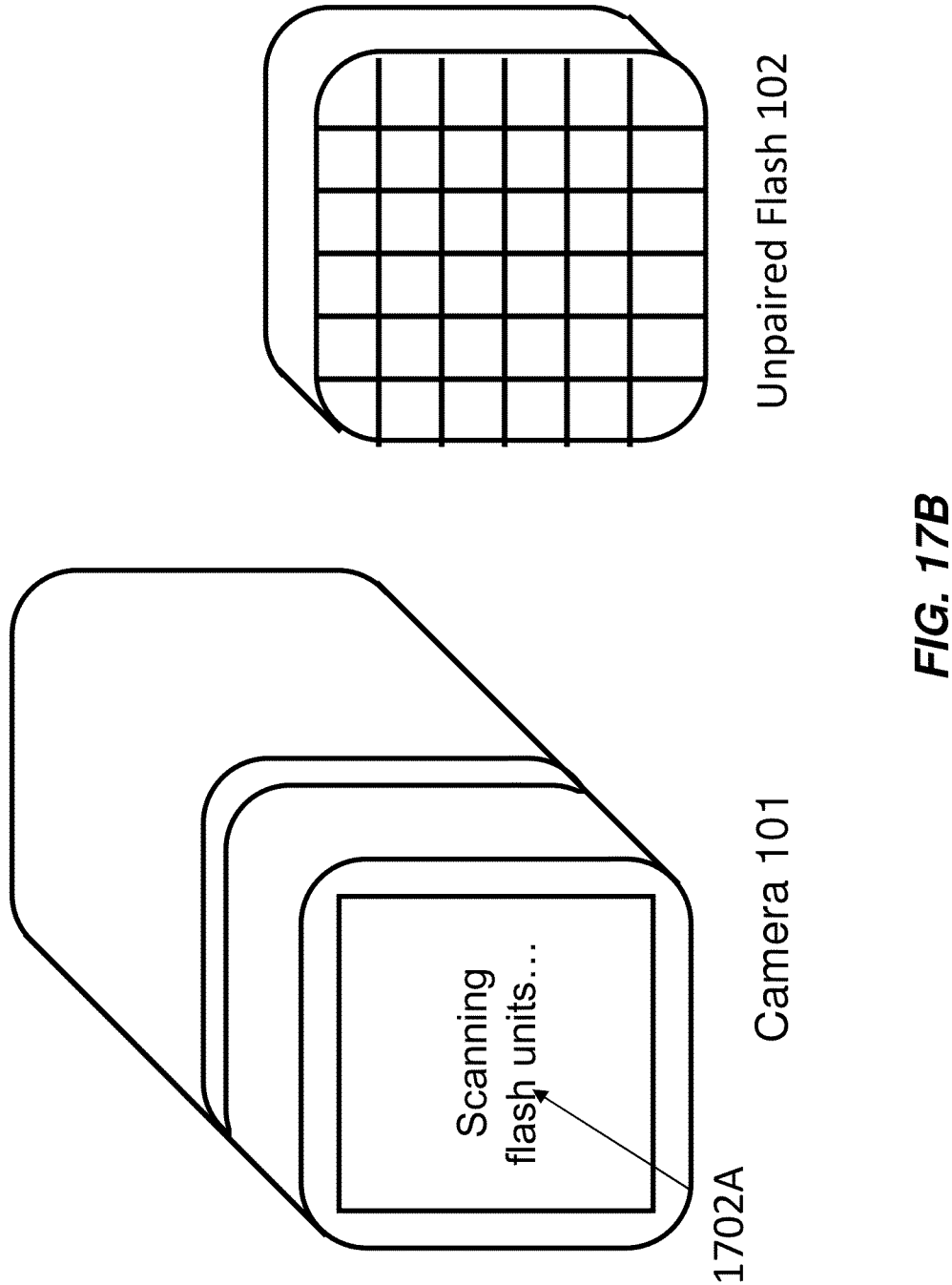
Figure 17C:
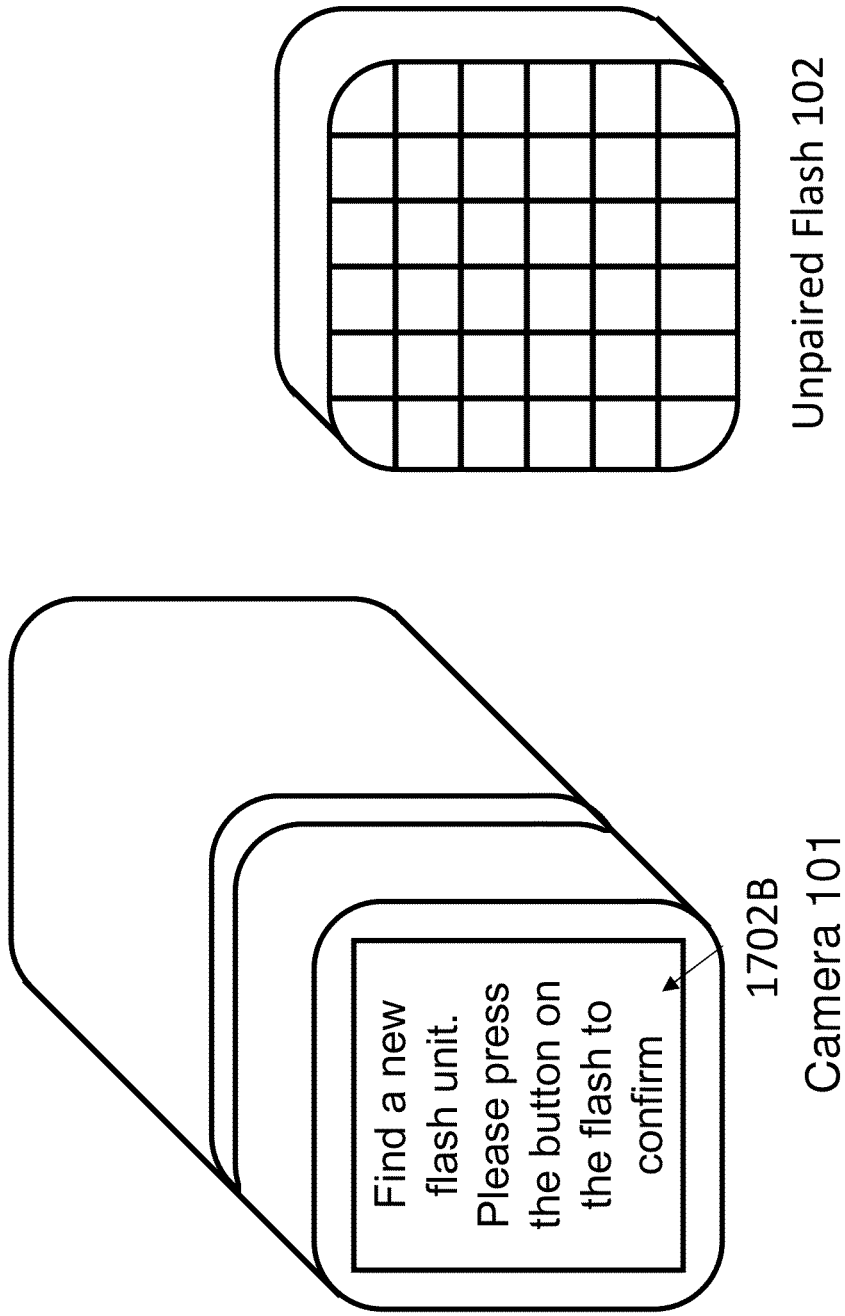
Figure 17D:
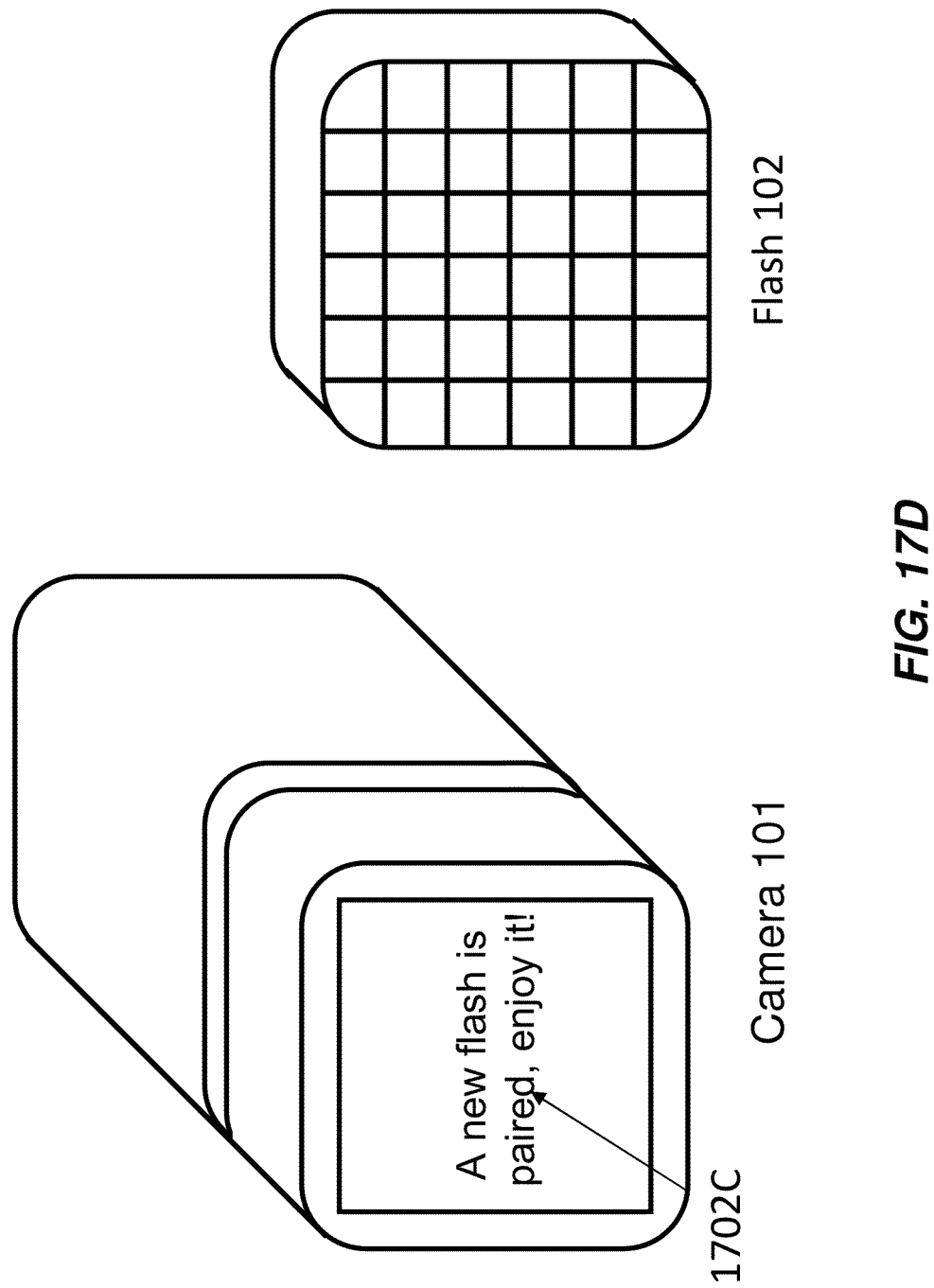
Figure 17E:
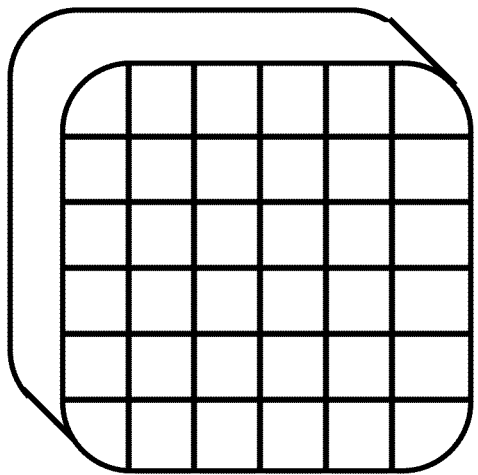
Figure 17E:
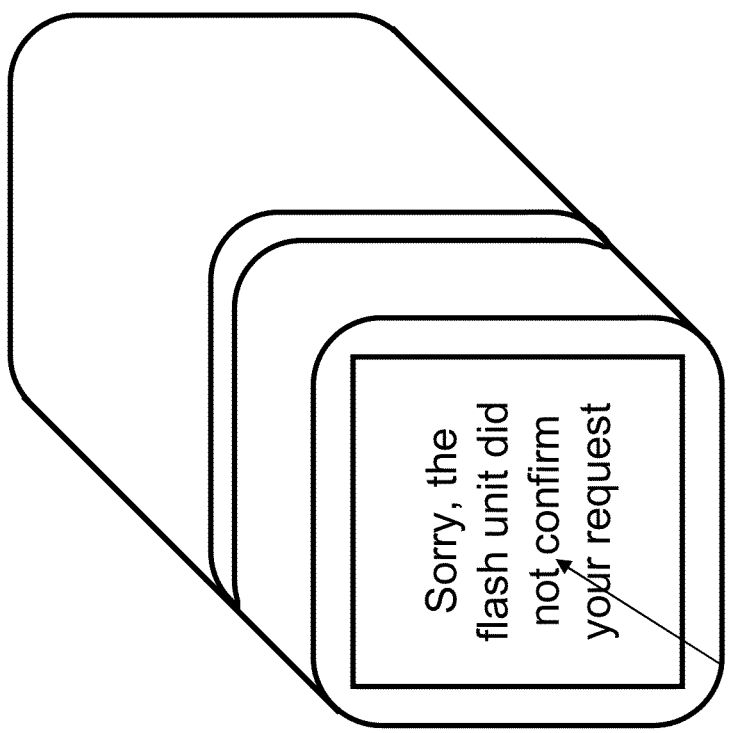
Figure 22A:
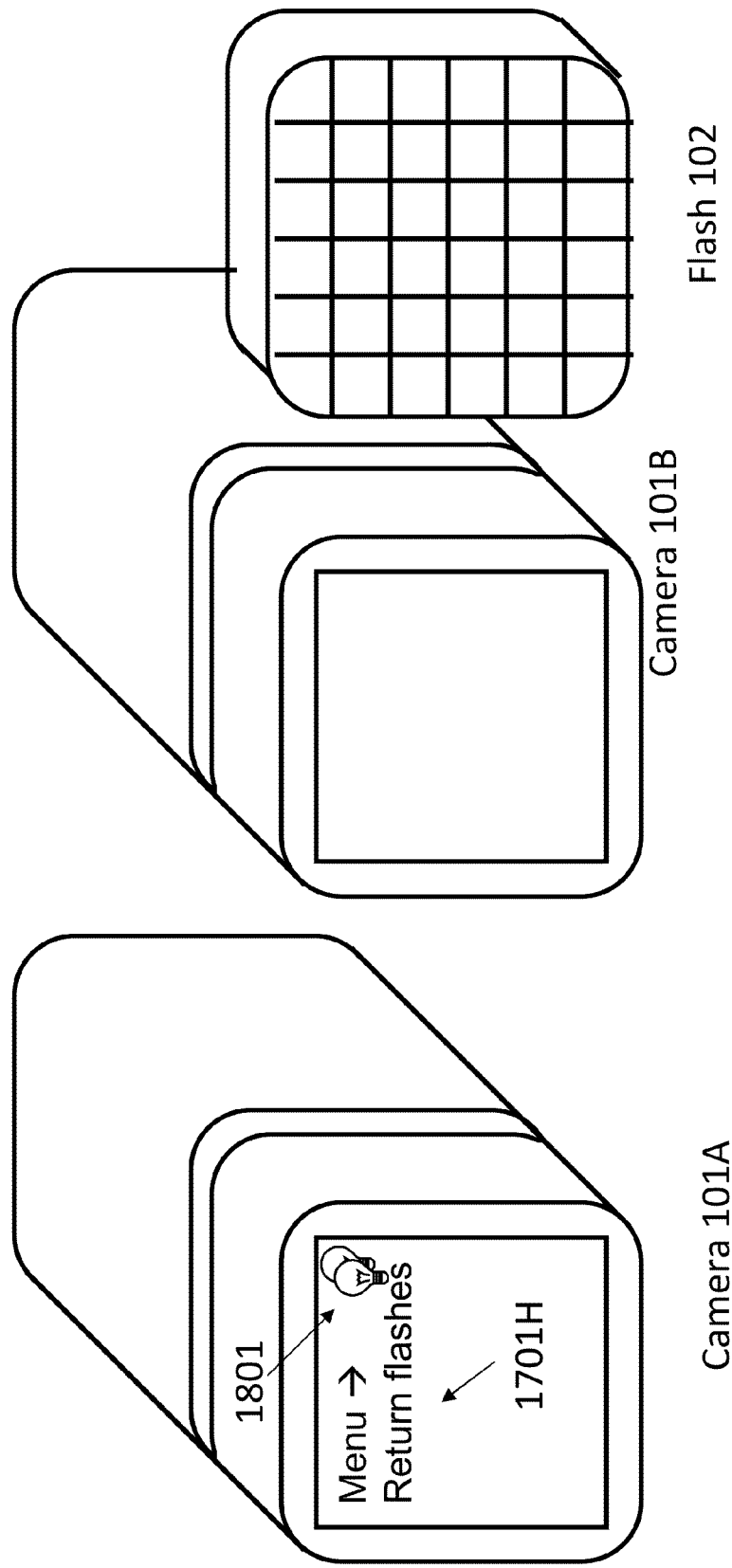
Figure 22B:
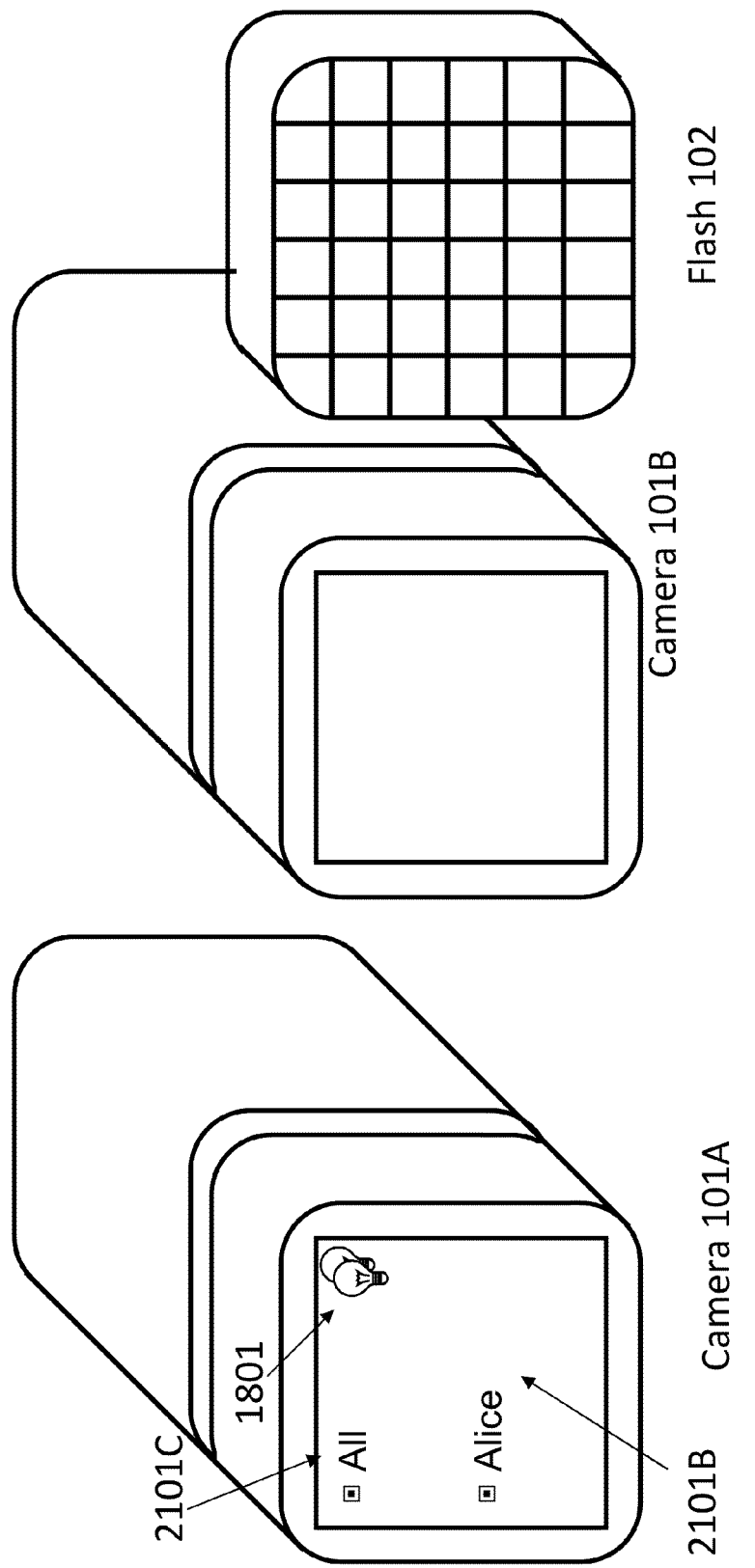

Referring now to FIG. 16, there is shown a flow diagram depicting a method of returning a borrowed flash 102, according to one embodiment. Referring now also to FIGS. 22A through 22C, there is shown an example of a method of returning a borrowed flash 102, according to one embodiment. One skilled in the art will recognize that the particular steps shown in FIG. 16, and the particular arrangement of devices, inputs, and screen shots shown in FIGS. 22A through 22C, are merely exemplary.

Input is received 1601 from the user to return borrowed flash(es) 102 to other users. For example, the user may select a Return Flashes command from menu 1701H shown on the display screen of camera 101A. In response, camera 101A lists 1602 recently borrowed flashes 102, for example in a list that includes any number of individual entries 2101B, and may also include an "All" entry 2101C. Input is received 1603 from the user to select flash(es) 102 from the list, for example by checking off "All" entry 2101C. Camera 101A sends one or more message(s) to disconnect 1604 from the selected flash(es) 102. Once disconnection is complete, confirmation message 1702L is displayed 1605 on the screen of camera 101A. The method ends 1699.

Image Assembly

In embodiments where multiple images are captured, whether from a single camera 101 or from multiple cameras 101, images may be stored and associated with one another in any suitable manner. This can be performed at camera 101, or at data store 608 associated with server 611, or at any other suitable location and according to any suitable centralized or distributed scheme.

In at least one embodiment, images are transmitted to server 611 or other location for storage thereon. In another embodiment, images can be maintained at separate cameras 101 and/or other locations, but can be tagged in a manner that allows for generation of an assembled final image or picture for display. Any suitable network protocol and file transfer mechanisms, as may be known in the art, can be used for such transmission and/or association of captured images.

Generation of Relighted Images and Animations

In at least one embodiment, images captured according to the techniques described above can be processed, assembled and presented as relighted images. This can be performed, for example, by assembling a relighted image from various portions of the captured images, so as to obtain a desired relighting effect. In at least one embodiment, known lighting characteristics of actual (or fictional) environments can be stored as "environment maps" and applied, so that the resultant relighted image is a simulation of what the image would have looked like had it been actually captured in that environment. These lighting characteristics can include, for example, positions, intensities, colors, etc., of various light sources in the environment to be recreated. Based on these characteristics, an image assembly component extracts and combines various portions of captured images to generate a relighted image. The relighted image can be presented as a static image, or as an interactive image which allows the viewer to change the lighting parameters as desired, and to view, in real-time, the effect of such changes.

Apparatus for Display of Relighted Images

Figure 6A:
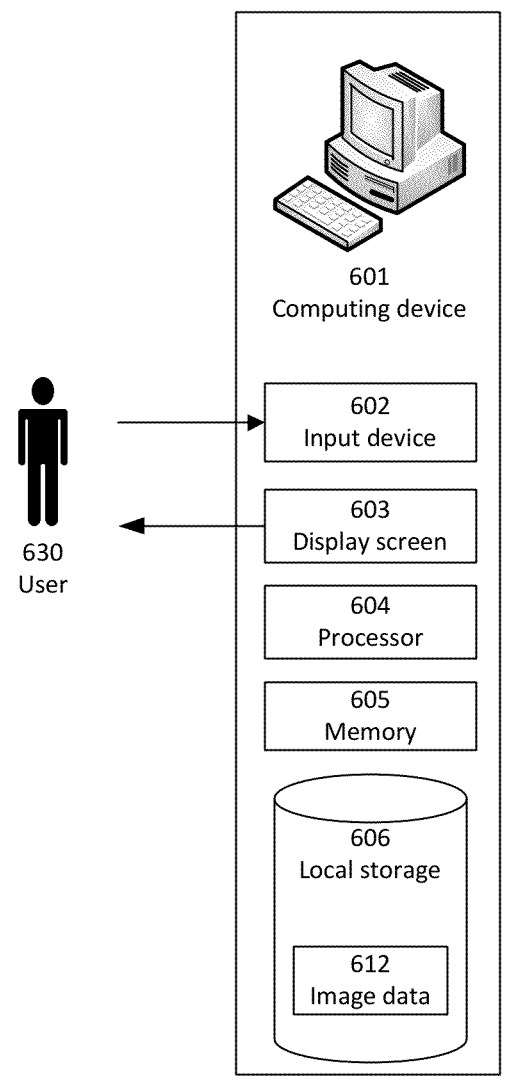
FIG. 6A is a block diagram depicting a hardware architecture for displaying relighted images according to one embodiment.

Referring now to FIG. 6A, there is shown a block diagram depicting a hardware architecture for displaying relighted images according to one embodiment. Such an architecture can be used, for example, for displaying relighted images using a stand-alone software application running on any suitable computing device or other electronic device. Computing device 601 may be any electronic device adapted to run software; for example, computing device 601 may be a desktop computer, laptop computer, personal digital assistant (PDA), cellular telephone, smartphone, music player, handheld computer, tablet computer, kiosk, game system, or the like. In at least one embodiment, computing device 601 is a desktop computer running an operating system such as Microsoft Windows, available from Microsoft Corporation of Redmond, Wash., or Mac OS X, available from Apple Inc. of Cupertino, Calif., or iOS, available from Apple Inc. of Cupertino, Calif.

The techniques of the present invention can be implemented as part of a software application and/or operating system running on computing device 601 according to well-known techniques. The software application may be a desktop application or a web-based application that is accessible via a browser such as Microsoft Internet Explorer, available from Microsoft Corporation of Redmond, Wash., or by a specialized web-based client application.

In at least one embodiment, computing device 601 comprises a number of hardware components as are well known to those skilled in the art. Input device 602 can be a keyboard, mouse, touchscreen, trackball, trackpad, five-way switch, voice input device, joystick, and/or any combination thereof. Display screen 603 presents visual output to user 630, and can be supplemented by other types of output device(s) such as a speaker, printer, and/or any combination thereof. Processor 604 can be a conventional microprocessor for performing operations on data under the direction of software, according to well-known techniques. Memory 605 can be random-access memory having a structure and architecture as are known in the art, for use by processor 304 in the course of running software. Local storage 606 can be any magnetic, optical, and/or electrical storage device for storage of data in digital form; examples include flash memory, magnetic hard drive, CD-ROM, DVD-ROM, and/or the like. In at least one embodiment, local storage 606 includes image data 612, which may store pictures and/or images using any suitable format, including relighted images, whether compressed or uncompressed. In at least one embodiment, image data 612 includes data files representing depth-enhanced pictures and/or light-field pictures.

In at least one embodiment, the techniques of the present invention can be applied to three-dimensional images displayed on a three-dimensional screen. Thus, display screen 603 can be a screen adapted to the display of three-dimensional objects. In at least one embodiment, relighted images may be displayed with a depth component, so that such a three-dimensional device can accurately depict objects within the light-field images at appropriate depths.

One skilled in the art will recognize that the particular arrangement of hardware elements shown in FIG. 6A is merely exemplary, and that the invention can be implemented using different hardware elements configured in any of a number of different ways. Thus, the particular architecture shown in FIG. 6A is merely illustrative and is not intended to limit the scope of the invention in any way.

Figure 6B:
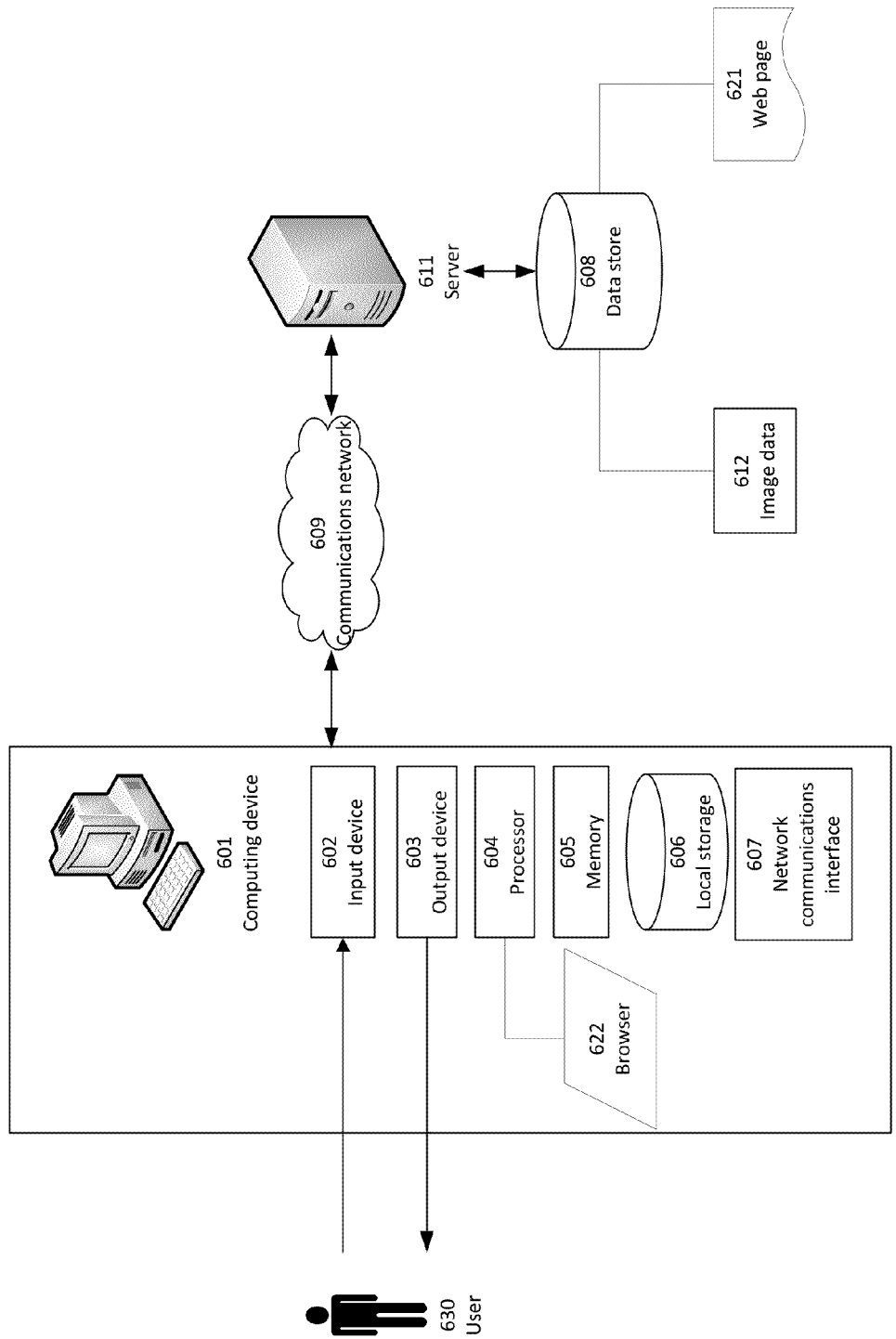
FIG. 6B is a block diagram depicting a hardware architecture for displaying relighted images in a client/server environment according to one embodiment of the present invention.

Referring now to FIG. 6B, there is shown a block diagram depicting a hardware architecture for displaying relighted images in a client/server environment according to one embodiment of the present invention. Such an architecture can be used, for example, for displaying relighted images in connection with a web page. Processor 604 runs browser 622 software according to well known mechanisms. Browser 622 may be any conventional browser, such as Microsoft Internet Explorer, available from Microsoft Corporation of Redmond, Wash.

Network communications interface 607 is an electronic component that facilitates communication of data to and from other computing devices over communications network 609. Communications network 609 can be the Internet or any other electronic communications network.

Server 611 communicates with computing device 601 over network 609, and in various embodiments can be located remotely or locally with respect to computing device 601. In at least one embodiment, server 611 is associated with data store 608, which can act as a repository for web-based resources such as web pages 621. In at least one embodiment, data store 608 also includes image data 612, which may store pictures and/or images, including relighting data, using any suitable format, whether compressed or uncompressed; in at least one embodiment, image data 612 includes data files representing depth-enhanced pictures and/or light-field pictures. Image data 612 can be located at server 611 or at computing device 601. In at least one embodiment, image data 612 (or some portion thereof) can be transmitted to computing device 601 as part of a client/server session, and stored in a cache implemented in local storage 606, to improve responsiveness while user 630 interacts with computing device 601.

In at least one embodiment, in response to requests from computing device 601, server 611 transmits web pages 621 to computing device 601 over network 609. Any or all of such web pages 621 may contain code, such as JavaScript code for execution on computing device 201, for implementing the techniques of the present invention via browser 622. Alternatively, the software code for implementing the techniques of the present invention may reside at computing device 601. One skilled in the art will recognize that the present invention may be implemented using a distributed software architecture if appropriate. One skilled in the art will further recognize that the client/server architecture shown in FIG. 6B is merely exemplary, and that other architectures can be used to implement the present invention, including architectures that are not necessarily web-based. Thus, the particular architecture shown in FIG. 6B is merely illustrative and is not intended to limit the scope of the invention in any way.

Environment Map

Image data 612 can include relighting data according to any suitable representation. One way to represent relighting data is as an environment map that specifies how any number of light sources illuminate the subject at any given time. For example, such an environment map can be modeled as a sphere or cube surrounding the subject. Each point on the sphere or cube is associated with characteristics of the light that is coming from a corresponding direction in the environment being mapped. For example, if in the original environment a light source was positioned at a certain direction and latitude with respect to the subject, the environment map would specify the characteristics of that light source, indicating its position as being associated with a point on a sphere or cube corresponding to that direction and latitude.

Figure 4:
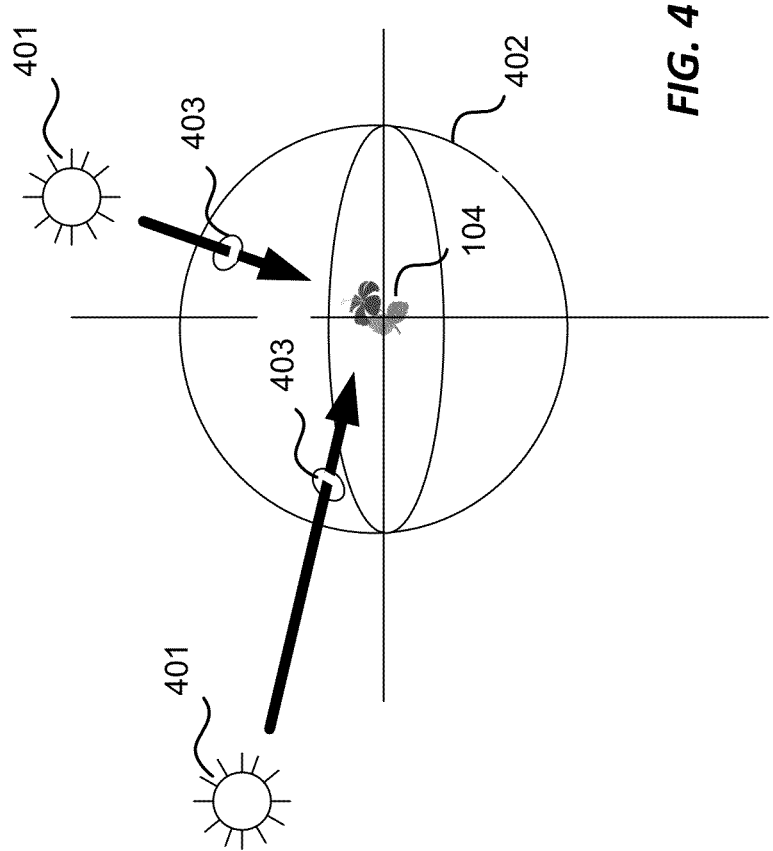
FIG. 4 depicts an example of an environment map for specifying lighting characteristics according to one embodiment.

Referring now to FIG. 4, there is shown an example of an environment map 402 for specifying lighting characteristics according to one embodiment. Here, environment map 402 is depicted as a sphere surrounding subject 104. For illustrative purposes, two light sources 401 are included, although one skilled in the art will recognize that any number of light sources 401 can be used. Environment map 402 specifies how subject 104 would be lighted if it were in a particular lighting environment characterized by the depicted two light sources 401. In at least one embodiment, the positions of light sources 401 can be specified with reference to environment map 402 by noting the position 403 on the sphere where a light ray from each light source 401 would intersect the surface of the sphere. Additional characteristics, such as color, intensity, and the like, can also be specified for each light source 401. In at least one embodiment, therefore, a full description of the lighting environment to be replicated can be specified by associated functions, values, and/or other parameters with locations on the sphere that defines environment map 402.

Once a specification such as environment map 402 has been made available, the lighting environment specified by map 402 can be recreated by assembling an image from pieces of multiple images taken with different lighting characteristics, such as those captured using the mechanisms and techniques described herein. This type of relighting can be used to replicate lighting characteristics of actual known (or fictional) environments. For example, an environment map 402 can be generated that specifies the lighting in a particular location within St. Peters Basilica at a particular time of day and under particular weather conditions. Once such an environment map 402 has been specified, an image containing a subject 104 can be presented in such a manner that the subject 104 is lighted in the same manner as though it were actually in that location within St. Peters Basilica at that time of day. The environment map 402 can represent incident lighting coming from any number of directions, and can thereby model the source environment to any desired degree of precision. Lighting characteristics can be tweaked and/or adjusted by changing aspects of environment map 402 as desired.

In at least one embodiment, application of lighting characteristics specified by an environment map 402 involves assembling a final image from a plurality of component images. Each component image has original lighting characteristics based on the location(s) of flash(es) 102 with respect to subject 104 when the image was captured. (In some cases, the original lighting characteristics may also be based on ambient light). These original lighting characteristics, such as flash 102 location(s) may be available as stored metadata that was generated when the image was originally captured, so that the metadata specifies actual flash 102 location(s). Alternatively, in at least one embodiment, the system of the present invention can analyze the original images and deduce flash 102 location(s) based on observed lighting characteristics of the images themselves. For example, photometric stereo, a known method of recovering surface orientation and depth under a known lighting condition, can be used to deduce flash 102 location(s).

In some situations, a bas-relief ambiguity may be experienced, wherein a set of identical shapes can result in identical images if the lighting condition is unknown. See, for example, P. N. Belhumeur et al., "The Bas-Relief Ambiguity", in *International Journal of Computer Vision* 35(1), 33-44 (1999). In at least one embodiment, a depth map as described in related U.S. Utility application Ser. No. 13/688,026 for "Extended Depth Of Field And Variable Center Of Perspective In Light-Field Processing," filed Nov. 28, 2012, the problem can be disambiguated and the previously unknown positions of the light sources can be determined.

In at least one embodiment, a user interface control (such as a slider) can be provided to allow a user to make changes to the environment map 402, for example by changing the position of light sources. In at least one embodiment, such changes can be reflected, in real-time, by corresponding changes to the generated image. For example, lighting can be recomputed and reapplied in real-time in response to the changes made by the user.

Low-Pass Filtering

In some cases, the position of a "virtual" light source (i.e., a light source specified by environment map 402) does not correspond to a position of any actual light source (flash 102) in any of the captured images. An attempt can be made to interpolate the image from two (or more) captured images having flash 102 locations that, to at least some degree, are somewhat proximate to the position of the virtual light source. However, if a user's input causes the virtual light source to move from a first location that does correspond to a position that a flash 102 occupied in one of the captured images to a second location that does not correspond to such a position, a darkening of the overall image may be detected as the virtual light source moves. To compensate for this unwanted effect, the virtual lighting can be low-pass filtered to band-limit it and thereby ensure some level of consistency in overall brightness. More particularly, the low-pass filter band-limits the virtual lighting based on the geometric frequency spectrum of the lighting arrangement of the original set of captured images. The size, number, and geometric arrangement of flashes 102 used in the original image capture determine what degree of low-pass filtering is appropriate; the more images that were taken with different positions of flashes 102 (and the more closely spaced they were), the more granularity is available for virtual lighting. Low-pass filtering is applied to ensure that unwanted artifacts are avoided, by ensuring that the virtual light sources are sufficiently wide to prevent artificial brightening when a virtual light source aligns with a flash location in one of the captured images. Examples of such filtering are discussed below in connection with FIGS. 9A through 10E.

In at least one embodiment, image data 612 can include representations of any number of environment map(s) 402, and can also specify a relationship between different environment maps 402 and user input, so as to allow a user to adjust an environment map 402 by moving a cursor or by performing some other input. Further details for interactive playback is described below.

Relighting Animation

In at least one embodiment, a relighting animation can be generated. The relighting animation can include, for example, an animation that dynamically simulates changes in the lighting of the scene. For example, a lighting source may appear to move, or be activated and/or deactivated during the animation. In at least one embodiment, the relighting animation can be generated by creating a series of frames from the captured images, wherein each frame includes a different assembly of portions of images. The resultant animation can be made smooth or discontinuous, as desired. It can be presented linearly, without user interaction, or it can respond to user input (for example, the user may provide input to "scrub" forwards and/or backwards to control the display of the animation).

In at least one embodiment, a relighting animation can be shown on-the-fly while data capture is taking place. This allows a user to see results and immediately make changes and recapture the image data, so as to ensure that the captured data has the desired characteristics and quality level.

Interactive Playback of Relighted Images

In at least one embodiment, relighted images can be presented in an interactive manner. For example, an image can be presented on a display screen of a computing device, such as a desktop or laptop computer, cell phone, smartphone, kiosk, tablet computer, or the like. The computing device can be equipped with an input device that allows the user to select a particular location within the displayed image, for example by positioning a cursor over the location and clicking a button, or tapping on a touch-sensitive screen. In response to a user clicking or tapping on a particular location, the image can be relighted, for example to highlight an object at the selected location.

Figure 5:
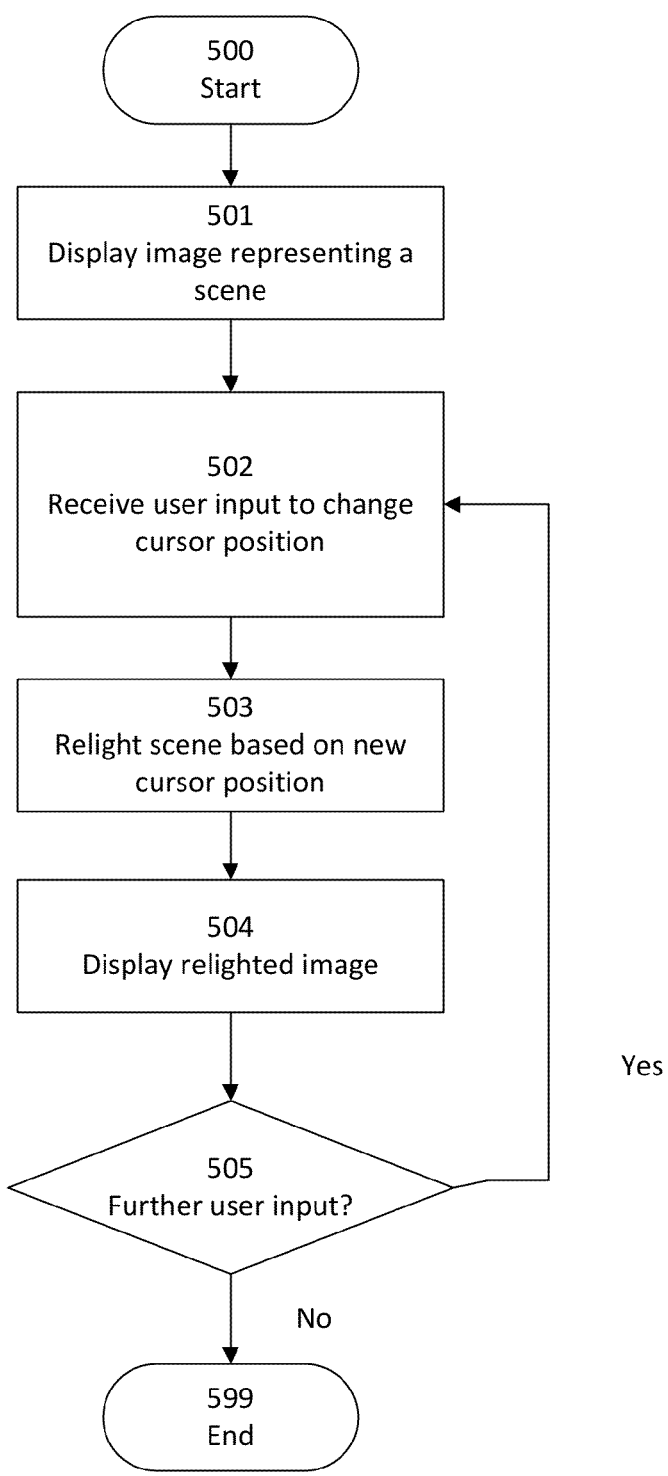
FIG. 5 depicts a method for interactive dynamic relighting in response to user input, according to one embodiment.

Referring now to FIG. 5, there is shown a method for interactive dynamic relighting in response to user input, according to one embodiment.

An initial image representing a scene is displayed 501 on a display device. In at least one embodiment, user input is received 502 to move a cursor around on a display screen (or drag a finger across a touch-sensitive screen); in response to this user input, the displayed scene is relighted 503, for example by selecting a new image for display 504, wherein the new image is a differently lighted version of the same scene.

Any suitable mechanism can be used for receiving user input 502 to cause positions of virtual light sources to move. For example, the user can move a cursor or drag a finger across a touch-sensitive screen. Alternatively, if device 601 contains an accelerometer or other sensor for detecting tilt and movement, the user can tilt, move, and/or shake device 601 to cause positions of virtual light sources to move.

The relighting can be presented in a dynamic manner that simulates movement of a virtual light source mimicking the movement of the user input. Thus, as the user moves the cursor or drags a finger across the screen, a dynamic display can simulate correspondent movement of a virtual light source. For each frame, a position of the virtual light source is determined, and a relighted image is presented containing a representation of the scene as though lighted from that position. In at least one embodiment, inertial movement of the virtual light source can be implemented, so that the virtual light source can be made to appear to continue moving for some period of time after the user has stopped moving the cursor or finger.

In at least one embodiment, such relighting is accomplished by selecting among a plurality of available relighted images for the scene, and displaying the selected relighted image. In at least one embodiment, two or more stored relighted images can be combined with one another to generate the displayed relighted image, for example by interpolation, averaging, or some other mechanism for combination. In at least one embodiment, such intermediate relighted images can be generated in advance from captured images, and stored for later use. In at least one embodiment, such intermediate relighted images can be generated on-the-fly as needed based on user input. Once generated, the intermediate relighted images can be cached or stored for later use.

In at least one embodiment, relighting is performed by adjusting an environment map according to the user input, or by selecting from a plurality of available environment maps in response to the user input. In such an embodiment, a new representation of the scene is generated, as illuminated by virtual light source(s) specified in the environment map.

If, in step 505, any further user input is detected, the method returns to step 502. Otherwise, the method ends 599.

For example, in at least one embodiment, moving a cursor location or contact point to the left or right causes the apparent light source to move in a corresponding direction (left of right). In at least one embodiment, virtual light sources are weighted and normalized so that the total apparent light energy coming from virtual light sources is kept relatively constant. In at least one embodiment, the user can also control a distribution curve representing a spread for each virtual light source.

In at least one embodiment, a user interface control can be provided for adding and positioning a new virtual light source. Again, the user can move the new virtual light source and, in at lease one embodiment, can control a distribution curve representing a spread for the new virtual light source. In response, the system can select an appropriate relighted image for display from a set of available relighted images. In at least one embodiment, the system can generate a new relighted image by selectively combining and/or interpolating from available relighted images.

In at least one embodiment, relighting can be performed in response to scrolling. Thus, the user input can specify a scroll command, causing an image subject to scroll in a particular direction on screen 603. An animated relighting effect can be applied, to cause the subject to be lighted differently depending on its position on the screen. For example, virtual lighting can be implemented that simulates a light source at the top of screen 603. As an image subject moves around the screen, subtle changes in lighting can be applied to cause the light source to appear to be positioned at the top of the screen 603. In such an embodiment, the subject is moving while the virtual light source remains stationary. One skilled in the art will recognize, however, that any combination of movement of the virtual light source and the subject can be implemented, with virtual relighting being performed to accurately simulate a lighting condition based on the relative positions of the virtual light source and the subject.

Other mechanisms for interactive relighting can also be performed. For example, in at least one embodiment, an image can be mapped to a three-dimensional shape, for example using known texture-mapping techniques. The shape can move around within a three-dimensionally modeled scene. In addition, the virtual light sources may themselves move, possibly in combination with movement of the three-dimensional objects. As the shape and/or lighting sources move, the mapped image can be relighted so that its appearance is consistent with relative positions of virtual light sources within the three-dimensional scene. Such a mechanism can improve the apparent realism of three-dimensional objects that include texture-mapped two-dimensional images, since it allows the two-dimensional images to respond appropriately and realistically to changes in lighting resulting from movement of light sources and/or the three-dimensional objects to which the two-dimensional images are mapped.

Combining Multiple Relighted Images

In some situations, it may be useful to combine portions of multiple relighted images. For example, one portion of a subject may be better illuminated in a first relighted image, while a second portion of the subject may be better illuminated in a second relighted image. In such a situation, a portion of the first relighted image representing the first portion of the subject may be combined with a different portion of the second relighted image representing the second portion of the subject. The two portions can be stitched together using any known mechanisms for combining multiple images. For example, interpolation can be performed in the area near the intersection of two image portions meet, so as to provide a smooth transition from one image portion to another. In this manner, a final image can be generated that contains the best portions of both relighted images. Such a technique can be extended to combinations including any number of portions of relighted images.

EXAMPLES

Referring now to FIGS. 7A through 7E, there is shown a series of relighted images 700A to 700E generated and presented according to one embodiment of the present invention. Each image 700 in the series has different relighting characteristics. In this example, each relighted image 700 is generated by combining two or more captured images, each of which was captured as part of an image capture session that involved moving a flash unit to a different position for each captured image. (Alternatively, multiple flash units could have been arranged to fire sequentially as the images were captured). For purposes of this example, eight captured images are available.

Superimposed on each relighted image 700A to 700E is a distribution graph 701A to 701E showing how the captured images are combined to generate the corresponding relighted image 700A to 700E. Each point 702A to 702H represents one of the captured images. The horizontal position of each point 702 roughly corresponds to the horizontal position of the light source (flash) corresponding to one of the captured images. Thus, leftmost point 702A represents a captured image that was illuminated by a flash positioned at the left side, while rightmost point 702H represents another captured image that was illuminated by a flash positioned at the right side. Intermediate points 702B, 702C, . . . 702G represent other captured images illuminated by the flash positioned at intermediate points. The vertical position of each point 702 indicates how much weighting is assigned to the corresponding captured image in generating the currently displayed relighted image 700.

Any arbitrary relighted image 700 can be generated by combining captured images with one another. Combining can be performed using any known mechanisms for combining images, including performing weighted averaging on values of individual pixels within the images. One skilled in the art will recognize that more sophisticated methods for combining images can be used.

In at least one embodiment, captured images are combined in a weighted manner, so as to simulate various lighting conditions. Distribution graph 701 for each relighted image 700 is a visual representation of the weighting pattern used for combining captured images in generating that relighted image 700. For example, relighted image 700A (depicted in FIG. 7A), combines captured images represented by points 702A, 702B, and 702C, with the highest weighting being assigned to the captured image corresponding to point 702A, a lower weight being assigned to the captured image corresponding to point 702B, and a relatively small weight being assigned to the captured image corresponding to point 702C. Points 702D through 702H are at the zero point (along the axis of graph 701A), indicating that those captured images do not contribute to currently displayed relighted image 700A.

As another example, relighted image 700B (depicted in FIG. 7B), combines captured images represented by points 702C, 702D, 702E, and 702F, with the highest weighting being assigned to the captured image corresponding to point 702E, and successively lower weights being assigned to the captured images corresponding to points 702D, 702F, and 702C. Points 702A, 702B, 702G, and 702H are at the zero point (along the axis of graph 701B), indicating that those captured images do not contribute to currently displayed relighted image 700A.

Figure 7A:
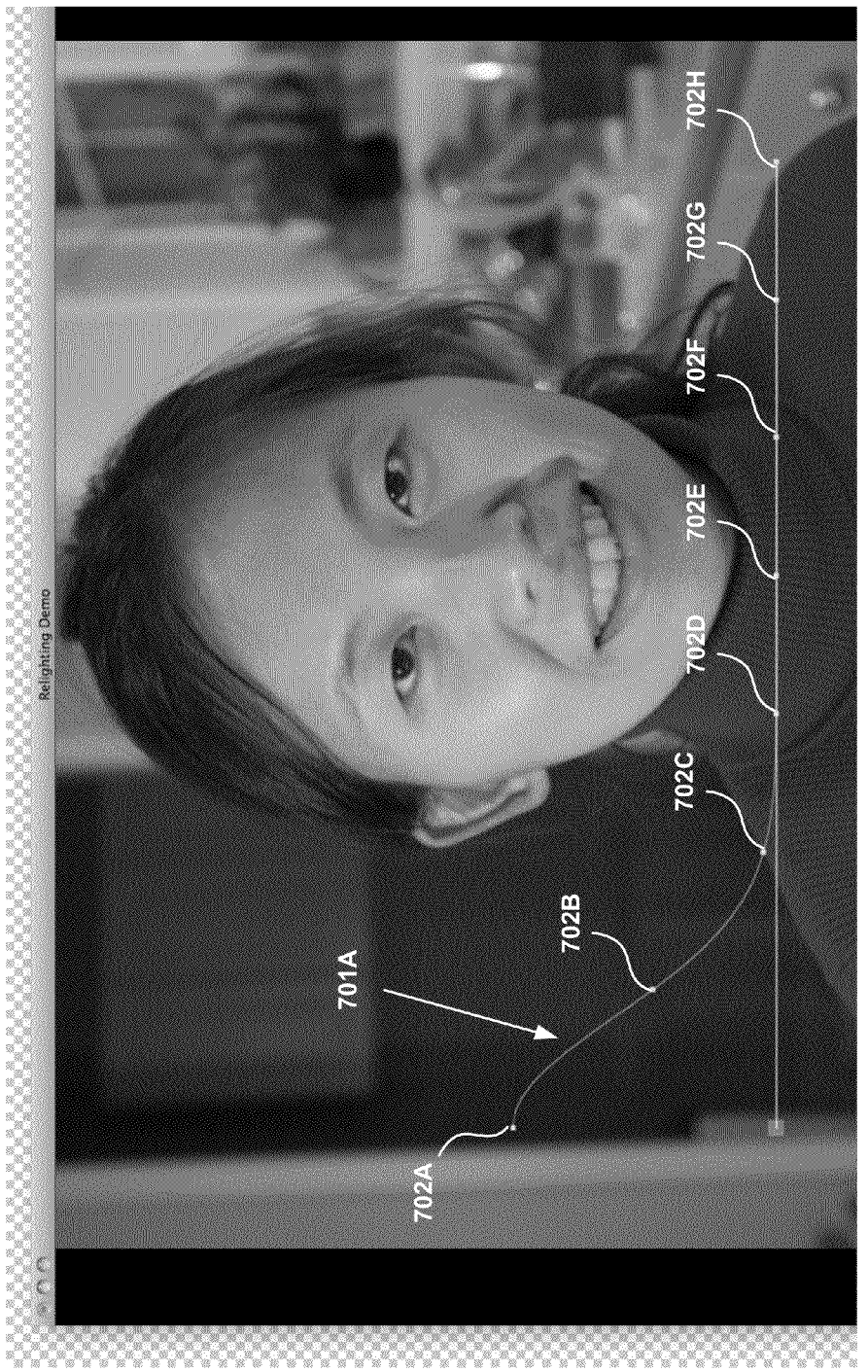
FIGS. 7A to 7E depict an example of a series of relighted images, generated and presented according to one embodiment.
Figure 7B:
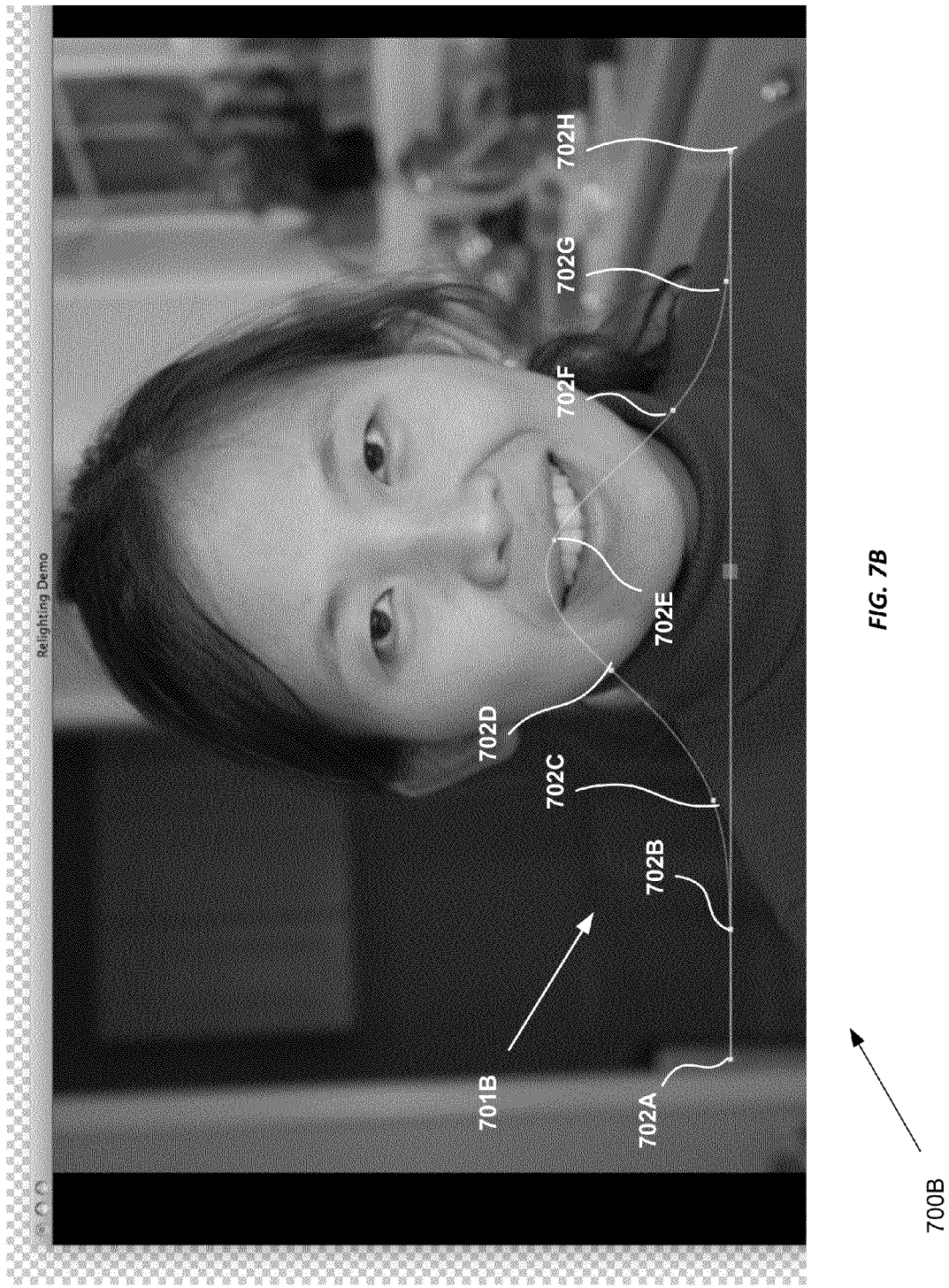
Figure 7C:
Figure 7D:
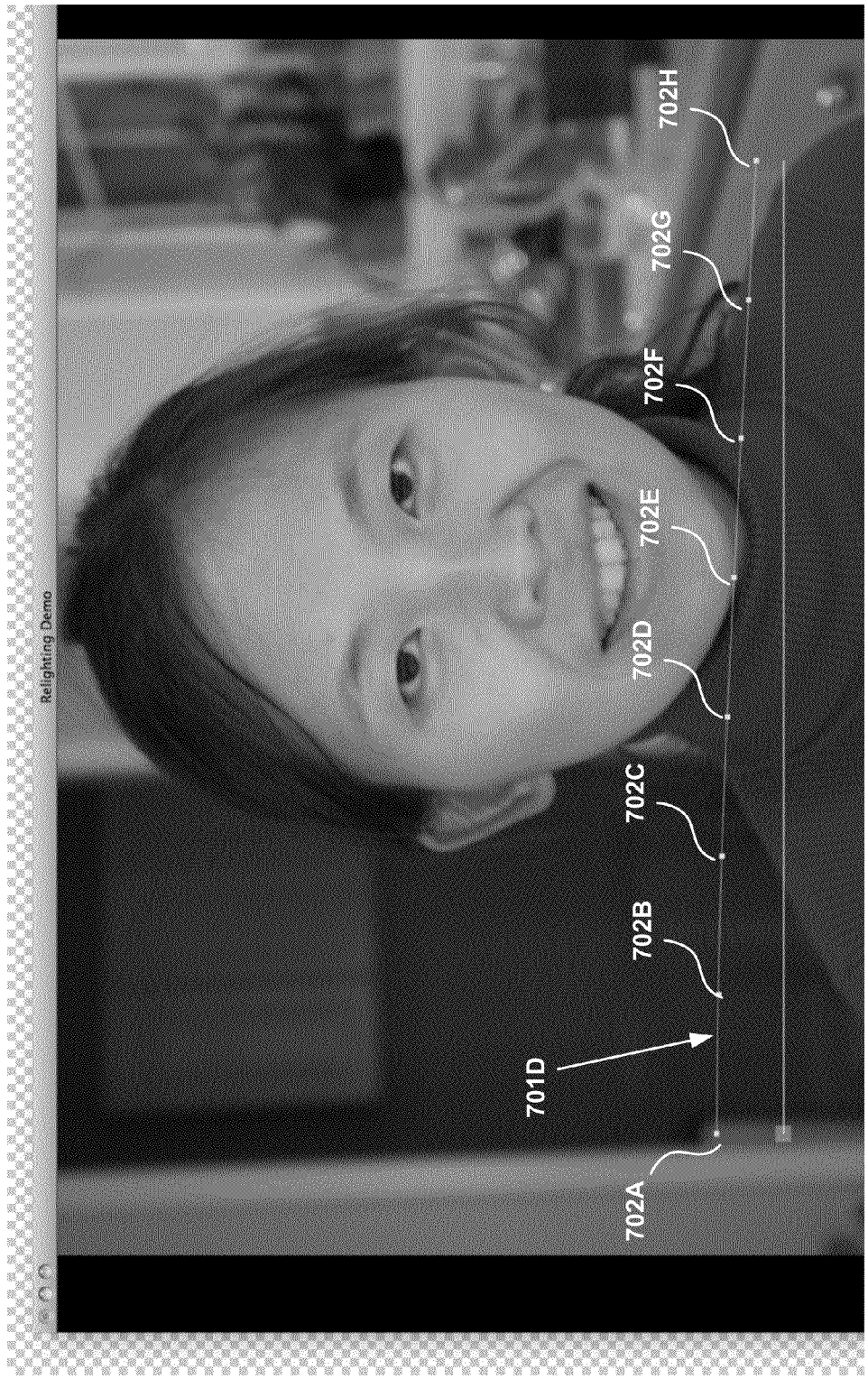
Figure 7E:
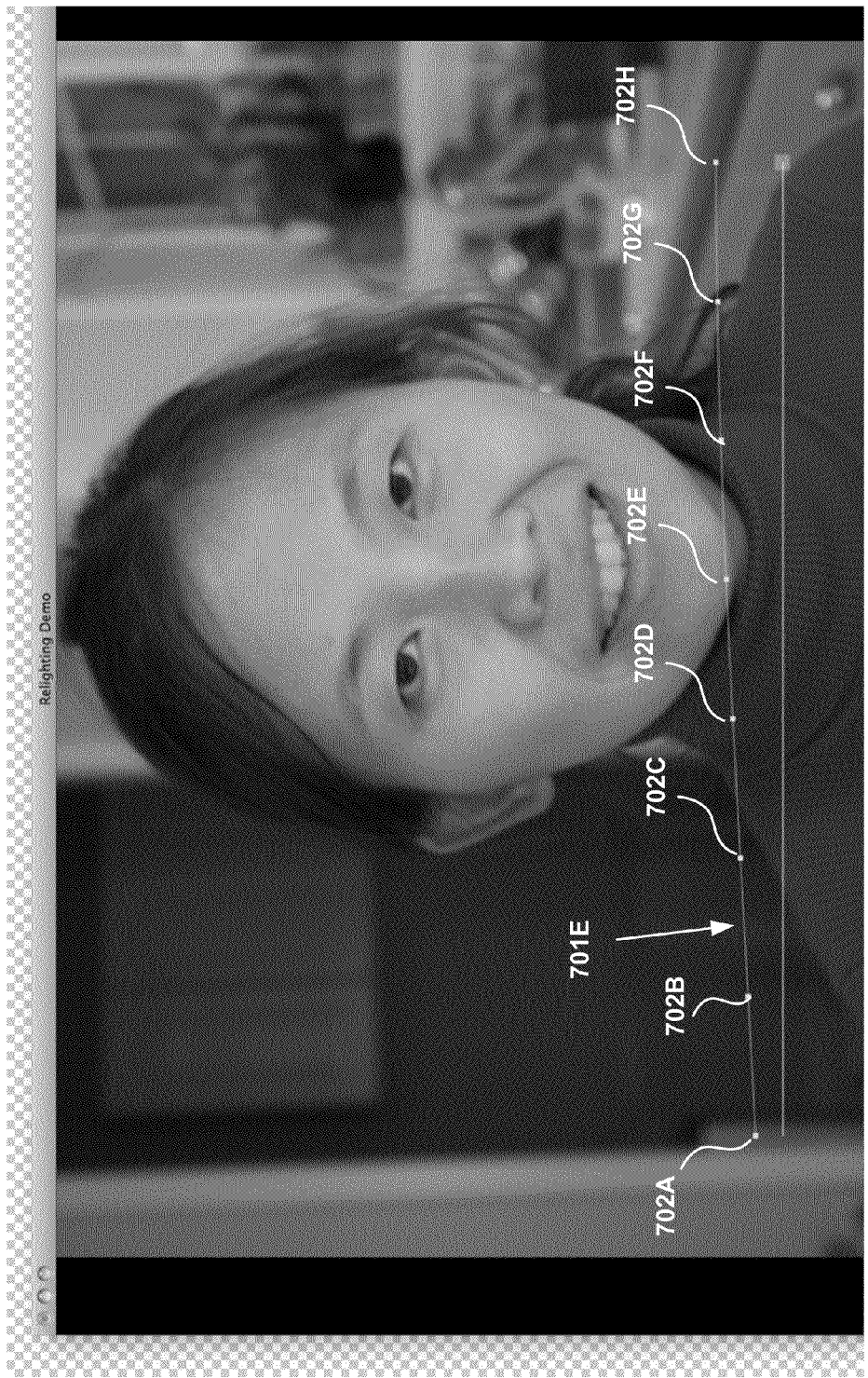

Another example, showing a flatter distribution of light, is shown in FIG. 7D. Here, although all eight captured images are used in generating relighted image 700D, those captured images having light sources toward the left side of image 700D are weighted slightly more heavily than those having light sources toward the right side of image 700D, as shown by the downward linear slope of distribution graph 701D. The opposite effect is shown in FIG. 7E.

In at least one embodiment, distribution graph 701 is interactive, so that the user can drag points along distribution graph 701 to cause different weightings to be applied, in a manner analogous to a graphic equalizer for controlling relative gains for different frequencies of audio output. Here, dragging a point upward causes a corresponding captured image to be weighted more heavily, while dragging a point downward reduces the weighting assigned to the corresponding captured image. One skilled in the art will recognize that direct manipulation of distribution graph 701 is merely one possible mechanism by which such input can be provided. In other embodiments, the user can change the relighting characteristics of relighted image 700 via any other suitable mechanism, including selecting among a number of predefined distributions, or providing input to change individual weightings via a keyboard, mouse, spoken input, and/or the like. In yet another embodiment, the system can be configured to select a distribution automatically. For example, the system can perform such relighting based on analysis of the image and/or to make the relighted image consistent with lighting characteristics of some other image.

Referring now to FIGS. 8A through 8F, there is shown another series of relighted images 700F to 700L generated and presented according to one embodiment of the present invention. Again, each image 700 in the series has different relighting characteristics, and each relighted image 700 is generated by combining two or more captured images, each of which was captured as part of an image capture session that involved moving a flash unit to a different position for each captured image. (Alternatively, multiple flash units could have been arranged to fire sequentially as the images were captured). For purposes of this example, fourteen captured images are available.

Figure 8A:
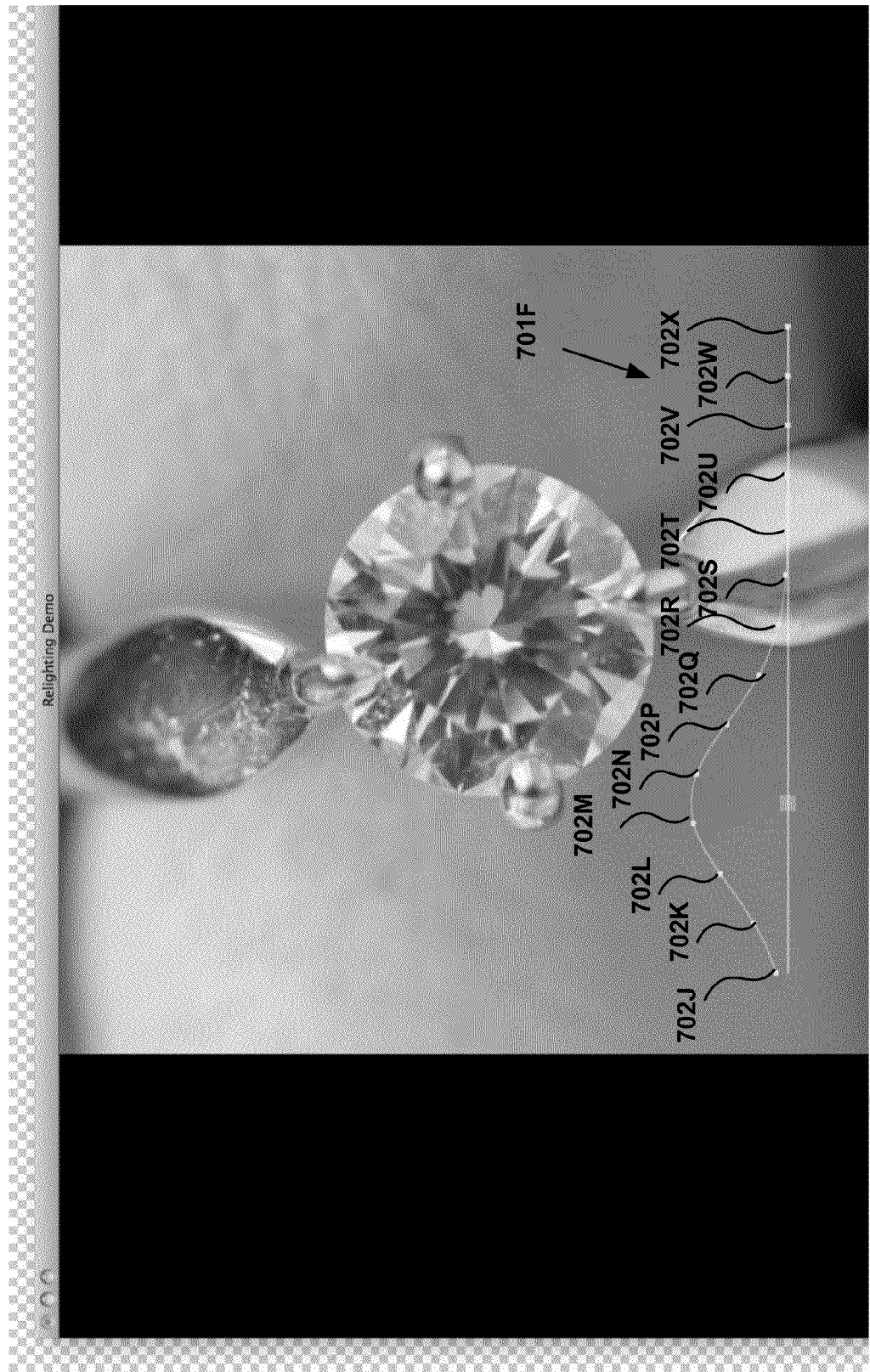
Figure 8B:
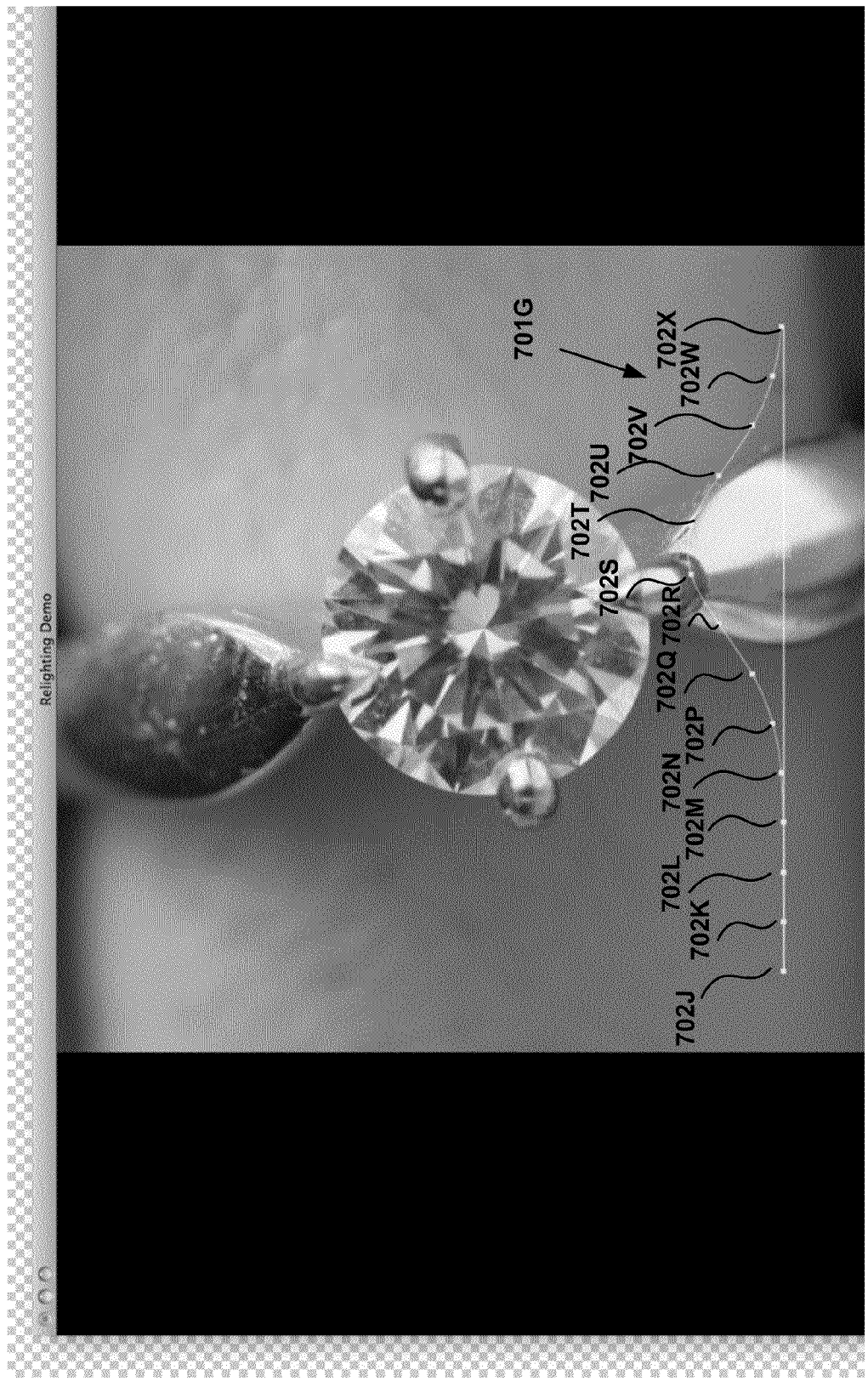
Figure 8C:
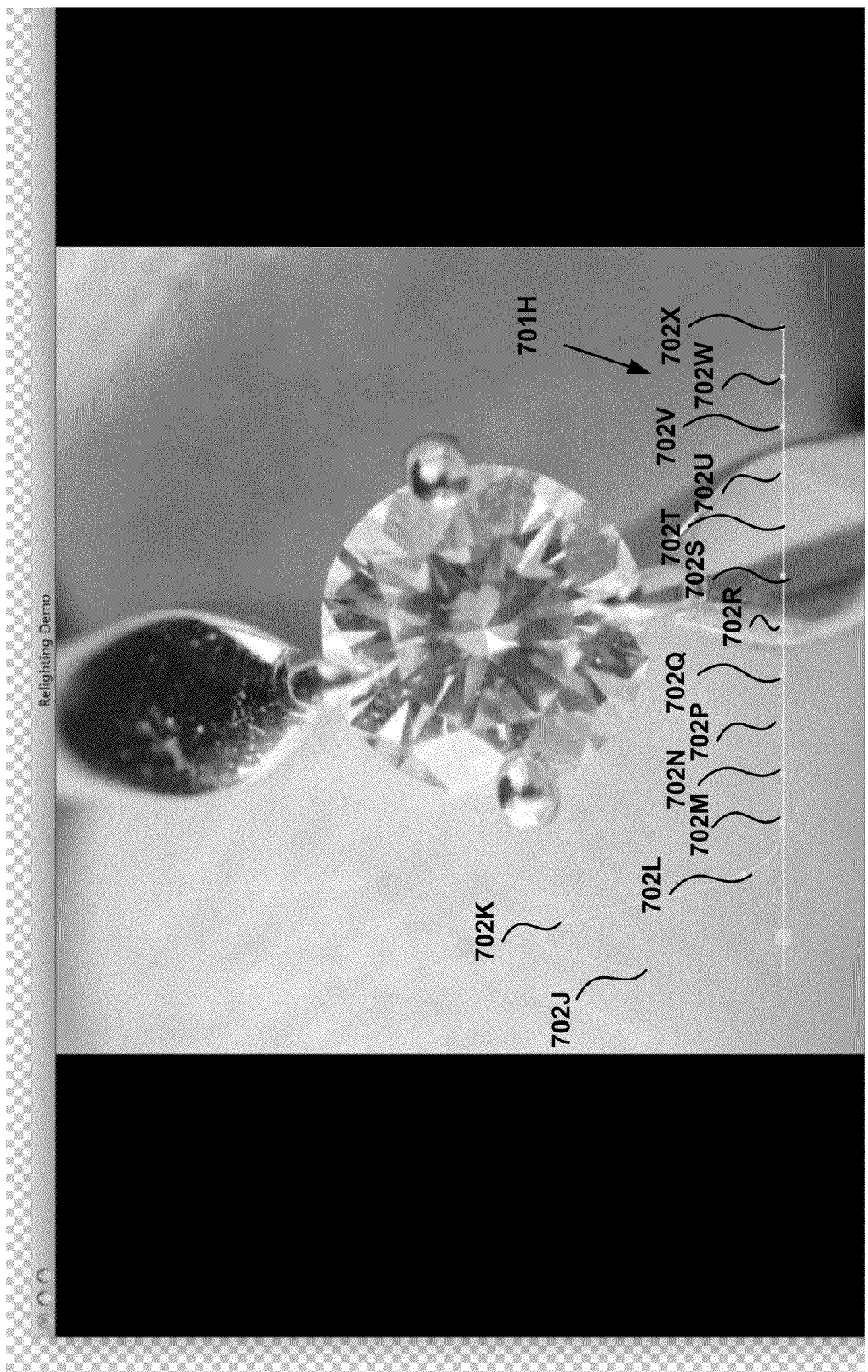
Figure 8E:
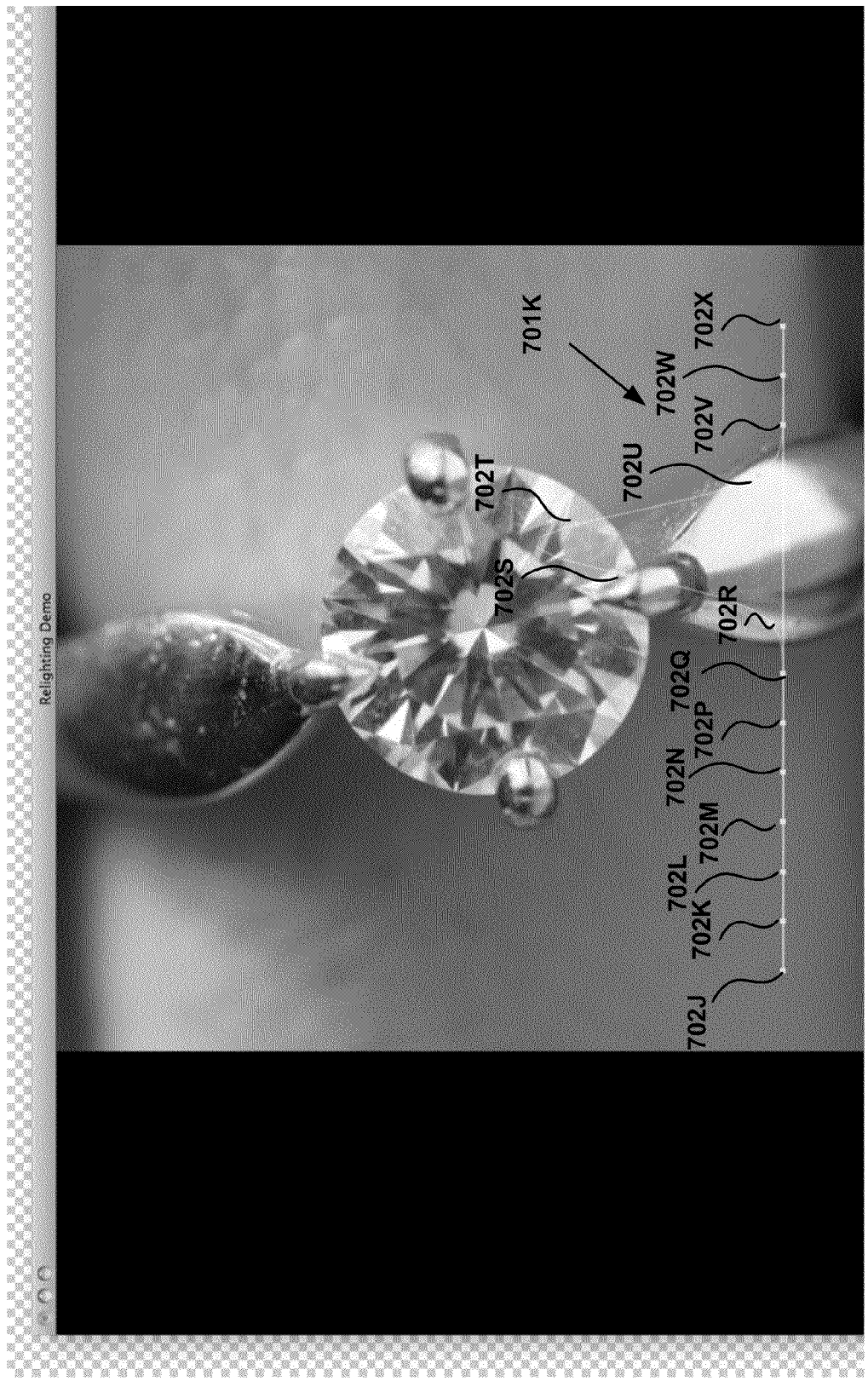
Figure 8F:
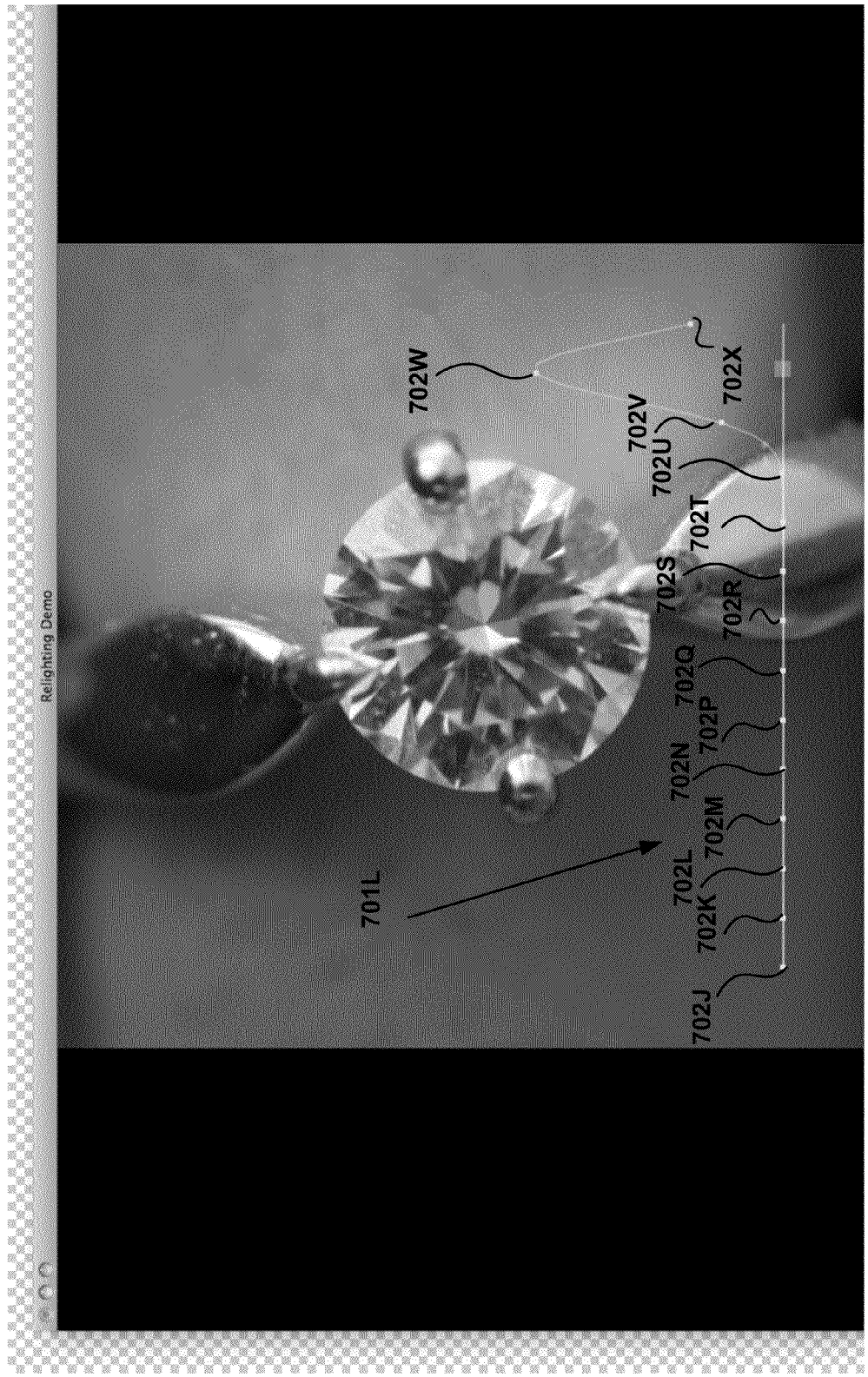
Figure 9A:
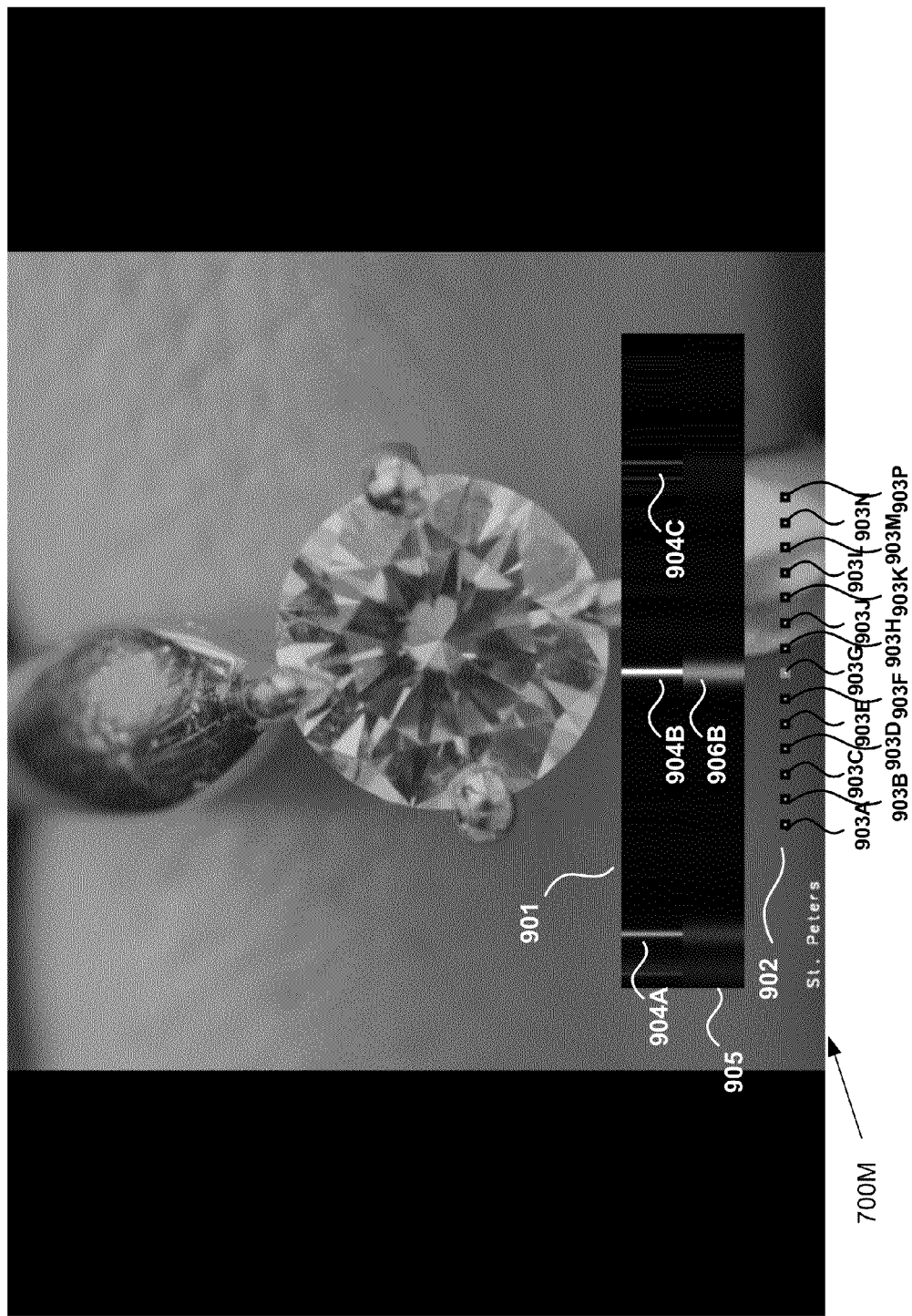
FIGS. 9A to 9E depict an example of a series of relighted images for a virtual environment, wherein insufficient filtering of the relighted image set causes undue variations in image brightness.
Figure 9B:
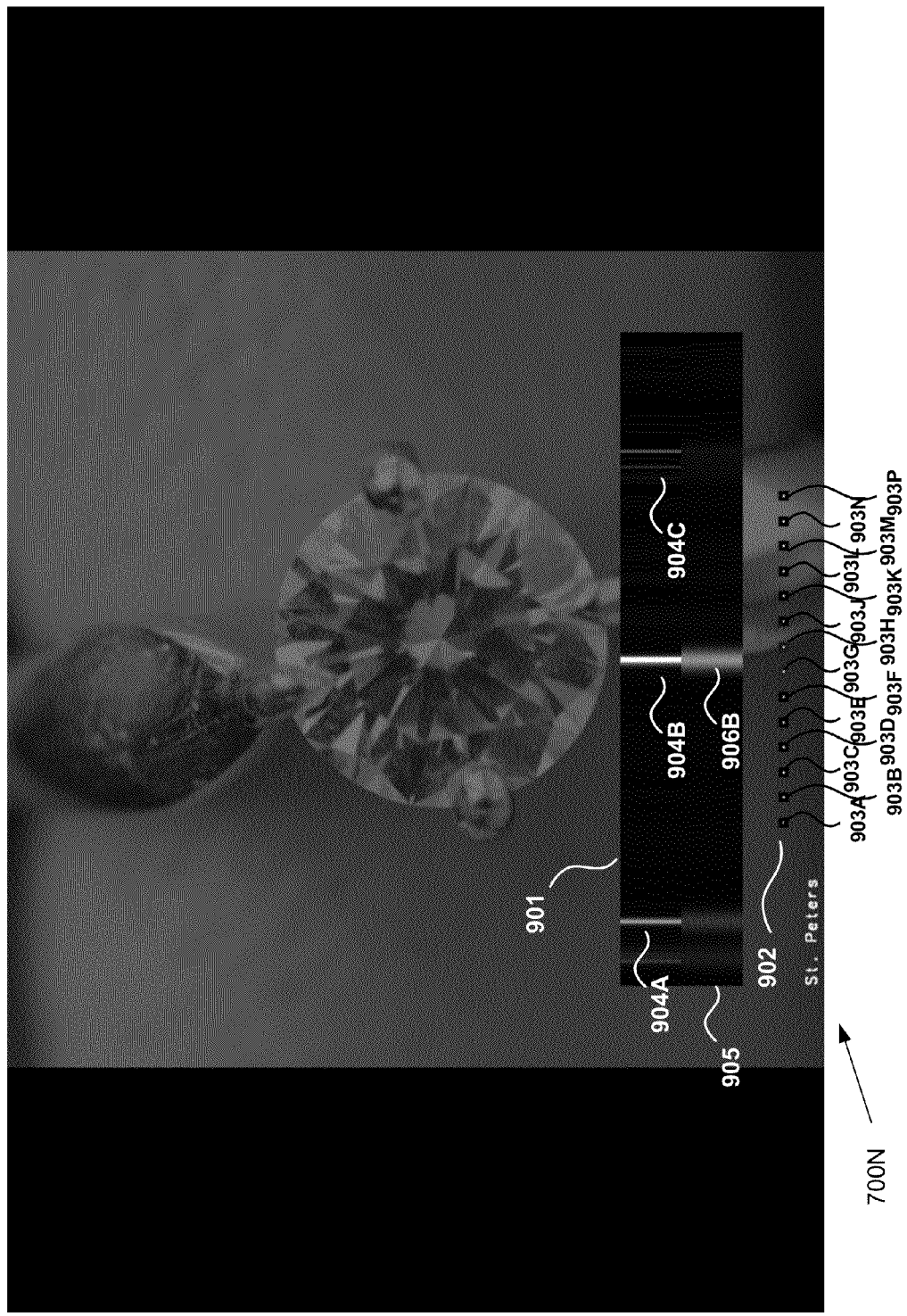
Figure 9C:
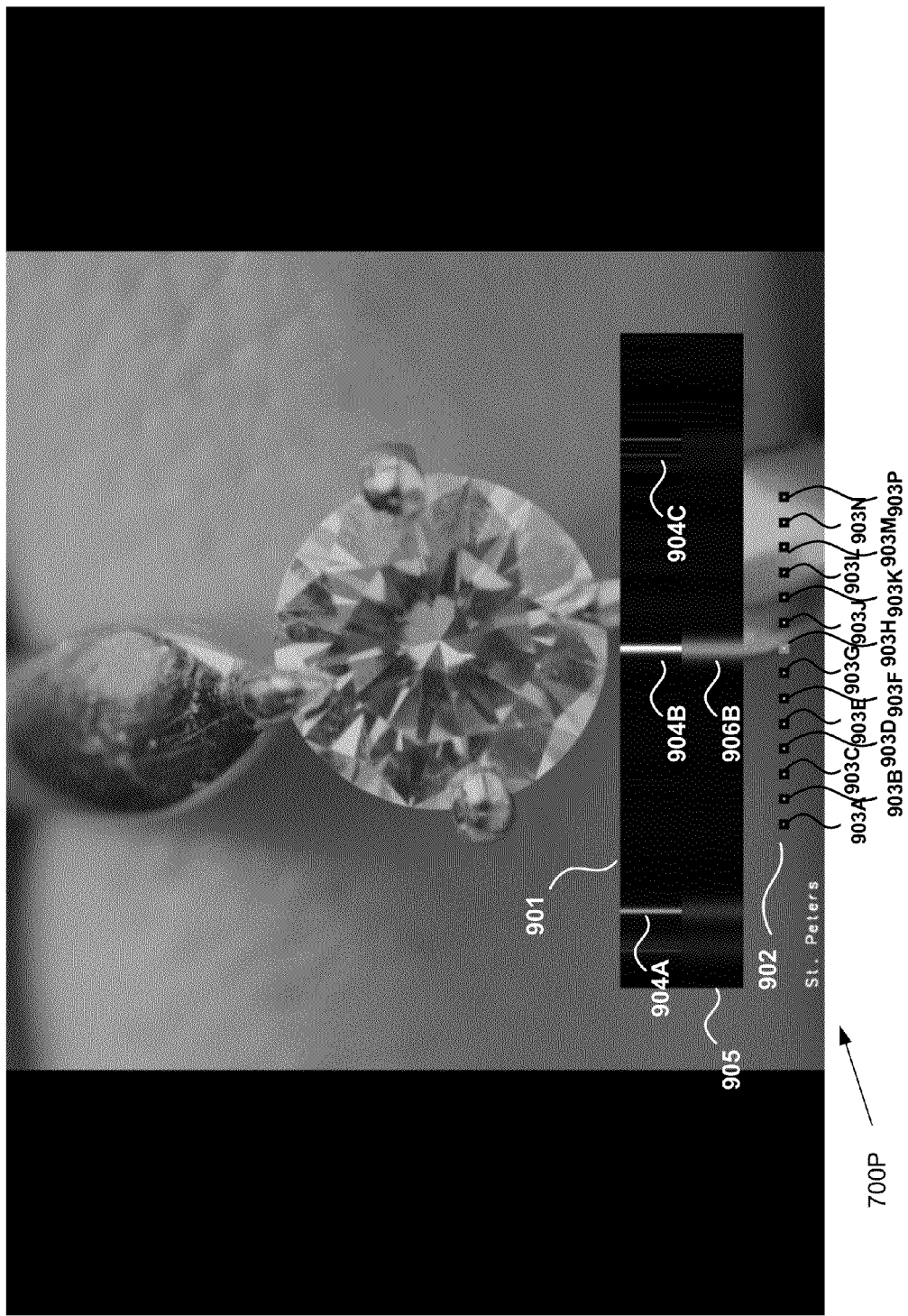
Figure 9D:
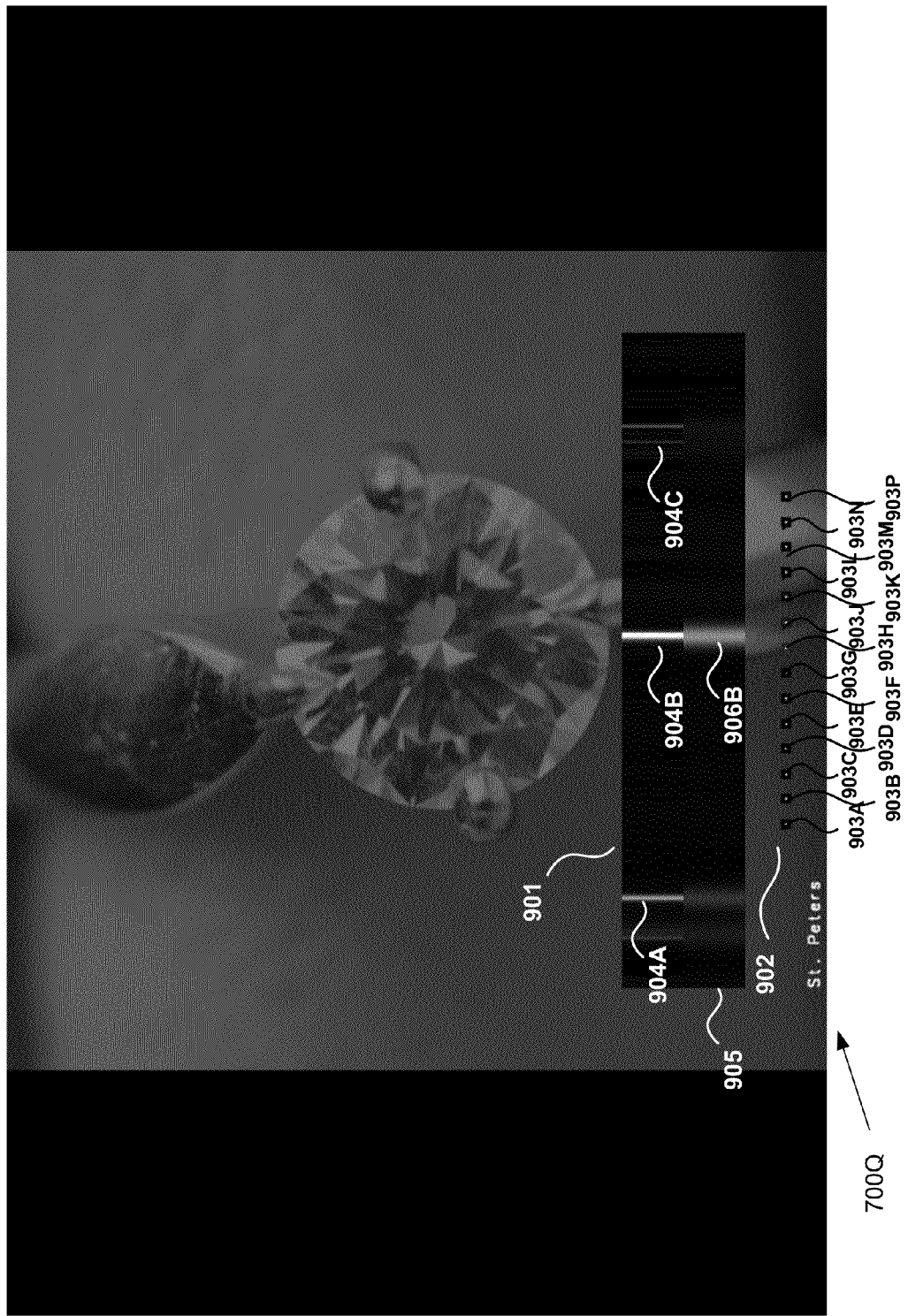
Figure 9E:
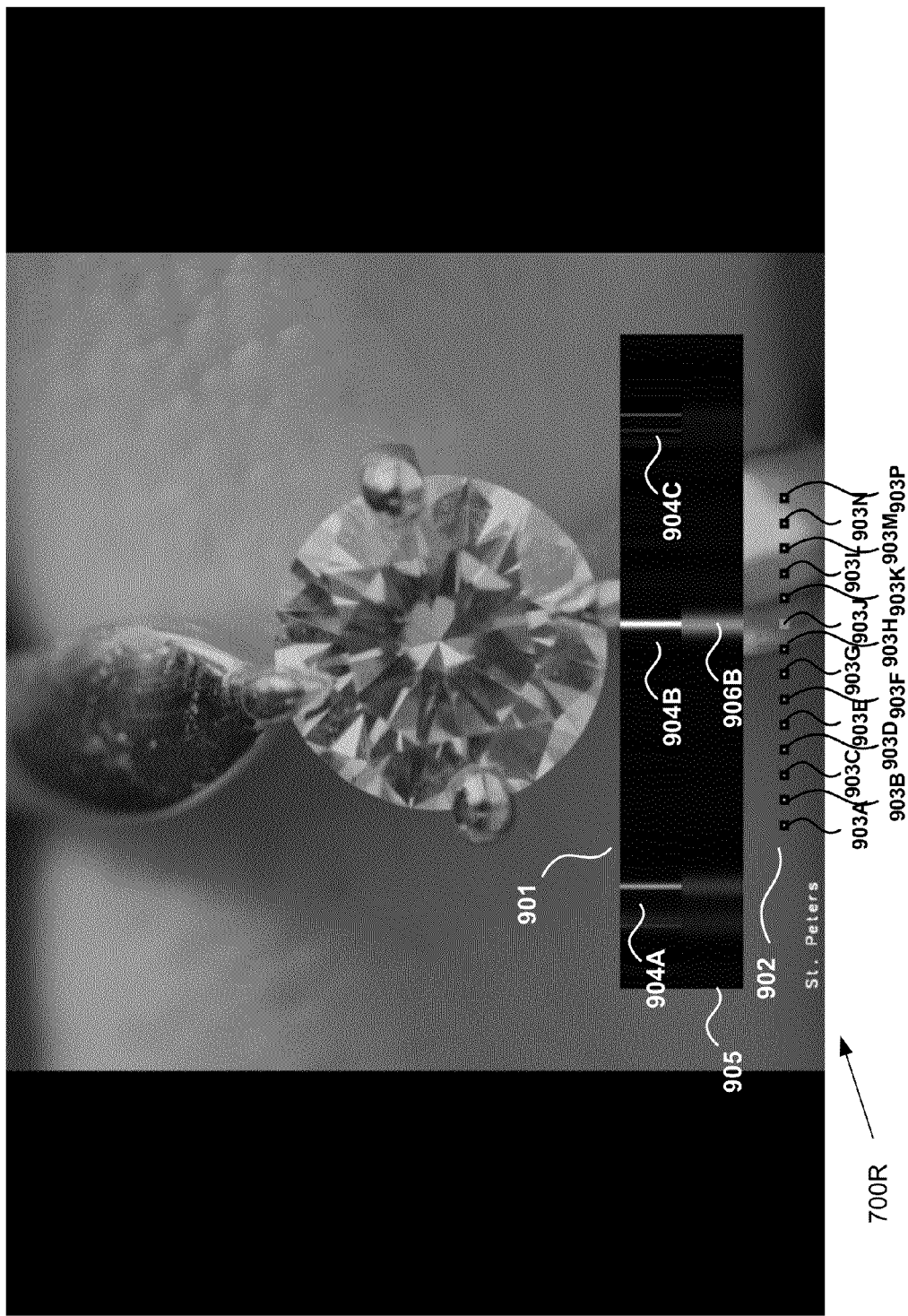
Figure 10B:
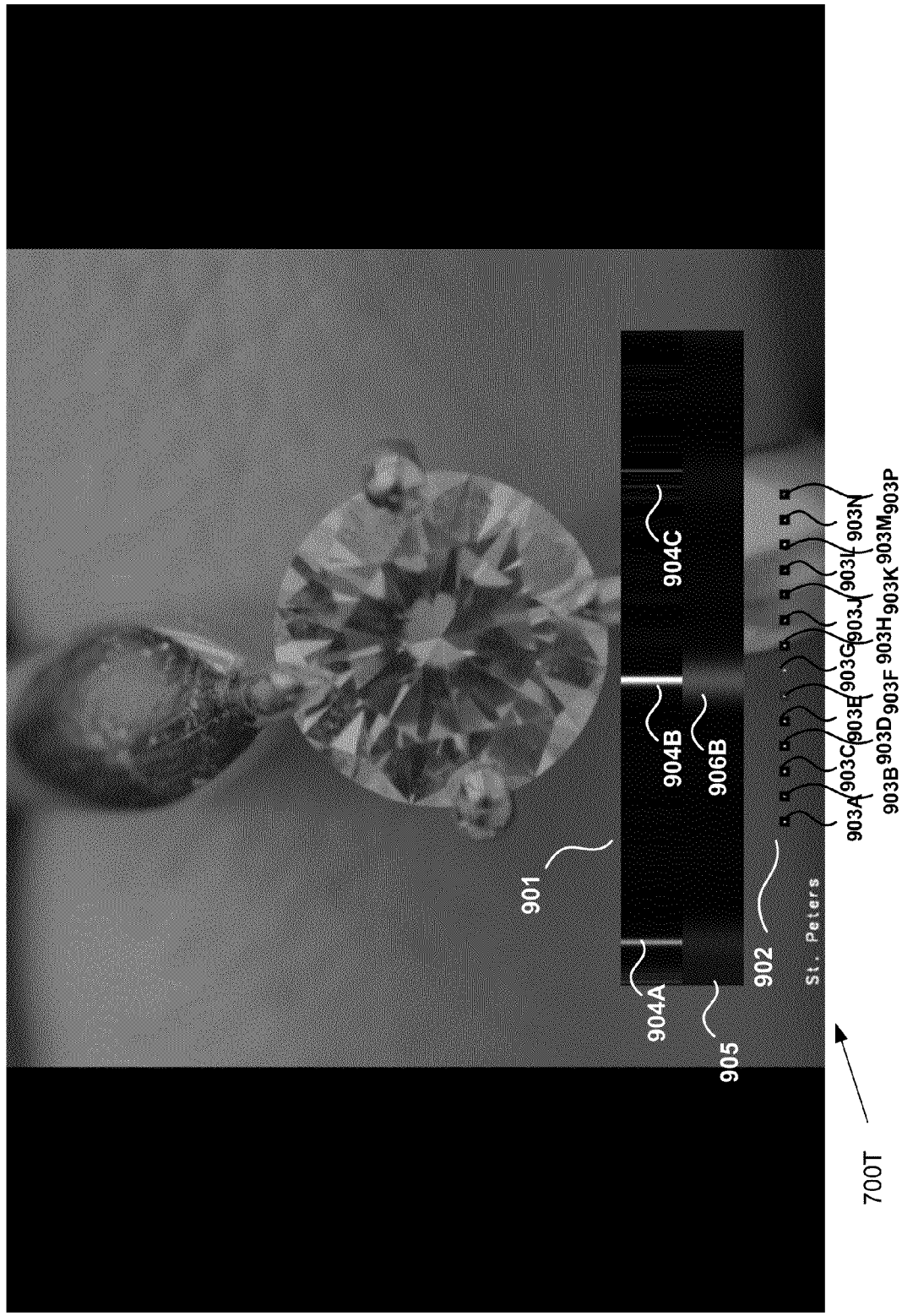
Figure 10C:
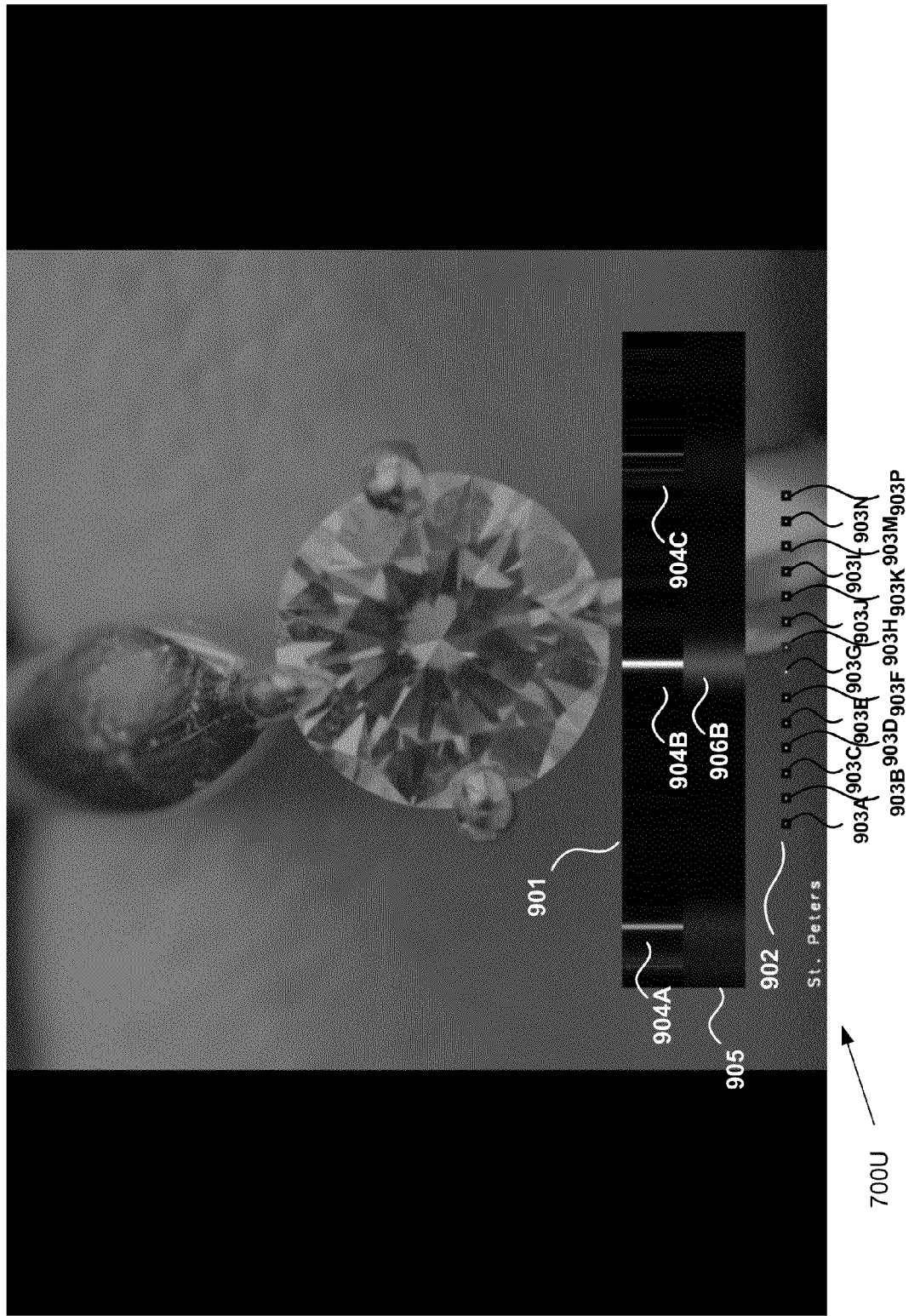
Figure 10E:
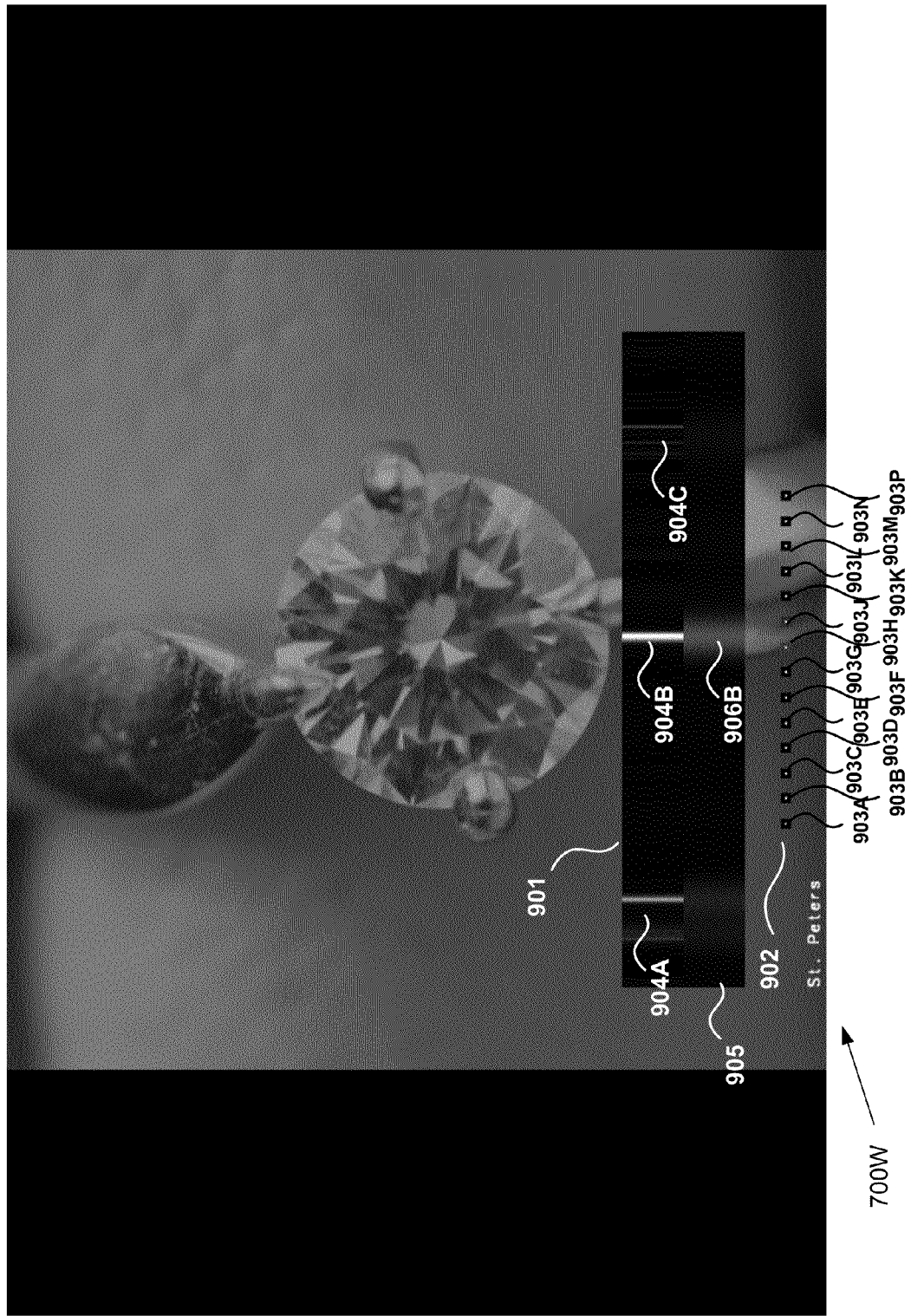

Again, distribution graphs 701F through 701L show how the captured images are combined to generate the corresponding relighted image 700F to 700L. In this example, each relighted image 700 represents an attempt to construct an image representing the scene as it might be lit from a single virtual light source. The area under each distribution graph 701 indicates the relative narrowness or width of the virtual light source, which corresponds to the sharpness or diffuseness of the virtual light source. A wider virtual light source is represented by a shallower slope and wider curve 701, as shown in FIGS. 8A and 8B; a more focused virtual light source is represented by a steeper slope and narrower curve 701, as shown in FIGS. 8C through 8F. As is evident from distribution curves 701 for the various examples, a wider virtual light source is constructed by combining several captured images with different flash positions, while a narrower light source is constructed by combining fewer captured images. In at least one embodiment, in addition to controlling the position of the virtual light source, a user can control, or "tune", the shape of curve 701 to change the relighting characteristics to be either more diffuse or sharper, as desired.

One skilled in the art will recognize that other distribution curves 701 are possible. For example, a relighted image simulating two virtual sources can be generated by forming a distribution curve 701 having two "humps". Any other shapes are also possible, for more sophisticated lighting effects. In addition, in at least one embodiment, virtual lighting positions can be controlled along more than one dimension, including for example two or more dimensions.

Referring now to FIGS. 9A to 9E, there is shown an example of a series of relighted images 700M to 700R for a virtual environment, wherein insufficient filtering of the relighted image set causes undue variations in image brightness. As discussed above, these unwanted artifacts can occur when the virtual light source is excessively narrow as compared to the spacing between flash locations in the captured images.

In these examples, an attempt is being made to recreate the lighting characteristics of a particular location, specifically St. Peters Basilica, by applying an environment map representing that location. Graph 901 is a simplified two-dimensional representation of lighting sources in the original environment; vertical bright bands 904 indicate two-dimensional positions of several sources of light in St. Peters Basilica, with band 904B indicating the primary light source in that environment. Dots 903 represent captured images that are available for use in generating positions of flashes in the captured images. For each relighted image 700, one or more dots 903 are brightened to indicate that a corresponding captured image is being used to generate the relighted image 700.

In FIGS. 9A through 9E, an attempt at low-pass filtering is applied, as shown by filtered graph 905. Here, band 904B (and other bands 904) are low-pass filtered to reduce discontinuities and thereby soften the artificial brightening and darkening effect; however, for illustrative purposes, the example depicts a situation in which the low-pass filtering is insufficient to rectify the problem. For example, the filtered version of band 904B is shown as band 906B; however filtered band 906B is insufficiently wide to avoid variations in lighting as the virtual lighting position is moved from left to right.

For example, for relighted image 700M, the primary virtual light source represented by bar 904B is aligned with dot 903G, indicating that one of the captured images had a flash position very close to the position of the primary light source in St. Peters Basilica. The alignment between the primary virtual light source and dot 903G causes image 700M to be relatively bright.

In relighted image 700N, the primary light source represented by bar 904B has shifted, for example based on user input attempting to move the light source to the right slightly. Here, no original captured image has a light source at the same position as the light source represented by bar 904B. Accordingly, relighted image 700N is constructed by combining the two captured images corresponding to dots 903G and 903H; however, filtered band 906B is insufficiently wide and now lies between dots 903G and 903H. As a result, the overall image is darker than image 700M. This pattern of alternating light and dark images occurs as the primary light source represented by bar 904B shifts to the right in successive images 700P, 700Q, and 700R shown in FIGS. 9C through 9E, respectively. Specifically, whenever the primary light source for the virtual environment being recreated is aligned with one of the original flash locations in a captured image, the resultant relighted image 700 appears brighter than when the light source is not aligned. This causes significant brightness differences between aligned images 700M, 700P, 700R and non-aligned images 700N, 700Q.

As discussed above, this unwanted artifact can be reduced or eliminated by applying a low-pass filter having sufficiently low cutoff frequency to band-limit the virtual lighting and thereby ensure some level of consistency in overall brightness. More particularly, the low-pass filter should be configured to band-limit the virtual lighting based on the geometric frequency spectrum of the lighting arrangement of the original set of captured images.

Referring now to FIGS. 10A to 10E, there is shown an example of a series of relighted images for a virtual environment, with sufficient filtering applied to avoid undue variations in image brightness. Here, the low-pass filter is applied with a lower cutoff frequency, so as to spread out bars 904. For example, filtered bar 906B, derived from bar 904B, is now sufficiently spread out that it extends to nearby dots 903F, 903G. Here, as primary light source is shifted from left to right, the effect of alignment and non-alignment of virtual light sources with respect to flash locations is minimized, and less variation is seen in the overall brightness of image 700.

In at least one embodiment, the cutoff frequency of the low-pass filter can be determined based on the spacing between flash locations in the captured images. In at least one embodiment, any other suitable factor or factors can be used for determining the cutoff frequency.

ADVANTAGES

The techniques of the present invention provide several advantages over prior art systems. Such advantages include:

Mobility the system can use components that are essentially the same size as conventional components.

Scalability: any number of components can be used. If there are insufficient cameras and/or flash units to capture all desired images from static positions, the existing components can be moved, and images can be captured sequentially, as describe above. The number of the available devices will not limit the imaging ability of our system. Thus, given enough time, any arbitrary amount of image data can be captured.

Ability to operate with additional components: Any device can use the communications protocol to interact with components of the system. Thus, additional components can be added to further enhance the user experience. For example, a tablet computer such as an iPad, available from Apple Inc. of Cupertino, Calif., can be used to enable complex user interactions and/or display of relighting results, by communicating with the components of the system using the wireless communications protocol.

Flexibility: Conventional relighting systems require setup of light sources in a closed environment, or movement of light sources by motor along a fixed path. By contrast, the system described herein allows for use in a variety of environments and contexts, including ones in open space. The system further allows inferences to be made from existing natural lighting, with subjects with various scales, and with surfaces with different reflectance properties, and the like.

Backward compatibility: According to the user intention and available devices, the system of the present invention also supports traditional imaging tasks, including single flash-photography, no-flash bullet-time photography, or even capture of a single regular two-dimensional image. The system of the present invention can facilitate these tasks, for example by allowing a user to use controller 103 to provide instructions to be sent to camera(s) 101 and/or flash(es) 102.

The present invention has been described in particular detail with respect to possible embodiments. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements, or entirely in software elements. Also, the particular division of functionality between the various system components described herein is merely exemplary, and not mandatory; functions performed by a single system component may instead be performed by multiple components, and functions performed by multiple components may instead be performed by a single component.

In various embodiments, the present invention can be implemented as a system or a method for performing the above-described techniques, either singly or in any combination. In another embodiment, the present invention can be implemented as a computer program product comprising a nontransitory computer-readable storage medium and computer program code, encoded on the medium, for causing a processor in a computing device or other electronic device to perform the above-described techniques.

Reference in the specification to "one embodiment" or to "an embodiment" means that a particular feature, structure, or characteristic described in connection with the embodiments is included in at least one embodiment of the invention. The appearances of the phrase "in at least one embodiment" in various places in the specification are not necessarily all referring to the same embodiment.

Some portions of the above are presented in terms of algorithms and symbolic representations of operations on data bits within a memory of a computing device. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing module and/or device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware and/or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computing device selectively activated or reconfigured by a computer program stored in the computing device. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, flash memory, solid state drives, magnetic or optical cards, application specific integrated circuits (ASICs), or any type of media suitable for storing electronic instructions, and each coupled to a computer system bus. Further, the computing devices referred to herein may include a single processor or may be architectures employing multiple processor designs for increased computing capability.

The algorithms and displays presented herein are not inherently related to any particular computing device, virtualized system, or other apparatus. Various general-purpose systems may also be used with programs in accordance with the teachings herein, or it may prove convenient to construct more specialized apparatus to perform the required method steps. The required structure for a variety of these systems will be apparent from the description provided herein. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

Accordingly, in various embodiments, the present invention can be implemented as software, hardware, and/or other elements for controlling a computer system, computing device, or other electronic device, or any combination or plurality thereof. Such an electronic device can include, for example, a processor, an input device (such as a keyboard, mouse, touchpad, trackpad, joystick, trackball, microphone, and/or any combination thereof), an output device (such as a screen, speaker, and/or the like), memory, long-term storage (such as magnetic storage, optical storage, and/or the like), and/or network connectivity, according to techniques that are well known in the art. Such an electronic device may be portable or nonportable. Examples of electronic devices that may be used for implementing the invention include one or more of: a camera, mobile phone, personal digital assistant, smartphone, kiosk, server computer, enterprise computing device, desktop computer, laptop computer, tablet computer, consumer electronic device, television, set-top box, and/or the like. An electronic device for implementing the present invention may use any operating system such as, for example: Linux; Microsoft Windows, available from Microsoft Corporation of Redmond, Wash.; Mac OS X, available from Apple Inc. of Cupertino, Calif.; iOS, available from Apple Inc. of Cupertino, Calif.; Android, available from Google, Inc. of Mountain View Calif.; and/or any other operating system that is adapted for use on the device.

While the invention has been described with respect to a limited number of embodiments, those skilled in the art, having benefit of the above description, will appreciate that other embodiments may be devised which do not depart from the scope of the present invention as described herein. In addition, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the claims.

What is claimed is:

1. A method for capturing multiple images using multiple devices, comprising:
   at a controller, determining a pattern for capture of multiple images using multiple devices;
   establishing communication, via a communication medium, between the controller and at least one image capture device;
   establishing communication, via the communication medium, between the controller and at least one illumination device;
   transmitting at least one message, via the communication medium, from the controller to the at least one image capture device and to the at least one illumination device to cause the at least one image capture device to capture a plurality of images of a subject, the images having a plurality of illumination configurations;
   storing the captured plurality of images at a storage device; and
   generating at least two relighted images from a weighted combination of at least two of the stored images; and
   outputting the generated image comprises outputting an animation to transition from at least one of the generated relighted images to another of the generated relighted images.

2. The method of claim 1 wherein the communication medium comprises a wireless communication medium.

3. The method of claim 1 wherein establishing communication between the controller and at least one image capture device comprises establishing communication between the controller and a plurality of image capture devices.

4. The method of claim 1 wherein establishing communication between the controller and at least one illumination device comprises establishing communication between the controller and a plurality of illumination devices.

5. The method of claim 1 wherein:
   each image capture device comprises a camera; and
   each illumination device comprises a flash unit.

6. The method of claim 1 wherein transmitting at least one message comprises:
   transmitting at least one message to cause a movable illumination device to successively illuminate the subject from each of a plurality of different positions; and
   transmitting at least one message to cause at least one image capture device to capture at least one image in synchrony with each illumination of the subject.

7. The method of claim 6, wherein transmitting at least one message further comprises transmitting at least one message to cause the movable illumination device to automatically move from one of the positions to another of the positions.

8. The method of claim 6, wherein transmitting at least one message further comprises transmitting at least one message to cause the movable illumination device to display output instructing a user to move the illumination device from one of the positions to another of the positions.

9. The method of claim 1 wherein transmitting at least one message comprises:
   transmitting at least one message to cause a plurality of illumination devices at different positions with respect to the subject to successively illuminate the subject at each of the positions; and
   transmitting at least one message to cause at least one image capture device to capture at least one image in synchrony with each illumination of the subject.

10. The method of claim 1 wherein:
    transmitting at least one message to the at least one image capture device comprises transmitting at least one message indicating at least one of a time and position for image capture; and
    transmitting at least one message to the at least one illumination device comprises transmitting at least one message indicating at least one of a time and position for illumination of the subject.

11. The method of claim 1 further comprising generating output to instruct a user to move at least one of an image capture device and an illumination device to a specified position.

12. The method of claim 11, wherein generating output to instruct a user comprises generating at least one of:
    visual output;
    audio output; and
    haptic output.

13. The method of claim 11, further comprising:
    detecting user movement of at least one of an image capture device and an illumination device;
    comparing the detected movement with instructions in the generated output; and responsive to the comparison, outputting feedback to the user.

14. The method of claim 1 further comprising:
detecting a new position of an illumination device caused by user movement of the illumination device; and
responsive to the new position being within a predefined tolerance of a predefined position for an image capture event:
 transmitting a message to cause the illumination device to illuminate the subject; and
 transmitting a message to cause the at least one image capture device to capture an image of the subject in synchrony with the illumination of the subject.

15. The method of claim 1 further comprising:
detecting a new position of an image capture device caused by user movement of the image capture device; and
responsive to the new position being within a predefined tolerance of a predefined position for an image capture event:
 transmitting a message to cause an illumination device to illuminate the subject; and
 transmitting a message to cause the at least one image capture device to capture an image of the subject in synchrony with the illumination of the subject.

16. The method of claim 1 further comprising:
detecting user activation of an illumination device; and
transmitting a message to cause the at least one image capture device to capture an image of the subject in synchrony with the illumination of the subject.

17. The method of claim 16, further comprising determining a position of the user-activated illumination device.

18. The method of claim 1 wherein determining the pattern for capture of multiple images comprises:
detecting a series of user movements of at least one of the illumination devices, defining a movement path;
identifying a plurality of positions along the movement path as being suitable for illumination of the subject; and
storing a representation of the positions;
and wherein transmitting the at least one message to cause the at least one image capture device to capture a plurality of images of a subject comprises transmitting at least one message to cause image capture when the illumination device is at one of the identified positions.

19. The method of claim 1 wherein determining the pattern for capture of multiple images comprises:
detecting a series of user movements of at least one of the image capture devices, defining a movement path;
identifying a plurality of positions along the movement path as being suitable for image capture;
storing a representation of the positions; and
and wherein transmitting the at least one message to cause the at least one image capture device to capture a plurality of images of a subject comprises transmitting at least one message to cause image capture when the image capture device is at one of the identified positions.

20. The method of claim 1 wherein the controller is a separate device from the at least one image capture device and the at least one illumination device.

21. The method of claim 1 wherein each of the controller, the at least one image capture device, and the at least one illumination device comprises at least one selected from the group consisting of:
a smartphone;
a tablet computer; and
a mobile computing device.

22. The method of claim 1 wherein storing the captured plurality of images at a storage device comprises transmitting the captured image to a remote server for storage at a storage device associated with the remote server.

23. The method of claim 1 wherein transmitting at least one message comprises transmitting at least one message to cause the at least one image capture device to capture a plurality of light-field images.

24. The method of claim 1 further comprising:
determining a position of the at least one image capture device and the at least one illumination device during an image capture; and
storing the determined position.

25. The method of claim 24, wherein storing the determined position comprises storing the determined position as metadata to accompany at least one stored image.

26. The method of claim 1 wherein generating at least two relighted images from a weighted combination of at least two of the stored images comprises:
receiving user input to specify a position for at least one virtual light source;
determining, based on the specified position for at least one virtual light source, a weighting associated with at least two of the stored images; and
generating at least two relighted images from a combination of at least two of the stored images, wherein the combination is weighted according to the determined weighting.

27. The method of claim 26, wherein receiving user input to specify a position for at least one virtual light source comprises receiving user input interacting with a displayed distribution graph representing weightings and positions for virtual light sources.

28. The method of claim 26, wherein receiving user input to specify a position for at least one virtual light source comprises receiving user input dragging points on a displayed distribution graph representing weightings and positions for virtual light sources.

29. The method of claim 26, wherein receiving user input to specify a position for at least one virtual light source comprises receiving user input to scroll at least one displayed visual element, wherein the position for at least one virtual light source is specified based on the scroll position of the at least one displayed visual element.

30. The method of claim 1 wherein:
generating at least two relighted images from a weighted combination of at least two of the stored images comprises generating a light-field picture by combining at least two of the stored images; and
outputting an animation to transition from at least one of the generated relighted images to another of the generated relighted images comprises outputting an animation to transition from at least one image generated from the light-field picture to another image generated from the light-field picture.

31. The method of claim 1 further comprising, prior to establishing communication between the controller and the at least one image capture device, establishing a relationship between the at least one image capture device and the at least one illumination device.

32. The method of claim 31, wherein establishing a relationship between the at least one image capture device and the at least one illumination device comprises pairing the at least one image capture device with the at least one illumination device.

33. The method of claim 31, wherein establishing a relationship between the at least one image capture device and the at least one illumination device comprises:

receiving user input requesting use of at least one illumination device associated with another user;

transmitting a first signal requesting permission from the other use to establish a relationship with the at least one illumination device;

responsive to receiving a second signal indicating permission has been granted to establish a relationship with the at least one illumination device, pairing the at least one image capture device with the at least one illumination device.

34. A method for capturing multiple images using multiple devices, comprising:

at a controller, determining a pattern for capture of multiple images using multiple devices;

establishing communication, via a communication medium, between the controller and at least one image capture device;

establishing communication, via the communication medium, between the controller and at least one illumination device;

transmitting at least one message, via the communication medium, from the controller to the at least one image capture device and to the at least one illumination device to cause the at least one image capture device to capture a plurality of images of a subject, the images having a plurality of illumination configurations;

storing the captured plurality of images at a storage device;

obtaining an environment map specifying lighting conditions for a virtual environment;

generating a relighted image according to the specified lighting conditions, from a weighted combination of at least two of the stored images; and outputting the generated relighted image.

35. The method of claim 34, wherein the environment map defines a lighting graph specifying a location and an intensity for at least one virtual light source in the virtual environment.

36. The method of claim 35, further comprising, prior to generating the relighted image, applying a low-pass filter to the lighting graph.

37. The method of claim 36, further comprising, prior to applying the low-pass filter, configuring the low-pass filter to have a cut-off frequency based on a geometric frequency spectrum associated with lighting characteristics of the stored captured images.

38. A method for capturing multiple images using multiple devices, comprising:

at a controller, determining a pattern for capture of multiple images using multiple devices;

establishing communication, via a communication medium, between the controller and at least one image capture device;

establishing communication, via the communication medium, between the controller and at least one illumination device;

transmitting at least one message, via the communication medium, from the controller to the at least one image capture device and to the at least one illumination device to cause the at least one image capture device to capture a plurality of images of a subject, the images having a plurality of illumination configurations;

storing the captured plurality of images at a storage device;

receiving user input to specify a first position for at least one virtual light source;

determining, based on the specified first position for at least one virtual light source, a first weighting associated with at least two of the stored images;

generating a first relighted image from a combination of at least two of the stored images, wherein the combination is weighted according to the determined first weighting;

receiving user input to specify a second position for at least one virtual light source;

determining, based on the specified second position for at least one virtual light source, a second weighting associated with at least two of the stored images;

generating a second relighted image from a combination of at least two of the stored images, wherein the combination is weighted according to the determined second weighting; and outputting an animation to transition from the generated relighted image to the generated second relighted image.

39. A computer program product for capturing multiple images using multiple devices, comprising:

a non-transitory computer-readable storage medium; and computer program code, encoded on the medium, configured to cause at least one processor at a controller to perform the steps of:

determining a pattern for capture of multiple images using multiple devices;

establishing communication, via a communication medium, between the controller and at least one image capture device;

establishing communication, via the communication medium, between the controller and at least one illumination device;

transmitting at least one message, via the communication medium, from the controller to the at least one image capture device and to the at least one illumination device to cause the at least one image capture device to capture a plurality of images of a subject, the images having a plurality of illumination configurations;

causing a storage device to store the captured plurality of images;

obtaining an environment map specifying lighting conditions for a virtual environment;

generating a relighted image according to the specified lighting conditions, from a weighted combination of at least two of the stored images; and causing an output device to output the generated relighted image.

40. The computer program product of claim 39, wherein the computer program code configured to cause at least one processor to transmit at least one message comprises computer program code configured to cause at least one processor to:

transmit at least one message to cause a movable illumination device to successively illuminate the subject from each of a plurality of different positions; and transmit at least one message to cause at least one image capture device to capture at least one image in synchrony with each illumination of the subject.

41. The computer program product of claim 39, wherein the computer program code configured to cause at least one processor to transmit at least one message comprises computer program code configured to cause at least one processor to:

transmit at least one message to cause a plurality of illumination devices at different positions with respect to the subject to successively illuminate the subject at each of the positions; and transmit at least one message to cause at least one image capture device to capture at least one image in synchrony with each illumination of the subject.

42. The computer program product of claim 39, further comprising computer program code configured to cause at least one output device to generate output to instruct a user to move at least one of an image capture device and an illumination device to a specified position.

43. The computer program product of claim 39, further comprising:
  computer program code configured to cause at least one processor to detect a new position of an illumination device caused by user movement of the illumination device; and
  computer program code configured to cause at least one processor to, responsive to the new position being within a predefined tolerance of a predefined position for an image capture event:
    transmit a message to cause the illumination device to illuminate the subject; and
    transmit a message to cause the at least one image capture device to capture an image of the subject in synchrony with the illumination of the subject.

44. The computer program product of claim 39, further comprising:
  computer program code configured to cause at least one processor to detect a new position of an image capture device caused by user movement of the image capture device; and
  computer program code configured to cause at least one processor to, responsive to the new position being within a predefined tolerance of a predefined position for an image capture event:
    transmit a message to cause an illumination device to illuminate the subject; and
    transmit a message to cause the at least one image capture device to capture an image of the subject in synchrony with the illumination of the subject.

45. The computer program product of claim 39, wherein the computer program code configured to cause at least one processor to transmit at least one message comprises computer program code configured to cause at least one processor to transmit at least one message to cause the at least one image capture device to capture a plurality of light-field images.

46. The computer program product of claim 39, wherein the computer program code configured to cause at least one processor to generate at least two relighted images from a weighted combination of at least two of the stored images comprises:
  computer program code configured to cause at least one input device to be receptive to user input to specify a position for at least one virtual light source;
  computer program code configured to cause at least one processor to determine, based on the specified position for at least one virtual light source, a weighting associated with at least two of the stored images; and
  computer program code configured to cause at least one processor to generate at least two relighted images from a combination of at least two of the stored images, wherein the combination is weighted according to the determined weighting.

47. A system for capturing multiple images using multiple devices, comprising:
  a controller, configured to:
    determine a pattern for capture of multiple images using multiple devices;
    establish communication, via a communication medium, between the controller and at least one image capture device;
    establish communication, via the communication medium, between the controller and at least one illumination device;
    transmit at least one message, via the communication medium, from the controller to the at least one image capture device and to the at least one illumination device to cause the at least one image capture device to capture a plurality of images of a subject, the images having a plurality of illumination configurations;
  a storage device, communicatively coupled to the controller, configured to store the captured plurality of images; and
  an image combining module, communicatively coupled to the storage device, configured to combine at least two of the stored images by:
    obtaining an environment map specifying lighting conditions for a virtual environment; and
    generating a relighted image according to the specified lighting conditions, from a weighted combination of at least two of the stored images;
  the system further comprising an output device, communicatively coupled to the image combining module, configured to output he generated relighted image.

48. The system of claim 47, wherein the communication medium comprises a wireless communication medium.

49. The system of claim 47, wherein the controller is configured to establish communication between the controller and a plurality of image capture devices.

50. The system of claim 47, wherein the controller is configured to establish communication between the controller and a plurality of illumination devices.

51. The system of claim 47, wherein:
  each image capture device comprises a camera; and
  each illumination device comprises a flash unit.

52. The system of claim 47, wherein the controller is configured to:
  transmit at least one message to cause a movable illumination device to successively illuminate the subject from each of a plurality of different positions; and
  transmit at least one message to cause at least one image capture device to capture at least one image in synchrony with each illumination of the subject.

53. The system of claim 47, wherein the controller is configured to:
  transmit at least one message to cause a plurality of illumination devices at different positions with respect to the subject to successively illuminate the subject at each of the positions; and
  transmit at least one message to cause at least one image capture device to capture at least one image in synchrony with each illumination of the subject.

54. The system of claim 47, wherein the controller is configured to cause at least one output device to generate output to instruct a user to move at least one of an image capture device and an illumination device to a specified position.

55. The system of claim 47, wherein the controller is configured to:
  detect a new position of an illumination device caused by user movement of the illumination device; and
  responsive to the new position being within a predefined tolerance of a predefined position for an image capture event:
    transmit a message to cause the illumination device to illuminate the subject; and transmit a message to cause the at least one image capture device to capture an image of the subject in synchrony with the illumination of the subject.

56. The system of claim 47, wherein the controller is configured to:
- detect a new position of an image capture device caused by user movement of the image capture device; and
- responsive to the new position being within a predefined tolerance of a predefined position for an image capture event:
  - transmit a message to cause an illumination device to illuminate the subject; and
  - transmit a message to cause the at least one image capture device to capture an image of the subject in synchrony with the illumination of the subject.

57. The system of claim 47, wherein the controller is configured to transmit at least one message by transmitting at least one message to cause the at least one image capture device to capture a plurality of light-field images.

58. The system of claim 47, further comprising:
- at least one input device, communicatively coupled to the controller, configured to be receptive to user input to specify a position for at least one virtual light source;

wherein:
- the image combining module is configured to determine, based on the specified position for at least one virtual light source, a weighting associated with at least two of the stored images, and to generate a relighted image from a combination of at least two of the stored images, wherein the combination is weighted according to the determined weighting;
- and wherein the output device is configured to output the generated relighted image.

* * * * *

UNITED STATES PATENT AND TRADEMARK OFFICE
CERTIFICATE OF CORRECTION

PATENT NO. : 9,001,226 B1  
APPLICATION NO. : 13/693798  
DATED : April 7, 2015  
INVENTOR(S) : Yi-Ren Ng et al.

Page 1 of 1

It is certified that error appears in the above-identified patent and that said Letters Patent is hereby corrected as shown below:

IN THE CLAIMS:

Column 34, line 1 (claim 1): please delete "outputting the generated image comprises".

Signed and Sealed this  
Fourth Day of August, 2015

Michelle K. Lee  
*Director of the United States Patent and Trademark Office*

UNITED STATES PATENT AND TRADEMARK OFFICE
CERTIFICATE OF CORRECTION

| | | |
|---|---|---|
| PATENT NO. | : 9,001,226 B1 | Page 1 of 1 |
| APPLICATION NO. | : 13/693798 | |
| DATED | : April 7, 2015 | |
| INVENTOR(S) | : Yi-Ren Ng et al. | |

It is certified that error appears in the above-identified patent and that said Letters Patent is hereby corrected as shown below:

IN THE CLAIMS

Column 40, line 25 (claim 47): please replace "he" with "the".

Signed and Sealed this
Eighth Day of December, 2015

Michelle K. Lee
*Director of the United States Patent and Trademark Office*